(12) United States Patent
Mandava et al.

(10) Patent No.: US 10,134,223 B2
(45) Date of Patent: Nov. 20, 2018

(54) BET SENSING APPARATUSES AND METHODS

(71) Applicant: Bally Gaming, Inc., Las Vegas, NV (US)

(72) Inventors: Ajay Kumar Mandava, Las Vegas, NV (US); Jaime Bemaras, Los Angeles, CA (US)

(73) Assignee: BALLY GAMING, INC., Las Vegas, NV (US)

( * ) Notice: Subject to any disclaimer, the term of this patent is extended or adjusted under 35 U.S.C. 154(b) by 0 days.

(21) Appl. No.: 14/988,533

(22) Filed: Jan. 5, 2016

(65) Prior Publication Data

US 2017/0193735 A1   Jul. 6, 2017

(51) Int. Cl.
*A63F 9/24* (2006.01)
*G07F 17/32* (2006.01)

(52) U.S. Cl.
CPC ........ *G07F 17/322* (2013.01); *G07F 17/3204* (2013.01); *G07F 17/3225* (2013.01); *G07F 17/3248* (2013.01); *G07F 17/3288* (2013.01)

(58) Field of Classification Search
CPC ... G07F 17/32; G07F 17/3223; G07F 17/3241
USPC .......................................................... 463/25
See application file for complete search history.

(56) References Cited

U.S. PATENT DOCUMENTS

| | | | |
|---|---|---|---|
| 755,983 | A | 3/1904 | Wood |
| 2,891,437 | A | 6/1959 | Tripp |
| 3,819,186 | A | 6/1974 | Hinterstocker |
| 3,950,712 | A | 4/1976 | Chenausky et al. |
| 4,531,187 | A | 7/1985 | Uhland et al. |
| 4,586,712 | A | 5/1986 | Lorber et al. |

(Continued)

FOREIGN PATENT DOCUMENTS

| | | |
|---|---|---|
| CN | 1182483 A | 5/1998 |
| CN | 1692379 A | 11/2005 |

(Continued)

OTHER PUBLICATIONS

Jain et al., "Coin Recognition Using Circular Hough Transform", May 2012, International Journal of Electronics Communication and Computer Technology (IJECCT), vol. 2 Issue 3, p. 101-104.*

(Continued)

*Primary Examiner* — Jay Liddle
*Assistant Examiner* — Ryan Hsu
(74) *Attorney, Agent, or Firm* — TraskBritt

(57) ABSTRACT

A bet sensor for sensing values of gaming tokens may include a bet placement surface configured and oriented to support a stack of gaming tokens thereon and an image sensor located and oriented to capture an image of a lateral side surface of at least one gaming token located on the bet placement surface. The image may depict the lateral side surface in a radial format. The bet sensor may include a processor operably coupled with the image sensor. The processor is configured to acquire image data from the image sensor and determine a wager value of the at least one gaming token by projecting at least one circle onto the image data that corresponds with a transition in the image data associated with the at least one gaming token. A gaming table may include such a bet sensor. The disclosure includes methods of operating such a bet sensor.

20 Claims, 36 Drawing Sheets

(56) References Cited

U.S. PATENT DOCUMENTS

| | | |
|---|---|---|
| 4,814,589 A | 3/1989 | Storch et al. |
| 4,838,557 A | 6/1989 | Floyhar et al. |
| 4,861,041 A | 8/1989 | Jones et al. |
| 4,969,037 A | 11/1990 | Poleschinski et al. |
| 4,969,648 A | 11/1990 | Hollinger et al. |
| 5,275,411 A | 1/1994 | Breeding |
| 5,377,994 A | 1/1995 | Jones et al. |
| 5,393,067 A | 2/1995 | Paulsen et al. |
| 5,536,016 A | 7/1996 | Thompson |
| 5,573,249 A | 11/1996 | Johnson et al. |
| 5,586,936 A | 12/1996 | Bennett et al. |
| 5,605,334 A | 2/1997 | McCrea et al. |
| 5,695,189 A | 12/1997 | Breeding et al. |
| 5,707,287 A | 1/1998 | McCrea et al. |
| 5,735,525 A | 4/1998 | McCrea et al. |
| 5,749,008 A | 5/1998 | Ishihara et al. |
| 5,770,533 A | 6/1998 | Franchi et al. |
| 5,781,647 A | 7/1998 | Fishbine et al. |
| 5,794,935 A | 8/1998 | Lo |
| 5,809,482 A | 9/1998 | Strisower |
| 5,823,875 A | 10/1998 | Tarantino et al. |
| 5,836,818 A | 11/1998 | Jones et al. |
| 5,909,876 A | 6/1999 | Brown et al. |
| 5,911,626 A | 6/1999 | McCrea et al. |
| 5,924,926 A | 7/1999 | Brown et al. |
| 5,941,769 A | 8/1999 | Order |
| 6,093,103 A | 7/2000 | Mccrea et al. |
| 6,117,012 A | 9/2000 | Mccrea et al. |
| 6,254,484 B1 | 7/2001 | McCrea, Jr. |
| 6,299,534 B1 | 10/2001 | Breeding et al. |
| 6,313,871 B1 | 11/2001 | Schubert |
| 6,346,044 B1 | 2/2002 | McCrea, Jr. |
| 6,431,984 B2 | 8/2002 | Coyer |
| 6,454,437 B1 | 9/2002 | Kelly |
| 6,460,848 B1 | 10/2002 | Soltys et al. |
| 6,514,140 B1 | 2/2003 | Storch |
| 6,517,436 B2 | 2/2003 | Soltys et al. |
| 6,520,857 B2 | 2/2003 | Soltys et al. |
| 6,530,836 B2 | 3/2003 | Soltys et al. |
| 6,532,297 B1 | 3/2003 | Lindquist |
| 6,568,682 B1 | 5/2003 | Hogan et al. |
| 6,579,180 B2 | 6/2003 | Soltys et al. |
| 6,579,181 B2 | 6/2003 | Soltys et al. |
| 6,629,889 B2 | 10/2003 | Mothwurf |
| 6,652,379 B2 | 11/2003 | Soltys et al. |
| 6,663,490 B2 | 12/2003 | Soltys et al. |
| 6,688,979 B2 | 2/2004 | Soltys et al. |
| 6,712,696 B2 | 3/2004 | Soltys et al. |
| 6,744,569 B2 | 6/2004 | Geng |
| 6,901,163 B1 | 5/2005 | Pearce et al. |
| 6,954,911 B2 | 10/2005 | Pierrat |
| 7,124,947 B2 | 10/2006 | Storch |
| 7,316,615 B2 | 1/2008 | Soltys et al. |
| 7,351,145 B1 | 4/2008 | Ornstein et al. |
| 7,367,884 B2 | 5/2008 | Breeding et al. |
| 7,404,765 B2 | 7/2008 | Soltys et al. |
| 7,491,125 B2 | 2/2009 | Mathis et al. |
| 7,536,817 B2 | 5/2009 | Storch |
| 7,559,839 B2 | 7/2009 | Bahar |
| 7,570,781 B2 | 8/2009 | Rhoads et al. |
| 7,753,781 B2 | 7/2010 | Storch |
| 7,901,285 B2 | 3/2011 | Tran et al. |
| 8,027,508 B2 | 9/2011 | Rhoads et al. |
| 8,285,034 B2 | 10/2012 | Rajaraman et al. |
| 8,451,318 B2 | 5/2013 | Trubko et al. |
| 8,606,002 B2 | 12/2013 | Rajaraman et al. |
| 8,774,463 B2 | 7/2014 | Boncyk et al. |
| 2002/0042299 A1 | 4/2002 | Soltys et al. |
| 2003/0022614 A1 | 1/2003 | Momemy |
| 2003/0087694 A1 | 5/2003 | Storch |
| 2003/0220136 A1 | 11/2003 | Soltys et al. |
| 2004/0005920 A1 | 1/2004 | Soltys et al. |
| 2005/0026680 A1* | 2/2005 | Gururajan ............... A63F 1/14 463/25 |
| 2005/0137005 A1 | 6/2005 | Soltys et al. |
| 2006/0132747 A1 | 6/2006 | Singer et al. |
| 2006/0160600 A1 | 7/2006 | Hill et al. |
| 2006/0160608 A1 | 7/2006 | Hill et al. |
| 2006/0177109 A1 | 8/2006 | Storch |
| 2006/0252521 A1 | 11/2006 | Gururajan et al. |
| 2007/0184898 A1 | 8/2007 | Miller et al. |
| 2009/0017888 A1 | 1/2009 | Kuhn et al. |
| 2009/0075723 A1 | 3/2009 | Richard et al. |
| 2009/0093293 A1 | 4/2009 | Koyama et al. |
| 2009/0191933 A1 | 7/2009 | French |
| 2011/0052049 A1 | 3/2011 | Rajaraman et al. |
| 2012/0089252 A1 | 4/2012 | Kwirandt |
| 2012/0122559 A1 | 5/2012 | Kelly et al. |
| 2014/0200071 A1* | 7/2014 | Czyzewski ......... G07F 17/3204 463/25 |

FOREIGN PATENT DOCUMENTS

| | | |
|---|---|---|
| CN | 1993704 A | 7/2007 |
| JP | 06142965 A | 5/1994 |
| KR | 2006122390 A | 11/2006 |
| WO | 2005104049 | 11/2005 |

OTHER PUBLICATIONS

PCT International Search Report and Written Opinion of the International Searching Authority for PCT/US2013/077200, dated Apr. 24, 2014, 13 pages.

PCT International Search Report and Written Opinion of the International Application No. PCT/US2015/047233, dated Dec. 17, 2015, 10 pages.

The OpenCV Reference Manual, Release 2.4.9.0, http://ecee.colorado.edu/~siewerts/extra/ecen5763/ecen5763_doc/opencv2refman.pdf, (Apr. 2014), pp. 337-338.

Otsu Nobuyuki, "A threshold selection method from gray-level histograms", IEEE Trans. Sys., Man., Cyber. 9 (1) (1979) pp. 62-66.

Xu et al., "Image Segmentation Using Deformable Models", Handbook of Medical Imaging—vol. 2: Medical Image Processing and Analysis, edited by J.M. Fitzpatrick and M. Sonka, SPIE Press (May 2000) pp. 129-174.

\* cited by examiner

BET SENSING APPARATUSES AND METHODS

CROSS-REFERENCE TO RELATED APPLICATIONS

The subject matter of this application is related to the subject matter of U.S. patent application Ser. No. 14/500,687, filed Sep. 29, 2014, now U.S. Pat. No. 9,478,099, issued Oct. 25, 2016, the subject matter of U.S. patent application Ser. No. 13/829,843, filed Mar. 14, 2013, now U.S. Pat. No. 8,961,298, issued Feb. 24, 2015, and the subject matter of U.S. Provisional Patent Application Ser. No. 61/751,780, filed Jan. 11, 2013. The disclosure of each of the foregoing applications is hereby incorporated herein in its entirety by this reference.

TECHNICAL FIELD

The present disclosure, in various embodiments, relates to bet sensors for use in gaming applications, to gaming tables incorporating bet sensors, and to methods of operating such bet sensors.

BACKGROUND

In casinos and other gaming institutions, betting tables often seat a number of different players and a table operator (e.g., dealer). Each player makes their wager by placing casino tokens on a designated location on the table. Casino gaming tokens are small disks used by a player in lieu of currency. The gaming tokens are interchangeable with money at the specific casino or other gaming institution in which the gaming tokens are used. It is common for casinos or other gaming institutions to provide unique gaming tokens, each identifiable by particular colors and markings on the face as well as on lateral side edges thereof. These colors and/or markings may represent specific monetary values.

During game play, the players may place a number of chips on the betting surface to indicate their wager. The gaming tokens are often placed on the betting surface in stacks, which may include gaming tokens having different values. The stack of gaming tokens may also have any number of gaming tokens to comprise the wager. The dealer is often responsible for monitoring the wagers placed by the players and also for determining the wager value of a stack of gaming tokens placed by a player.

BRIEF SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

In some embodiments, the present disclosure includes a bet sensor for sensing values of multiple gaming tokens. The bet sensor comprises a bet placement surface configured and oriented to support a stack of gaming tokens thereon, an image sensor located and oriented to capture an image of a lateral side surface of at least one gaming token located on the bet placement surface, and a processor operably coupled with the image sensor. The image depicts the lateral side surface is in a radial format. The processor configured to acquire image data from the image and analyze the image data to determine a wager value of the at least one gaming token by projecting at least one circle onto the image data that corresponds with a transition in the image data associated with the at least one gaming token.

In some embodiments, the present disclosure includes a gaming table comprising at least one bet sensor located proximate a surface of the gaming table. The at least one bet sensor includes a bet placement surface configured and oriented to support a stack of gaming tokens thereon, an image sensor located and oriented to capture an image of a lateral side surface of gaming tokens located on the bet placement surface, and a processor in communication with the image sensor. The image depicts the lateral side surface of the gaming tokens in a radial format. The processor is configured to acquire image data from the image and project a plurality of circles on the image data to identify at least one boundary in the image data to determine a wager value of the gaming tokens.

In some embodiments, a method of operating a bet sensor for determining a wager value of a plurality of gaming tokens is disclosed. The method comprises capturing, with an image sensor, image data of a lateral side surface of a plurality of gaming tokens on a bet placement surface, wherein the lateral side surface is depicted in a radial format, processing, with a processor, the image data including projecting a plurality of circles on the image data approximately at at least one transition in the image data corresponding to the plurality of gaming tokens, and determining a wager value of the plurality of gaming tokens based on characteristics of the plurality of circles.

DETAILED DESCRIPTION

Figure 1:
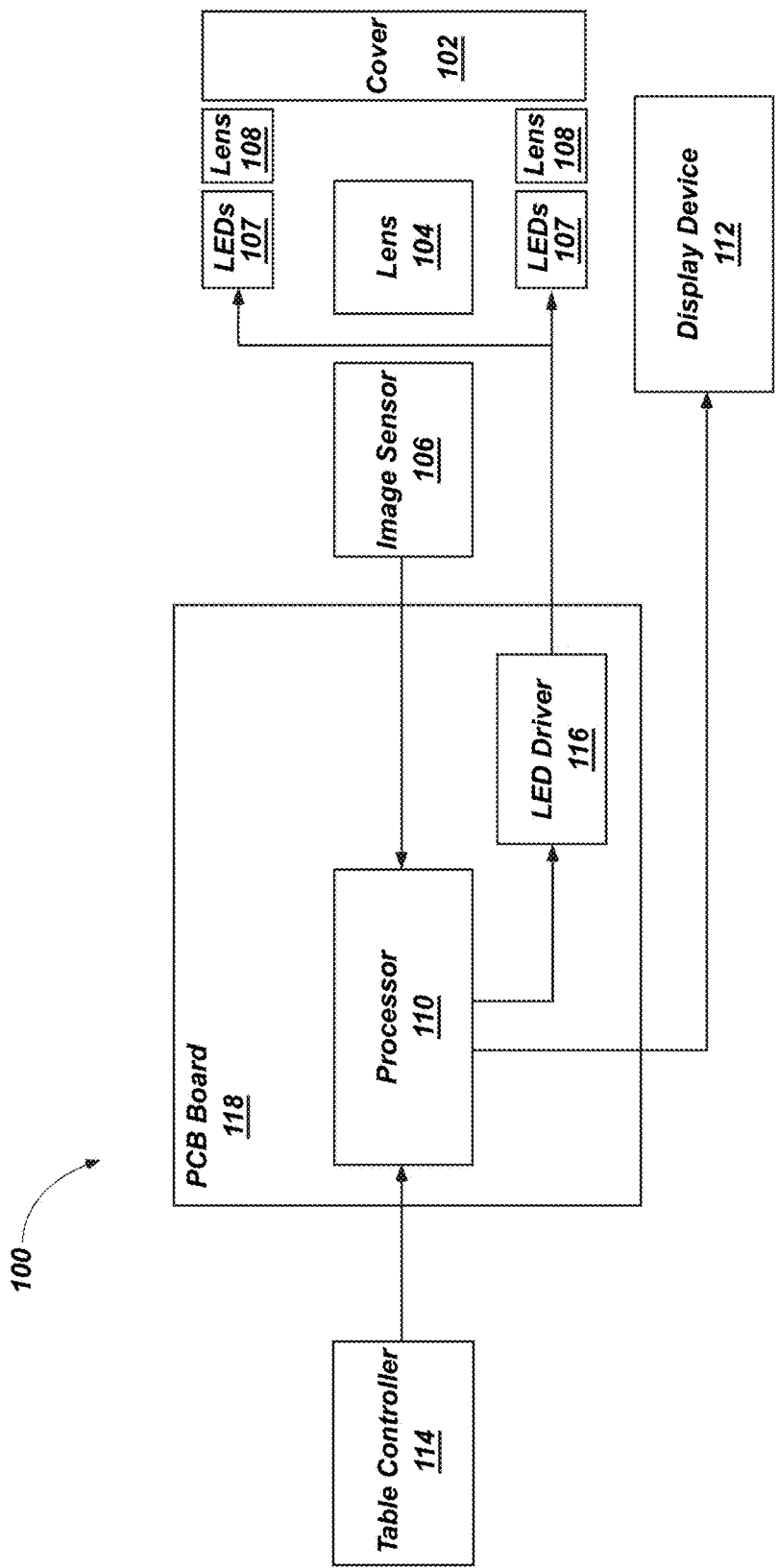
FIG. 1 is a simplified schematic diagram illustrating an embodiment of a bet sensor of the present disclosure.

In the following detailed description, reference is made to the accompanying drawings that form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a general-purpose computer because, absent the disclosure, the general-purpose computer would not be able to carry out the processes of the disclosure. The disclosure also provides meaningful limitations in one or more particular technical environments that go beyond an abstract idea. For example, embodiments of the disclosure provide improvements in the technical field of bet sensors, and other related technical fields. In particular, embodiments of the present disclosure may improve automated methods for determining a wager, such that the bet sensor device itself and any associated gaming table may be improved upon over conventional embodiments.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The efficiency of a gaming table may be increased by providing a means to measure wagers of varying amounts, while reducing the amount of time required to determine the value of wagers placed during betting games played at the table. The faster wager values are calculated, the faster games may be conducted, resulting in an increase in the amount of games played at the table and, correspondingly, the amount of money wagered. Bet sensors of the present disclosure may be used to register wagers made on the occurrence of certain events, such as bonus events that pay large jackpots. In one example, the bet sensor can be used to register a wager on one or more progressive jackpot events that may include additional fixed payouts and or odds payout amounts. For example, a game might pay 500:1 for a Royal Flush, and the amount on the meter for the same hand. The game rules may require the first $1.00 to fund the meter, and the rest of the wager to be made against the odds payout amounts. If, for example, the meter had 15K on it when a player makes a $5.00 variable bet wager, and the player obtains a royal flush, the player wins the 15K on the meter, plus 500:1 on the other $4.00 of the bet, or $2,000. It may be desirable for security reasons to provide a bet sensor that can register the bets automatically in order to assure that large jackpots are paid in the correct amounts to the players. Human table operators or dealers have limits on the speed with which they can manually determine the value of each wager placed during a betting game while also managing other aspects of the game. Bet sensors are disclosed herein that may be used to quickly determine the value of a wager placed in gaming tokens and, in some embodiments, to display the wager value to a player and/or a dealer. The bet sensor may include a mirror arrangement in proximity to a betting surface on which a stack of gaming tokens may be placed by a player. The mirror arrangement may direct a two-dimensional image of the entire circumference of the three-dimensional lateral side surface of the stack of gaming tokens onto an image sensor. A processor in communication with the image sensor may be configured under control of a computer program to perform one or more image processing methods to process the captured image and determine the value of each token in the stack of gaming tokens. As a result, the processor may be further configured to determine the sum value of the stack of gaming tokens.

As used herein, gaming tokens may include small disks used by a player of a wagering game in lieu of currency. Gaming tokens may also be referred to as "chips," "checks," or "cheques."

Hardware Environment

The following FIGS. 1 through 20 illustrate a hardware environment for a bet sensor and related methods according to embodiments of the disclosure. As a result, the specific configuration of the processor result in a new bet sensor as well as improvements to the technical field of bet sensing technology. In addition, the image processing operations generate new data (e.g., processed images) such that a transformation of image data occurs during the determination of a total wager value.

FIG. 1 is a simplified schematic diagram of a bet sensor 100 according to an embodiment of the present disclosure. The bet sensor 100 may include a transparent cover 102 in visual register with an optional lens 104. The transparent cover 102 may be embedded in, or otherwise disposed proximate a gaming table (not shown in FIG. 1) and may have a bet placement surface thereon that is configured to support a stack of gaming tokens 124 thereon. In other embodiments, the transparent cover 102 may be semi-transparent and may also serve as a video display, which is described in more detail below.

The bet sensor 100 may further include an image sensor 106 positioned to view the stack of gaming tokens 124 through the transparent cover 102 and the optional lens 104. An optional light source may be located proximate the transparent cover 102. The light source may comprise one or more light-emitting diodes (LEDs) 107 that are configured to illuminate the stack of gaming tokens to provide a satisfactory image of the stack of gaming tokens 124 to be acquired by the image sensor 106. One or more lenses 108 may be employed with the LEDs 107 to provide desired light emission qualities. It is to be appreciated, however, that the bet sensor 100 may be configured without the optional light source, wherein an image of the stack of gaming tokens 124 illuminated by ambient light may be transmitted to the image sensor 106.

The bet sensor 100 may further include a processor 110 operably coupled with the image sensor 106. The processor 110 may be configured (e.g., programmed) to determine the value of the stack of gaming tokens placed as a wager on the transparent cover 102 by performing one or more methods described herein using the image of the stack of gaming tokens 124 acquired using the image sensor 106. The processor 110 may also be operably coupled with a display device 112 configured to display the value of the wager to the player who placed the wager, to other players, to a table operator, or to any combination thereof. In some embodiments, the display device 112 may be part of the bet sensor 100. In some embodiments, the display device 112 may be external to the bet sensor 100. The processor 110 may additionally be operably coupled with a table controller 114 that is configured for use by the table operator.

The processor 110 may be operably coupled with an LED driver 116. The LED driver 116 may include a circuit configured to control operational aspects of the LEDs 107, including, by way of non-limiting example, on/off function, luminous intensity, color effects, fading, and pulse or strobe effects. In this manner, the processor 110 may control the LEDs 107 for purposes of illuminating the stack of gaming tokens, for conveying visible lighting effects or signals to players, or both. The processor 110 and the LED driver 116 may be located on a printed circuit board (PCB) 118, wherein electronic communication between the processor 110 and the LED driver 116 may be provided through traces, vias, interconnects, or any combination thereof, in and/or on the PCB 118.

In some embodiments, the image sensor 106 may comprise a complementary metal-oxide-semiconductor (CMOS) image sensor. The CMOS image sensor may be configured to generate image data in a color (e.g., RGB) format, black and white formats, and/or other formats. The image sensor 106 may be configured to capture and transmit an image of the circumference of the lateral side surface of the stack of gaming tokens, such as by using a video capture and output program in combination with a camera driver and media controller architecture. By way of non-limiting example, the image sensor 106 may be an Aptina sensor patched to run a Linux distribution operating system. The video capture and output program may be Video for Linux 2 (also known as "V4L2"). By way of non-limiting example, the processor 110 may include a BeagleBoard processing platform operating the V4L2 program, the camera driver, and the media controller architecture on Linux distribution. The camera driver may be configured to limit the output image to a region of interest containing substantially only the lateral side surface of the stack of gaming tokens. The media controller architecture configured as described above may output the image in a raw 12-bit BGGR Bayer format. The processor 110 may operate the V42L program and media controller to convert the 12-bit BGGR Bayer format image to a 12-bit RGB format image and further convert the 12-bit RGB format image into an 8-bit RGB format image. In some embodiments, the processor 110 may effectively synchronize the capture of images by the image sensor 106 with illumination of the lateral side surface of the stack of gaming tokens by identifying the illumination intensity of the captured images and deleting or otherwise removing those images having an illumination intensity falling below a predetermined threshold. The processor 110 may also control the image processing of the image data to correlate the acquired images with gaming tokens, manipulate the image data to better analyze the image data, and determine the values of the gaming tokens that are correlated with the image data.

Figure 2:
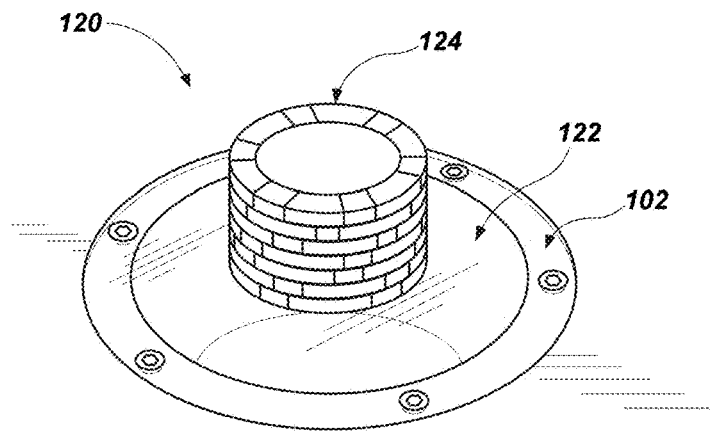
FIG. 2 is a perspective view of an illumination unit of the bet sensor schematically shown in FIG. 1.

FIG. 2 is an illumination unit 120 of the bet sensor 100 schematically shown in FIG. 1. The illumination unit 120 is used for supporting and illuminating a stack of gaming tokens 124 on the bet sensor 100. The illumination unit 120 may include the transparent cover 102, which has an upper bet placement surface 122 thereon. The bet placement surface 122 may be configured and oriented to support the stack of gaming tokens 124 thereon. The transparent cover 102 may comprise any material that is sufficiently transparent to allow an image of the stack of gaming tokens 124 to be acquired from an opposing side of the transparent cover 102 from the upper bet placement surface 122. For example, the transparent cover 102 may comprise a ceramic material (e.g., a glass) or a polymer material (e.g., plastic, epoxy, etc.). In some embodiments, the transparent cover 102 may be tinted to reduce visibility of components of the bet sensor 100 located beneath the transparent cover 102 by players. In other embodiments, the transparent cover 102 may be replaced by a transparent or semi-transparent display such as an Active Matrix Organic Light-Emitting Diode (AMO-LED). Thus, as used herein, the term "transparent" does not indicate or require transmissivity of all wavelengths of light, but only of those wavelengths required for operation of the bet sensor 100. For example, the transparent cover 102 may be configured to allow transmissivity of only certain wavelengths of light. In yet other embodiments, the transparent cover 102 may be configured to allow transmissivity of all wavelengths of visible light. In further embodiments, the transparent cover 102 may be fifty percent (50%) transparent, sixty percent (60%) transparent, seventy percent (70%) transparent, eighty percent (80%) transparent, ninety percent (90%) transparent, one hundred percent (100%) transparent, or any other degree of semi-transparency in regards to wavelengths of light required for operation of the bet sensor 100. The transparent cover 102 may have any suitable thickness. As a non-limiting example, the transparent cover 102 may have a thickness less than or equal to about 1.6 mm. In some embodiments, the transparent cover 102 may have a thickness between about 1.6 mm and 3.2 mm. In some embodiments, the transparent cover 102 may have a thickness greater than about 3.2 mm. The transparent cover 102 may be circular in shape, as shown in FIG. 2, although other shapes may be utilized, including, by way of non-limiting example, square, rectangular, triangular, elliptical, annular, or any other shape. In embodiments where a circular transparent cover 102 is used, the diameter of the transparent cover 102 may be about 76.2 mm, although a smaller or larger diameter is within the scope of the embodiments disclosed herein.

As discussed previously, the transparent cover 102 may be embedded in a gaming table, wherein the bet placement surface 122 is at least substantially flush with the top surface of the gaming table. In some embodiments, the transparent cover 102 may be located such that the bet placement surface 122 is positioned above or below the top surface of the gaming table. In some embodiments, the transparent cover 102 may be located separate from the gaming table. Moreover, it is to be appreciated that the bet sensor 100 may also be utilized in gaming applications without a gaming table.

Figure 3:
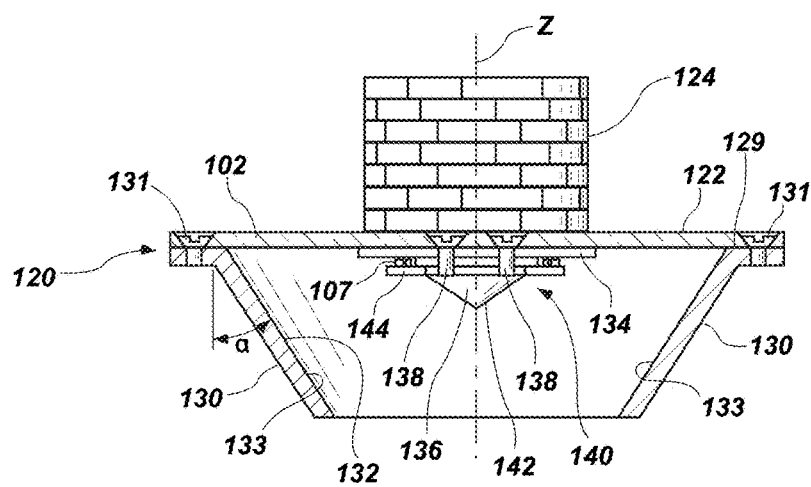
FIG. 3 is a side, partial cross-sectional view of the stack of gaming tokens and components of the bet sensor shown in FIGS. 1 and 2.
Figure 4:
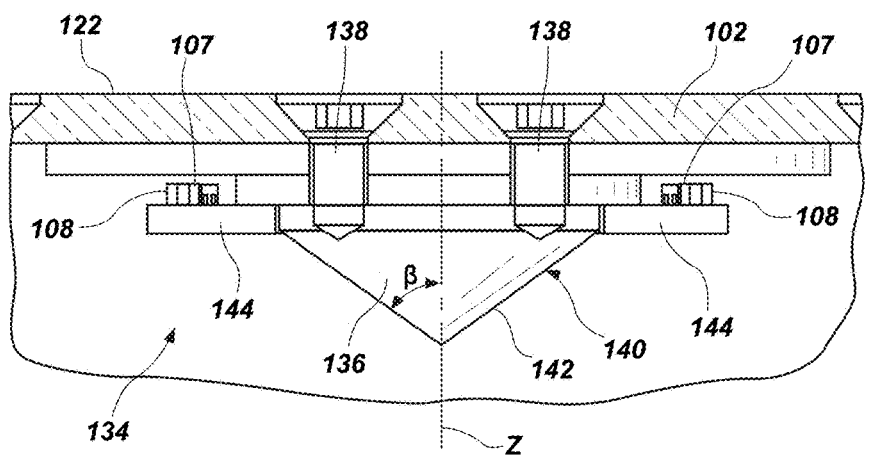
FIG. 4 is an enlarged view of components of the bet sensor of FIGS. 1 through 3.

FIG. 3 is a side, partial cross-sectional view of the illumination unit 120 of FIG. 2. FIG. 4 is an enlarged view of components of the illumination unit 120 of FIG. 3. The following description will refer to FIGS. 3 and 4 together. A stack of gaming tokens 124 is also shown as being supported on the bet placement surface 122 of the transparent cover 102. As shown, the transparent cover 102 may be joined to a top, planar surface 129 of a first reflective structure 130. The transparent cover 102 and the first reflective structure 130 may be joined by screws 131, as shown. In some embodiments, the transparent cover 102 and the first reflective structure 130 may be joined by bolts, clasps, adhesives, corresponding male and female mating components, threaded connections, other mechanical fasteners, etc. The first reflective structure 130 may comprise a frustoconical mirror having an inward-facing reflective surface 133. The inward-facing reflective surface 133 may comprise a thin, flexible reflective film, such as a commercially available folding mirror, affixed to an inner surface of the first reflective structure 130. Alternatively, the inward-facing reflective surface 133 may comprise a layer of reflective metal or metal alloy, such as silver, chrome, aluminum, etc., deposited on the inner surface of the first reflective structure 130. The layer of reflective metal or metal alloy may be polished and/or machined in some embodiments. In yet other embodiments, the inward-facing reflective surface 133 may comprise a reflective polymeric material deposited or otherwise provided on the inner surface of the first reflective structure 130. In still yet other embodiments, the first reflective structure 130 may be formed from a reflective metal, metal alloy, or polymeric material and the inner surface thereof may be polished to a desired level of reflectivity, or otherwise treated, to form the inward-facing reflective surface 133. It is to be appreciated that other types of reflective materials may be utilized to provide the inward-facing reflective surface 133. The inward-facing reflective surface 133 may be machined using a diamond turning process to a surface finish having an optical surface quality of about 60-40 scratch-dig and a surface accuracy of 1λ (λ=633.2 nanometers (nm)).

A hub structure 134 carrying a second reflective structure 136 may be centrally affixed to an underside of the transparent cover 102. The hub structure 134 may be affixed by screws 138 as depicted in FIG. 4; however, in some embodiments the hub structure 134 may be affixed to the transparent cover 102 by bolts, clasps, adhesives, corresponding male and female mating components, threaded connections, other mechanical fasteners, or any other means of attachment. In some embodiments, the transparent cover 102, the first reflective structure 130, and the hub structure 134 may each be removably snap-fit together to provide simple assembly and disassembly of the illumination unit 120. In still yet other embodiments, the transparent cover 102, the first reflective structure 130, and the hub structure 134 may be formed as a single, unitary structure in a process such as, by way of non-limiting example, injection molding or machining.

The second reflective structure 136 carried by the hub structure 134 may comprise a generally conical-shaped mirror 140 having an outward-facing (depicted in FIG. 3 as downward-facing) reflective surface 142. The conical-shaped mirror 140 may be concentrically and coaxially aligned with the frustoconical mirror 132 about central axis Z. The outward-facing reflective surface 142 of the second reflective structure 136 may comprise any of the materials previously described in relation to the inward-facing reflective surface 133 of the first reflective structure 130.

One or more printed circuit boards (PCBs) 144, each carrying one or more light sources in the form of, for example, LEDs 107 thereon, may be affixed to the hub structure 134. Each of the LEDs 107 may be configured as previously described with reference to FIG. 1. Each LED 107 may be oriented to emit light generally radially outward from the hub structure 134 toward the inward-facing reflective surface 133 of the frustoconical mirror 132. Each of the LEDs 107 may be located substantially on a common laterally-extending plane orthogonal to axis Z. The inward-facing reflective surface 133 may have an angle of inclination α relative to axis Z (FIG. 3), and the outward-facing reflective surface 142 may have an angle of inclination β relative to axis Z (FIG. 4). The angle of inclination α of the inward-facing reflective surface 133 is selected to cause light rays emitted from the LEDs 107 to reflect from the inward-facing reflective surface 133 toward and through the transparent cover 102 and onto a lateral side surface 146 of the stack of gaming tokens 124, thus illuminating the stack of gaming tokens 124. The angle of inclination α of the inward-facing reflective surface 133 relative to the Z axis may be in the range of about 0 degrees to about 85 degrees. In other embodiments, the angle of inclination α of the inward-facing reflective surface 133 relative to the Z axis may be in the range of about 15 degrees to about 60 degrees. In yet other embodiments, the angle of inclination α of the inward-facing reflective surface 133 relative to the Z axis may be in the range of about 30 degrees to about 40 degrees. By way of non-limiting example, the angle of inclination α of the inward-facing reflective surface 133 relative to the Z axis may be about 32.48 degrees. The angle of inclination β of the outward-facing reflective surface 142 relative to the Z axis may be in the range of about 15 degrees to about 85 degrees. In other embodiments, the angle of inclination β of the outward-facing reflective surface 142 relative to the Z axis may be in the range of about 30 degrees to about 70 degrees. In yet other embodiments, the angle of inclination β of the outward-facing reflective surface 142 relative to the Z axis may be in the range of about 50 degrees to about 60 degrees. By way of non-limiting example, the angle of inclination β of the outward-facing reflective surface 142 relative to the Z axis may be about 54.64 degrees. Refraction of the light rays may occur as they pass through the transparent cover 102. Such refraction may be accounted for when selecting the angle of inclination α of the inward-facing reflective surface 133 to ensure that the lateral side surface of the stack of gaming tokens 124 is illuminated by the light rays after they have reflected from the inward-facing reflective surface 133 and passed through the transparent cover 102. While FIGS. 3 and 4 show each LED 107 being mounted on a separate PCB, alternatively, all of the LEDs 107 may be mounted to a single PCB 144 attached to the hub structure 134. It is to be appreciated that in yet other embodiments, a plurality of PCBs 144 may be attached to the hub structure 134, wherein each of the plurality of PCBs 144 carries two or more LEDs 107.

Figure 5:
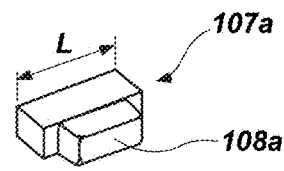
FIG. 5 is a perspective view of a light-emitting diode (LED) that may be used in a bet sensor as illustrated in FIGS. 1 through 4.

As shown in greater detail in FIGS. 4 and 5, each LED 107 may comprise a lens 108 or other optical component configured to provide desired light emission characteristics. The LEDs 107 may be selected based on performance characteristics, such as size, luminous intensity, emittable color spectrum, and pulse or strobe capabilities. Various LEDs suitable for use are commercially available. As a non-limiting example, the LED sold as model number LW V283 by Osram AG of Munich, Germany, may be used as a light source (e.g., the LEDs 107) in embodiments of bet sensors of the present disclosure, such as the bet sensor 100. The LEDs 107 may be relatively small. For example, FIG. 5 shows an LED 107a that may be used with the illumination unit 120. The LED 107a measures about 1.9 mm at its largest dimension, L, and includes a lens 108a for disbursing the light rays emitted by the LED 107a. As will be described in more detail below, the LEDs 107 may be controlled by the processor 110 (FIG. 1).

While FIGS. 3 and 4 show two (2) LEDs 107 mounted to the hub structure 134 on opposing sides thereof, it is to be appreciated that any number of LEDs 107 may be mounted to the hub structure 134 and oriented to emit light onto the inward-facing reflective surface 133 of the frustoconical mirror 132 to be subsequently reflected through the transparent cover 102 and onto the lateral side surface 146 of the stack of gaming tokens 124. For example, the illumination unit 120 may comprise three (3) LEDs 107 symmetrically mounted about the central axis Z along a circumference of the hub structure 134 and separated by intervals of about 120 degrees. In other embodiments, the illumination unit 120 may comprise four (4) LEDs 107 symmetrically mounted about the central axis Z along a circumference of the hub structure 134 and separated by intervals of about 90 degrees. In yet other embodiments, the illumination unit 120 may comprise five (5) or more (e.g., twelve (12)) LEDs 107, which may be symmetrically mounted around the central axis Z along a circumference of the hub structure 134 and separated by substantially equal angular segments.

The number and orientation of the LEDs 107 mounted to the hub structure 134 may be tailored to optimize the illumination of the lateral side surface 146 of the stack of gaming tokens 124. The upper limit on the number of LEDs 107 attached to the hub structure 134 may be determined by the size of the LEDs 107, the size of the PCBs 144, the size of the hub structure 134, and the resulting number of LEDs 107 that may fit on the PCBs 144 attached to the hub structure 134. It is to be appreciated that the LEDs 107 are not required to be oriented symmetrically about a circumference of the hub structure 134, but may alternatively be located asymmetrically about a circumference of the hub structure 134. Furthermore, the LEDs 107 are not all required to be located on the same laterally-extending plane orthogonal to axis Z. In additional embodiments (not shown), the hub structure 134 may comprise two (2) or more rows of LEDs 107 mounted thereon and oriented to emit light onto the inward-facing reflective surface 133 of the frustoconical mirror 132. In yet further embodiments, the LEDs 107 may be attached to the hub structure 134 in a random arrangement and oriented to emit light onto the inward-facing reflective surface 133 of the frustoconical mirror 132.

It is to be appreciated that in alternative embodiments, as previously described, the bet sensor 100 may operate on ambient light only. For example, in such embodiments, the LEDs 107 and PCBs 144 may be omitted from the structures shown in FIGS. 3 through 7, and ambient light rays reflected off the lateral side surface of the stack of gaming tokens may be reflected from the mirror arrangement onto the image sensor 106.

Figure 6:
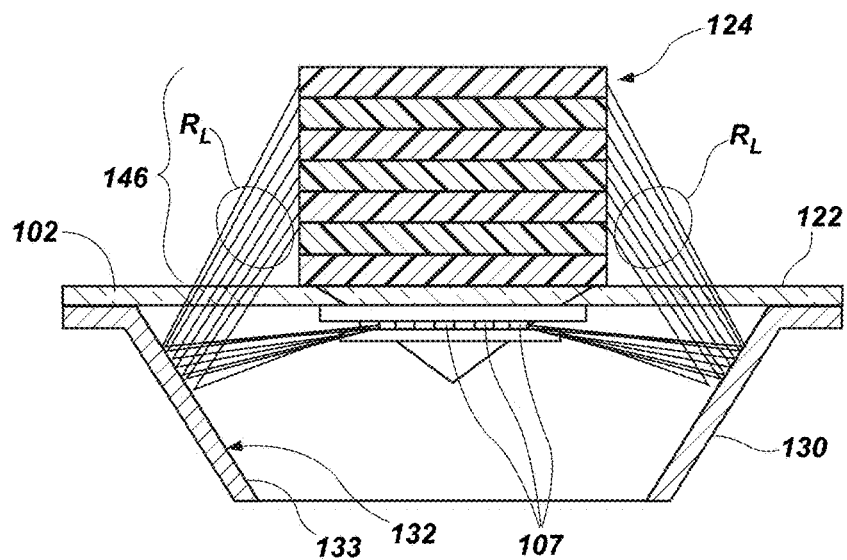
FIG. 6 is a side, cross-sectional view of components of the bet sensor shown in FIGS. 1 through 4 and illustrates illumination light rays being directed onto a stack of gaming tokens on the bet sensor.
Figure 7:
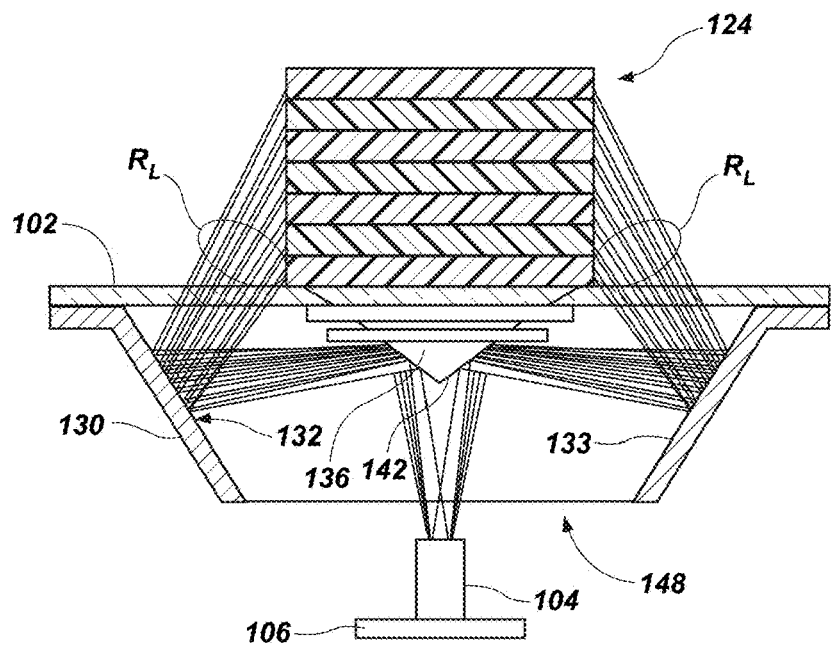
FIG. 7 is a side, cross-sectional view of components of the bet sensor shown in FIGS. 1 through 4 and illustrates image light rays being directed onto an image sensor from a stack of gaming tokens on the bet sensor.

FIG. 6 is a side, cross-sectional view of components of the bet sensor shown in FIGS. 1 through 4 and illustrates illumination light rays being directed onto a stack of gaming tokens on the bet sensor. FIG. 7 is a side, cross-sectional view of components of the bet sensor shown in FIGS. 1 through 4 and illustrates image light rays being directed onto an image sensor from a stack of gaming tokens on the bet sensor.

Referring now specifically to FIG. 7, an image sensor 106 for acquiring images of the lateral side surface 146 of the stack of gaming tokens 124 is illustrated according to an embodiment of the present disclosure. The mirror arrangement, which includes the first reflective structure 130 and the second reflective structure 136, is located and configured to direct an image of at least substantially an entire circumference of a lateral side surface of a stack of gaming tokens 124 supported on the bet placement surface 122 of the transparent cover 102 onto the image sensor 106. In other words, the first reflective structure 130 and the second reflective structure 136 are sized and arranged relative to one another such that light rays $R_L$, including ambient light rays and/or illumination light rays emitted by the optional LEDs 107, are reflected off the lateral side surface 146 of the stack of gaming tokens 124 through the transparent cover 102 toward the inward-facing reflective surface 133 of the first reflective structure 130. The light rays are reflected from the inward-facing reflective surface 133 of the first reflective structure 130 toward the outward-facing reflective surface 142 of the second reflective structure 136, from which the light rays are reflected onto the image sensor 106.

Figure 8:
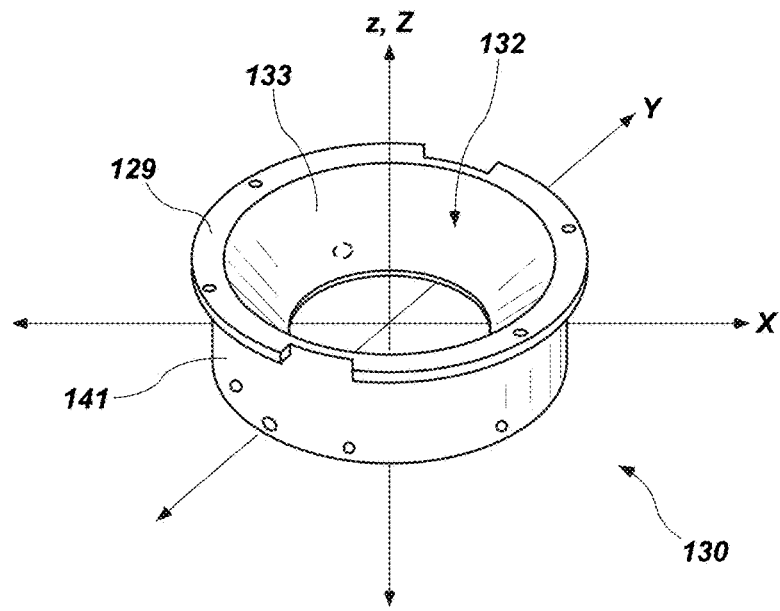
FIG. 8 is a perspective view of a reflective structure having an inward-facing reflective surface that may be used in a bet sensor.

In the embodiments shown in FIGS. 3, 4, 6 and 7, the inward-facing reflective surface 133 of the first reflective structure 130 and the outward-facing reflective surface 142 of the second reflective structure 136 may each have a linear cross-sectional profile. In other embodiments, as shown in FIGS. 8 through 13, the inward- and outward-facing reflective surfaces 133, 142 may each have an arcuate cross-sectional profile. FIG. 8 is a perspective view of the first reflective structure 130 according to such an embodiment. The first reflective structure 130 includes the inward-facing reflective surface 133 located radially inward of an outer, lateral side surface 141, both of which are concentric about longitudinal axis Z. The first reflective structure 130 also includes a top, planar surface 129 configured to abut the transparent cover 102.

Figure 9:
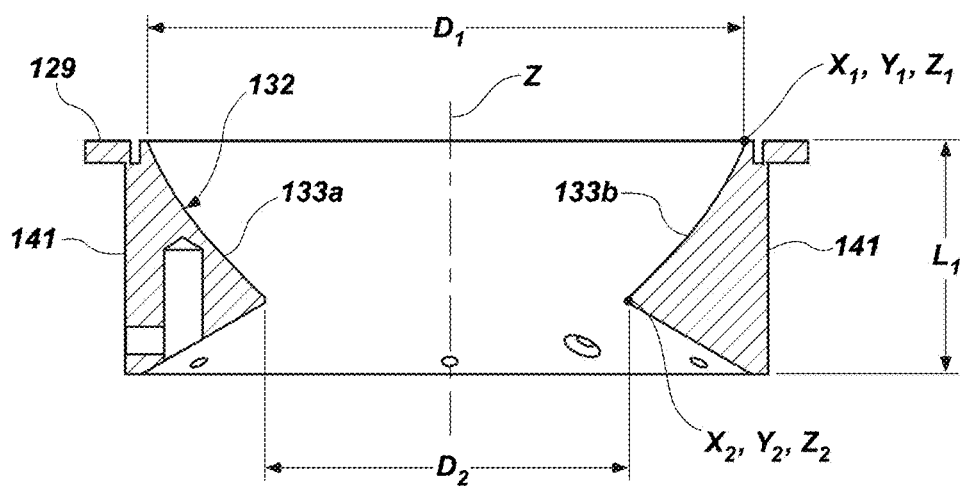
FIG. 9 is a side, cross-sectional view of the reflective structure shown in FIG. 8.

FIG. 9 is a side cross-sectional view of the first reflective structure 130 of FIG. 8 bisected by a plane containing the longitudinal axis Z of the first reflective structure 130. When the first reflective structure 130 is viewed in a side, cross-sectional view bisecting the first reflective structure 130 through the longitudinal axis Z, as shown in FIG. 9, the arcuate shape of directly opposing cross-sectional profiles 133a, 133b of the inward-facing reflective surface 133 may form a section of a prolate ellipse having its major axis coaxial with the longitudinal axis Z of the first reflective structure 130. In some such embodiments, the prolate ellipse formed by the directly opposing cross-sectional profiles 133a, 133b of the first reflective structure 130 may be defined by the parameters k and R, wherein k is the conic constant of the prolate ellipse and R, in a prolate ellipse, is the radius of the prolate ellipse at a point on the prolate ellipse coincident with the major axis of the prolate ellipse. It is to be appreciated that the conic constant k determines the shape of the prolate ellipse and R determines the relative size of the prolate ellipse. Moreover, the prolate ellipse defining the directly opposing cross-sectional profiles 133a, 133b of the inward-facing reflective surface 133 may be further defined by an equation $E_1$, expressed as $$Z = \frac{x^2 + y^2}{R + \sqrt{R^2 - (1+k)^2(x^2+y^2)}}, \tag{1}$$

wherein the parameters k and R are defined as previously described, and x, y, and z represent coordinates on a three-dimensional x, y, z Cartesian coordinate system, wherein the z axis is coaxial with the longitudinal axis Z of the first reflective structure and orthogonal to the plane formed by the x and y axes. In three-dimensional space, such as shown in FIG. 8, the shape of the inward-facing reflective surface 133 may be defined as a prolate spheroid formed by rotating the previously described prolate ellipse through an angle of 360 degrees about its major axis. Using the x, y, z coordinate system described above, any reference point on the inward-facing reflective surface 133 may be defined in three-dimensional space by its x, y and z coordinate, wherein the x, y coordinates together define the lateral distance from axis z (and longitudinal axis Z) to the inward-facing reflective surface 133, and the z coordinate defines the axial distance from the center of the prolate spheroid to the reference point. It is to be appreciated that, using equation $E_1$, the exact shape of the inward-facing reflective surface 133 may be defined. For example, if k and R are established (setting the shape and size, respectively, of the prolate spheroid, as previously described), and the z coordinate (the axial distance from the center of the prolate ellipse to the z coordinate along axis z) is established, the lateral distance (x, y) from the z axis (coaxial with longitudinal axis Z) to the inward-facing reflective surface 133 at the z coordinate can be calculated using equation $E_1$. Alternatively, so long as k and R are established, and the lateral distance (x, y) from the longitudinal axis Z to the inward-facing reflective surface 133 is established, the z coordinate corresponding to such lateral distance can be calculated using equation $E_1$.

Accordingly, in embodiments where the shape of the inward-facing reflective surface 133 is a prolate spheroid in three-dimensional space, the size and shape of the inward-facing reflective surface 133 may be adjusted by altering the variables of equation $E_1$. FIG. 9 is a non-limiting example of the inward-facing reflective surface 133 having a shape defined by a prolate spheroid, causing the shape of the cross-sectional profiles 133a, 133b of the inward-facing reflective surface 133 to be defined by a prolate ellipse. The prolate spheroid defining the shape of the inward-facing reflective surface 133 may have parameters of k=−0.5822 and R=25.6914 mm. The inward-facing reflective surface 133 may have a maximum diameter $D_1$ of about 62.1 mm at coordinate $(x_1, y_1, z_1)$, and may taper arcuately to a minimum diameter $D_2$ of about 41.7 mm at coordinate $(x_2, y_2, z_2)$. The axial distance $L_1$, measured along axis Z, between the maximum diameter $D_1$ and the minimum diameter $D_2$, of the inward-facing reflective surface 133 may be about 15.0 mm. It is to be appreciated that the maximum and minimum diameters $D_1$, $D_2$ may be adjusted to be greater or less than 62.1 mm and 41.7 mm, respectively.

As previously described, if the shape and size of the prolate spheroid defining the inward-facing reflective surface 133 are established (by k and R, respectively), the z coordinate of the prolate spheroid can be determined along any portion of the inward-facing reflective surface 133 for which the diameter is known, such as, for example, at the maximum diameter $D_1$ at coordinate $(x_1, y_1, z_1)$, at the minimum diameter $D_2$ at coordinate $(x_2, y_z, z_2)$, or at any point therebetween, using equation $E_1$ (note that in the two-dimension space of FIG. 9, one of the x and y coordinate would be the lateral distance between the longitudinal axis Z and the inward-facing reflective surface 133 and the other of the x and y coordinate would be zero).

Figure 10:
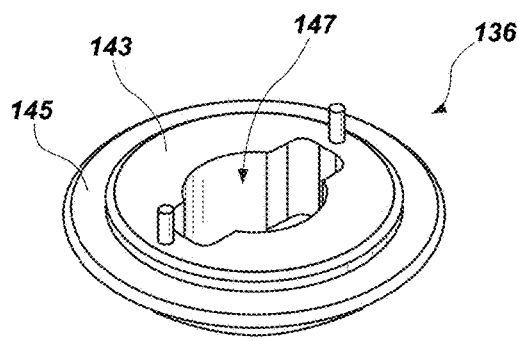
FIG. 10 is a perspective view showing a top surface of a reflective structure that may be used in a bet sensor with the reflective structure shown in FIGS. 8 and 9.
Figure 11:
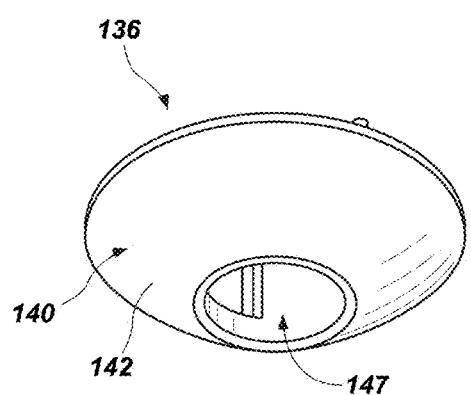
FIG. 11 is a perspective view showing a reflective surface of the reflective structure shown in FIG. 10.
Figure 12:
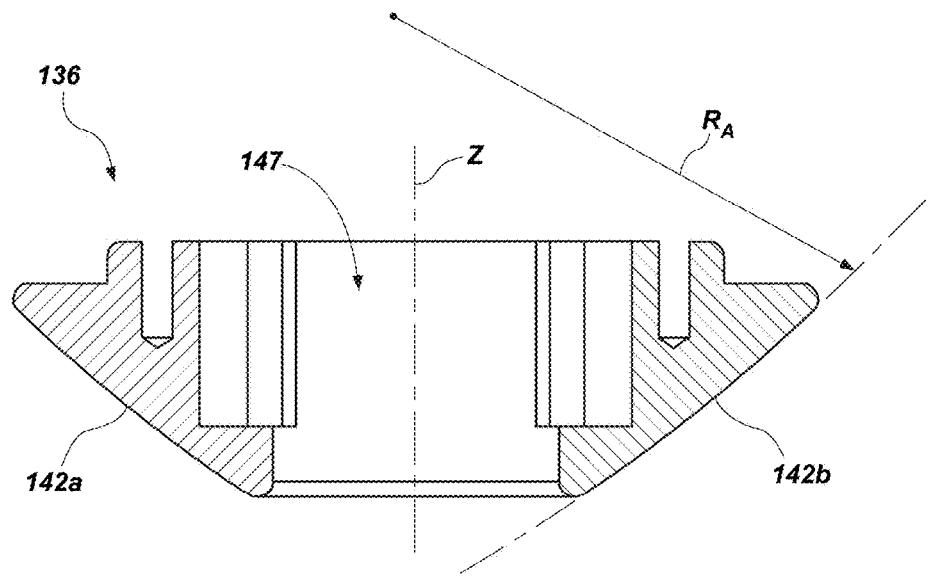
FIG. 12 is a side, cross-sectional view of the reflective structure shown in FIGS. 10 and 11.

FIGS. 10 through 12 show a second reflective structure 136 having an outward-facing reflective surface 142 with an arcuate profile that is configured for use in a mirror arrangement with the first reflective structure 130 shown in FIGS. 8 and 9. The second reflective structure 136 may include a top surface 143 and a recessed surface 145 surrounding a longitudinal aperture 147, wherein the longitudinal aperture 147 extends coaxial with longitudinal axis Z. The longitudinal aperture may be configured to allow the image sensor 106 to view at least a bottom portion of a bottom gaming token in a stack of gaming tokens. The top surface 143 of the second reflective structure 136 may be planar and may be configured to be centrally affixed to the underside of the transparent cover 102 in a manner to be co-planar with the top, planar surface 129 of the first reflective structure 130. In embodiments wherein the top surface 143 of the second reflective structure 136 is centrally affixed to the underside of the transparent cover 102, the second reflective structure 136 may form the hub structure 134 previously described. In embodiments wherein the second reflective structure 136 forms the hub structure 134, one or more PCBs 144 carrying optional LEDs 107 may be mounted to the recessed surface 145 of the second reflective structure 136.

FIG. 12 is a side, cross-sectional view of the second reflective structure 136 of FIGS. 10 and 11 bisected by a plane containing the longitudinal axis Z of the second reflective structure 136. The outward-facing reflective surface 142 of the second reflective structure 136 may extend 360 degrees around the longitudinal axis Z of the second reflective structure 136 and may face the inward-facing reflective surface 133 of the first reflective structure 130. As shown more clearly in FIG. 12, the outward-facing reflective surface 142 may have opposing, convex, arcuate cross-sectional profiles 142a, 142b. By way of non-limiting example, in embodiments wherein the opposing cross-sectional profiles 133a, 133b of the inward-facing reflective surface 133 are shaped as a segment of a prolate ellipse, as shown in FIGS. 8 and 9, each directly opposing cross-sectional profile 142a, 142b of the outward-facing reflective surface 142 may extend in an arc with a single radius $R_4$. By way of a further non-limiting example, if the opposing cross-sectional profiles 133a, 133b of the inward-facing reflective surface 133 are defined, as previously described, by a prolate ellipse with k=−0.5822 and R=25.6914, wherein the maximum and minimum diameters $D_1$, $D_2$ of the inward-facing reflective surface 133 are about 62.1 mm and about 41.7 mm, respectively, the outward-facing reflective surface 142 may taper arcuately from a maximum diameter $D_3$ of about 24.9 mm to a minimum diameter $D_4$ of about 9.0 mm along the opposing arcuate cross-sectional profiles 142a, 142b, wherein each cross-sectional profile 142a, 142b has a radius $R_4$ of about 53.0 mm.

It is to be appreciated that the inward-facing reflective surface 133 of the first reflective structure 130 and the outward-facing reflective surface 142 of the second reflective structure 136 may be respectively sized, shaped, configured and oriented in any manner to direct an image of the lateral side surface 146 of the stack of gaming tokens 124 onto the image sensor 106. For example, in alternative embodiments, the cross-sectional profiles 133a, 133b of the inward-facing reflective surface 133 of the first reflective structure 130 may be shaped as a section of a circle, oblate ellipse, parabola, hyperbola or any other shape sufficient to allow operability of the bet sensor 100. The inward-facing reflective surface 133 may have a maximum diameter $D_1$ in the range of about 40.0 mm to about 250.0 mm, and may taper, linearly or arcuately, to a minimum diameter $D_2$ in the range of about 10.0 mm to about 100.0 mm. The inward-facing reflective surface 133 may have an axial distance $L_1$ in the range of about 5.0 mm to about 50.0 mm as measured along the longitudinal axis Z, between surfaces of the inward-facing reflective surface 133 at the maximum and minimum diameters $D_1$, $D_2$. The outward-facing reflective surface 142 may have a maximum diameter $D_3$ in the range of about 5.0 mm to about 100.0 mm, and may taper, linearly or arcuately, to a minimum diameter $D_4$ in the range of about 0.0 mm to about 4.0 mm. The cross-sectional profiles 142a, 142b of the outward-facing reflective surface 142 may be shaped as a section of a circle, ellipse, parabola, hyperbola, or any other shape sufficient to allow operability of the bet sensor 100. In embodiments where the shape of the cross-sectional profiles of the inward- and outward-facing reflective surfaces 133, 142 are defined by a portion of a conic section, such as a circle, ellipse, parabola or hyperbola, the shape-imparting conic section may be defined by a conic constant k in the range of about −8.0 to 2.0 and R in the range of about 10.0 mm to about 300.0 mm.

Figure 13:
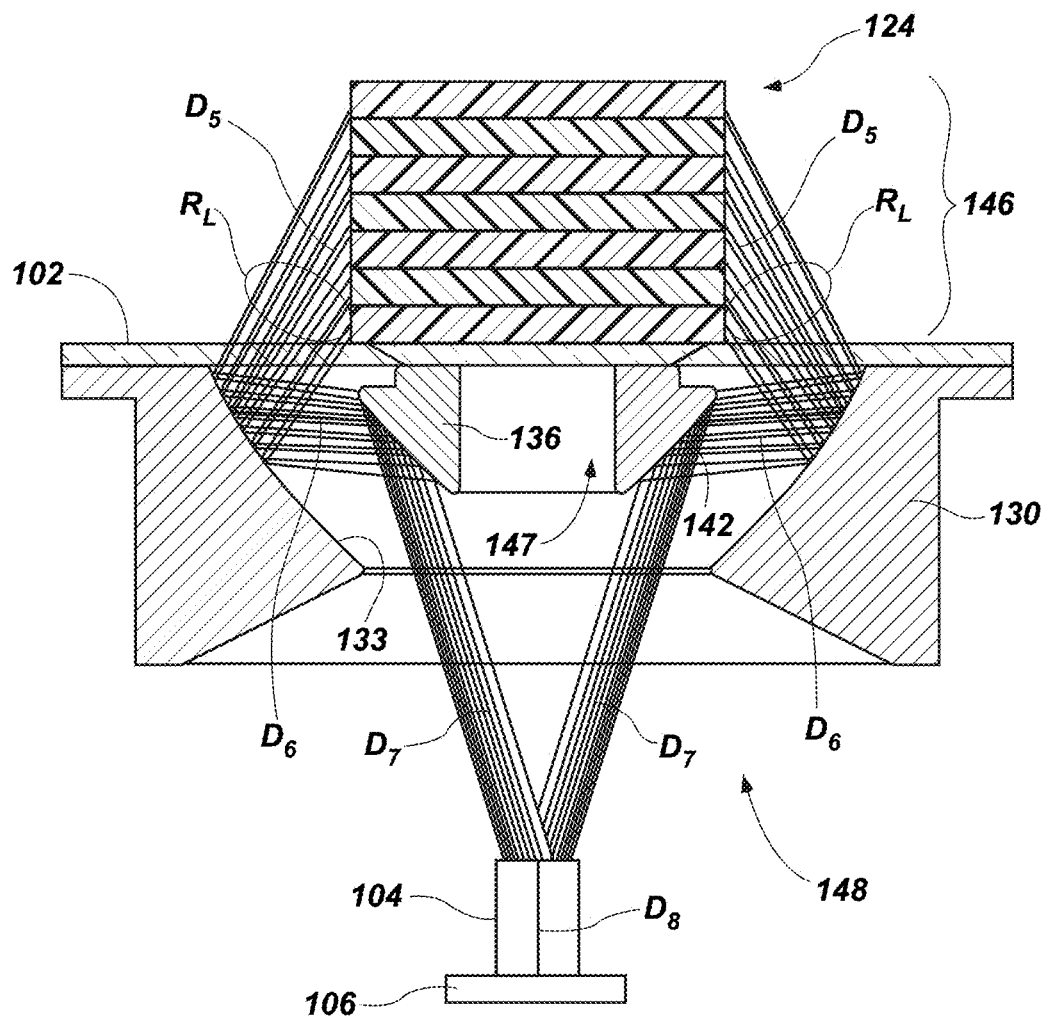
FIG. 13 is a side, cross-sectional view of components of a bet sensor including the reflective structures shown in FIGS. 8 through 12, further depicting image light rays being directed onto an image sensor from a stack of gaming tokens on the bet sensor.

FIG. 13 is a cross-sectional view of a mirror arrangement including the first reflective structure 130 shown in FIGS. 8 and 9 and the second reflective structure 136 shown in FIGS. 10 through 12. Similar to the manner described above in reference to FIG. 7, the first and second reflective structures 130, 136 shown in FIG. 13 are sized and arranged relative to one another such that light rays $R_L$, including ambient light rays and/or illumination light rays emitted by the optional LEDs 107, are reflected off the lateral side surface 146 of the stack of gaming tokens 124 through the transparent cover 102 toward the inward-facing reflective surface 133 of the first reflective structure 130. The light rays are reflected from the inward-facing reflective surface 133 of the first reflective structure 130 toward the outward-facing reflective surface 142 of the second reflective structure 136, from which the light rays are reflected onto the image sensor 106. The average light ray travel distance between two components of the bet sensor 100 may be defined as the average distance a light ray may travel between the two respective components of the bet sensor 100 in a plane bisecting the concentrically-aligned inward- and outward-facing reflective surfaces 133, 142 and containing the longitudinal axis Z thereof.

The average light ray travel distance may be determined using light ray tracer software to plot a dispersion of light rays $R_L$ reflected off the lateral side surface 146 of the stack of gaming tokens 124 through the transparent cover 102 toward the inward-facing reflective surface 133 and reflected therefrom onto the outward-facing reflective surface 142. After the dispersion of light rays $R_L$ is plotted, the average travel distance of the light rays $R_L$ in the dispersion of light rays may be calculated between two components of the bet sensor. In the embodiment of FIG. 13, the mirror arrangement may be sized, configured and oriented to provide an average light ray travel distance $D_5$ between the lateral side surface 146 of the stack of gaming tokens 124 and the inward-facing reflective surface 133 of about 26.4 mm and an average light ray travel distance $D_6$ between the inward-facing reflective surface 133 and the outward-facing reflective surface 142 of about 17.2 mm when the inward- and outward-facing reflective surfaces 133, 142 are respectively sized, configured and oriented as previously described in reference to FIG. 12. Alternatively, the mirror arrangement may be sized, configured and oriented to provide an average light ray travel distance $D_5$ between the lateral side surface 146 of the stack of gaming tokens 124 and the inward-facing reflective surface 133 in the range of about 15.0 mm to about 110.0 mm and an average light ray travel distance $D_6$ between the inward-facing reflective surface 133 and the outward-facing reflective surface 142 in the range of about 5.0 mm to about 100.0 mm.

Referring now to FIGS. 7 and 13, an optional lens 104 or other optical components may be located between the second reflective structure 136 and the image sensor 106 and may be configured to focus or otherwise manipulate the light rays impinging on the image sensor 106 and forming an image of the stack of gaming tokens 124. The lens 104 may comprise what is referred to in the art as a "micro video lens." In other embodiments, the lens 104 may comprise what is referred to as a "folding lens." The lens 104 may be selected based on minimum requirements of modulation transfer function (MTF) and distortion. It is to be appreciated that in some embodiments, the lens 104 may be omitted and the image may be reflected from the second reflective structure 136 directly onto the image sensor 106. In embodiments where a lens 104 is utilized, an average light ray travel distance $D_7$ between the outward-facing reflective surface 142 of the second reflective structure 136 and the lens 104 may be about 16.6 mm, while an average light ray travel distance $D_8$ between the lens 104 and the image sensor 106 may be about 10.2 mm. In other embodiments, the average light ray travel distance $D_7$ between the outward-facing reflective surface 142 and the lens 104 may be in the range of about 7.0 mm and about 60.0 mm, while the average light ray travel distance $D_8$ between the lens 104 and the image sensor 106 may be in the range of about 5.0 mm and 50.0 mm.

The configuration of each of the first and second reflective structures 130, 136 having a respective reflective surface 133, 142 extending substantially entirely around a respective circumference of each of the reflective structures 130, 136 provides a two-dimensional image on the image sensor 106 representing a 360 degree view of the entire circumference of the lateral side surface of the stack of gaming tokens 124 on the bet placement surface 122 of the transparent cover 102. Such an image may be referred to in the art as a "pericentric" or "hypercentric" image. Such an image may also be referred to as a "radial" format. In this manner, the image sensor 106 may capture a two-dimensional image representing a 360 degree view of the entire circumference of the three-dimensional lateral side surface 146 of the stack of gaming tokens 124, as shown in FIG. 14A.

Figure 14:
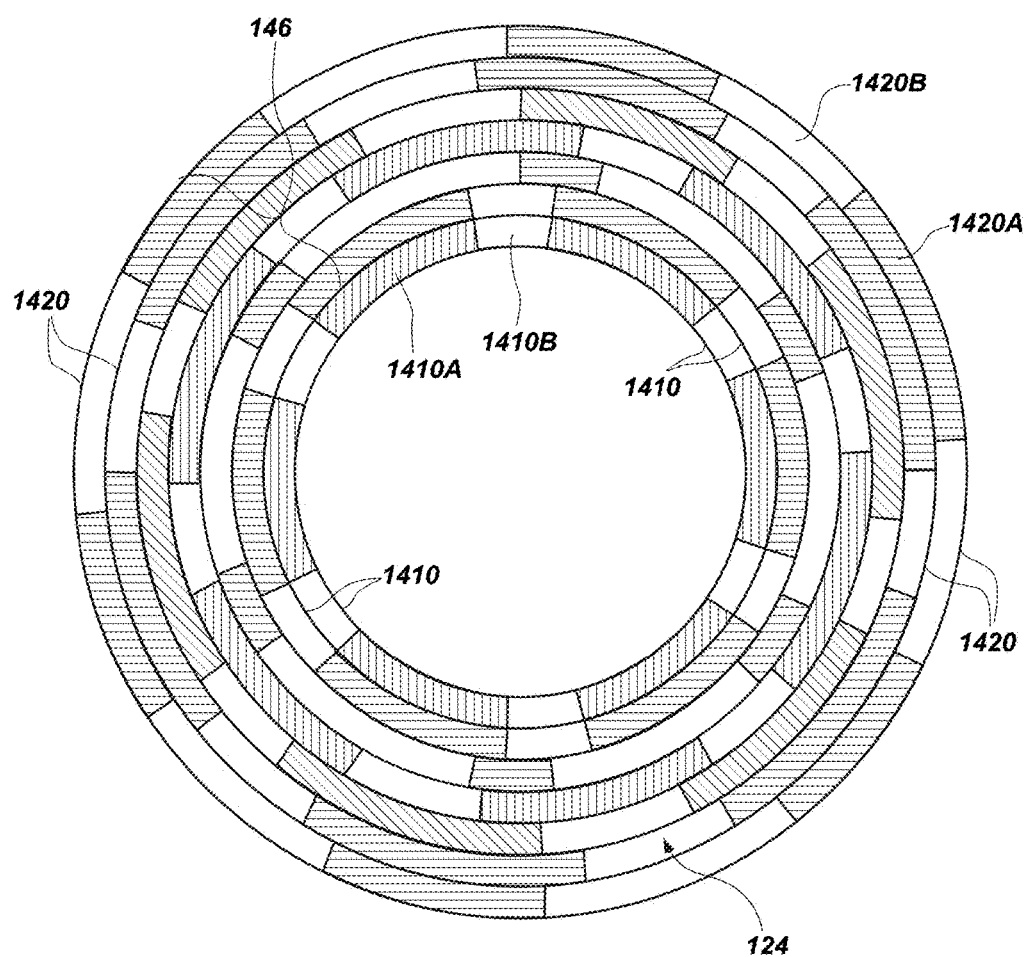
FIG. 14 is a plan view of a two-dimensional image of the three-dimensional lateral side surface of a stack of gaming tokens supported on the bet sensor that may be acquired by using a bet sensor as described with reference to FIGS. 1 through 13.

FIG. 14 is a plan view of a two-dimensional image of the three-dimensional lateral side surface of a stack of gaming tokens supported on the bet sensor that may be acquired by using a bet sensor as described with reference to FIGS. 1 through 13.

In the pericentric image of the stack of gaming tokens 124 as shown in FIG. 14, the lateral side surface of each gaming token is depicted in a radial format (e.g., as an annular shape). Each of the annular shapes representing the lateral side surfaces of the different gaming tokens may be concentrically located relative to one another in the pericentric image when the tokens are vertically aligned. The annular shapes in the image that are closer to the center of the image may correspond to lateral side surfaces of gaming tokens at the bottom of the stack, while the annular shapes in the image that are closer to the outer radial periphery of the image may correspond to lateral side surfaces of gaming tokens at the top of the stack. For example, a first annular shape 1410 may correspond to the lateral side surface of the bottom gaming token of the stack, and a second annular shape 1420 may correspond to the lateral side surface of the top gaming token of the stack. The other annular shapes therebetween (not numbered) may correspond to the lateral side surfaces of the other gaming tokens of the stack.

The annular shapes may also have regions that correspond to designs on the lateral side surface of the gaming tokens. The processor 110 may analyze the content of these regions to indicate the value of the gaming token as different gaming tokens may have different designs on the lateral side surface. The different designs may include being different colors. For example, the first annular shape 1410 may include a first region 1410A having a first color (e.g., yellow) and a second region 1410B having a second color (e.g., blue). The second annular shape 1420 may include a first region 1420A having a first color (e.g., purple) and a second region 1420B having a second color (e.g., blue). The order of the transitions between the different regions may be referred to herein as a pattern. For example, even though the corresponding gaming tokens both may have a blue region, the other colors (e.g., yellow, purple) on the gaming token may form a different pattern than is used to distinguish between gaming tokens. Thus, the first annular shape 1410 and the second annular shape 1420 may correspond to different gaming tokens, and therefore, different values. Of course some wagers may include gaming tokens of the same value within the same stack.

Figure 15:
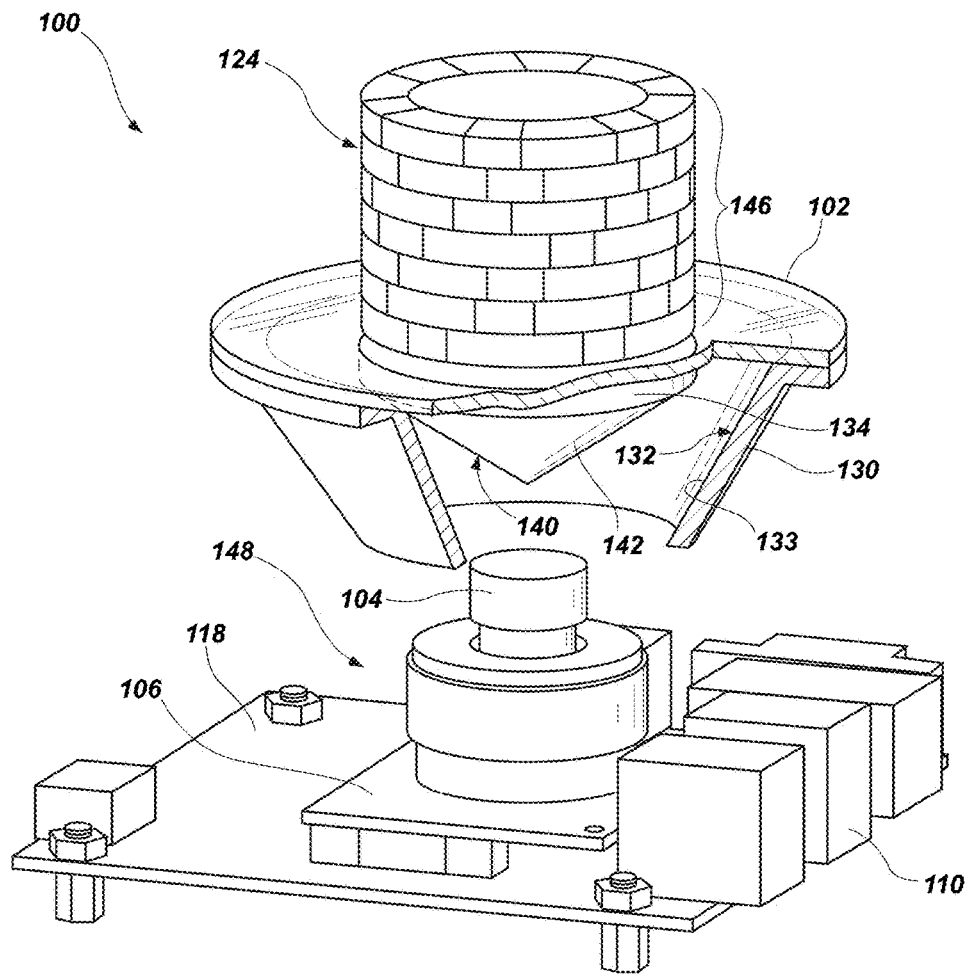
FIG. 15 is a partially cut-away perspective view of components of a bet sensor as described with reference to FIGS. 1 through 7.

As shown in FIG. 15, the image sensor 106 may be part of an image sensor module 148 comprising a printed circuit board 118 to which the image sensor 106 is mounted. The lens 104 may mounted to the image sensor 106 on the image sensor module 148. In some embodiments, the processor 110 of the bet sensor 100 may be mounted to the image sensor unit, as shown in FIG. 15.

The image sensor 106 may be selected based on performance factors including cost, resolution, light sensitivity, and ease of integration with the processor 110. Because most gaming tokens may be uniquely identifiable according to token color and markings on the lateral side of the token, the illumination unit 120 (FIGS. 2 and 3) and the image sensor module 148, including the image sensor 106, may be optimized to meet a basic minimum standard for image quality sufficient to allow the processor 110 to accurately recognize the color and general patterns of substantially the entire circumference of the lateral side surface of each token in the stack of gaming tokens 124. By way of non-limiting example, the image sensor 106 may be one of a model OV9715, a model OV10620, or a model OV3642 CMOS image sensor commercially available from OmniVision Technologies Inc., of Santa Clara, Calif. By way of further non-limiting example, the image sensor 106 may be one of a model MT9V024, a model MT9D131, or a model MT9V032 CMOS image sensor commercially available from Aptina Imaging Corp., of San Jose, Calif.

Window imaging techniques may be used in connection with the image sensor 106. For example, various window imaging sizes on the image sensor 106 may be selectively used to capture images of substantially the entire circumference of the lateral side surface 146 of the stack of gaming tokens 124. In some embodiments, a 32 mm window diameter may be utilized in the CMOS image sensor 106. In other embodiments, a 62 mm window diameter may be utilized in the CMOS image sensor 106. In yet other embodiments, a 75 mm window diameter may be utilized in the CMOS image sensor 106. In still yet other embodiments, a window diameter greater than 75 mm may be utilized in the CMOS image sensor 106. In other embodiments, other image sensors may be utilized, such as, by way of a non-limiting example, charge-coupled device (CCD) image sensors. It is to be appreciated that any type or model of image sensor capable of capturing an image of the lateral side surface of a stack of gaming tokens is within the scope of the embodiments disclosed herein.

As described previously in reference to FIG. 1, the image sensor 106 may be in electronic communication with the processor 110. The processor 110 may be located on the PCB 118 proximate the image sensor module 148. The image sensor 106 is also operatively coupled to the PCB 118 and may communicate electronically with the processor 110 through conductive vias, traces, interconnects, or a combination thereof. In other embodiments, a wire or cable may extend from the image sensor 106 directly to the processor 110. For example, an Ethernet cable or a cable extending between corresponding USB ports on or communicating with the image sensor 106 and the processor 110, respectively, may extend between and provide communication between the processor 110 and the image sensor 106. Alternatively, a wire or cable may extend from the image sensor 106 to an intermediate component on the PCB. In yet other embodiments, the image sensor 106 may communicate wirelessly with the processor 110.

In addition to controlling the LEDs 107 of the illumination unit 120 (FIGS. 2 and 3), the processor 110 may be configured under control of a computer program to control the image sensor 106 to capture images of the stack of gaming tokens 124 and transmit the images to the processor 110. The processor 110 may be configured under control of a computer program to perform one or more operations using the acquired image(s) of the stack of gaming tokens 124 and to determine a sum value of the stack of gaming tokens 124 supported on the bet placement surface 122 of the transparent cover 102. For example, the processor 110 may be configured to perform at least two functions in the processing of images of a stack of gaming tokens 124: token pattern calibration and token pattern detection. As previously described, the value of a single gaming token may be determined by recognizing the color and spatial patterns or markings on the lateral side surface of the token. In other embodiments, the value may be determined by color alone, markings alone or patterns alone.

The pattern calibration methods may enable a user to store in the processor memory a reference image of an entire circumference of a lateral side surface of each unique token in a set of gaming tokens. The reference image may be an image captured by the image sensor 106 of a unique token, or "reference token," placed on the bet placement surface 122 of the bet sensor 100 and illuminated by the illumination unit 120, as previously described. The processor 110 may be configured to convert the 360 degree view of the entire circumference of the lateral side surface of the reference token into an image showing a linear depiction, which may also be characterized herein as a linear format, a linearly formatted image or a linear layer, of the entire circumference of the lateral side surface of the reference token. Once the image is converted into a linear depiction in such a manner, the processor 110 may apply an edge detection filter on the reference image to identify the edges of the depicted reference token. After the edges of the reference token are identified, the processor 110 may examine the areas of the token internal to the edges to identify qualities of the patterns in these areas, such as the color and size of the patterns. To do so, at least one line having a plurality of reference points may be projected through the linear depiction of the entire circumference of the lateral side surface of the reference token. The processor 110 may be configured to then identify the color intensity at each reference point on each line extending through the entire circumference of the lateral side surface of the reference token for each of the red, green and blue colors on a red blue green (RGB) color scale. After the processor 110 has identified the color intensity for each color on the RGB scale at each reference point on the line, a reference graph may be plotted and stored in the processor memory charting the color intensity for each color on the RGB scale at each reference point on the line. The processor 110 may correlate the reference graph with a unique token value previously input by an operator of the bet sensor during setup. In one embodiment, multiple lines are drawn through the pericentric image, and each line intersects a center point of the pericentric image. Histograms of the RGB values may be analyzed to locate the boundaries between tokens and determine the number of tokens in the stack.

The token pattern detection methods may enable wager images comprising captured images of gaming tokens 124 placed by a player as part of a bet to be compared with the reference images for each token stored in the processor memory. As previously described, the image sensor 106 may transmit wager images to the processor 110. The wager images may be continuously streamed from the image sensor 106 to the processor 110 and subsequently captured by the processor 110, or, alternatively, the wager images may be captured by the image sensor 106 and transmitted to the processor 110. The wager images may be stored in the processor memory while the processor 110 performs one or more methods to determine the value of the stack of gaming tokens 124 depicted in the wager images. The processor 110 may perform methods to convert the 360 degree view of the entire circumference of the lateral side surface of the stack of gaming tokens 124 in the wager image into an image showing a linear depiction of the entire circumference of the lateral side surface of the stack of gaming tokens 124. Once the image is converted into a linear depiction in such a manner, the processor 110 may apply an edge detection filter on the image data to identify the edges of each of the depicted tokens in the stack of gaming tokens 124. After the edges of the tokens are identified, the processor 110 may examine the areas of the tokens internal to the edges to identify qualities of the patterns in these areas, such as the color and size of the patterns. To do so, at least one line having a plurality of reference points may be projected through the linear depiction of the entire circumference of the lateral side surface of each token in the wager image, according to the manner previously described with respect to the reference image, to obtain a token graph charting the color intensity for each color on the RGB scale at each reference point on the line for each token in the wager image. Subsequently, the processor may compare the token graph for each token in the wager image to each reference graph stored in the processor memory until the processor identifies the stored reference graph having RGB color intensity characteristics most closely corresponding to each token graph. The processor 110 may then add the unique token values derived for each token in the wager image to calculate a sum wager value of the stack of gaming tokens 124 depicted in the wager image. It is to be appreciated that such operations performed by the processor 110 to obtain token graphs for each token in a wager image will result in a high degree of accuracy regardless of whether the stack of gaming tokens 124 wagered by a player is illuminated by the illumination unit 120 or by ambient light only.

The processor 110 may possess the computing power to perform the necessary computations to determine the value of the stack of gaming tokens 124 in about ten (10) seconds or less. In some embodiments, the processor 110 may possess the computing power to perform the necessary computations to determine the value of the stack of gaming tokens 124 in about one (1) second or less. In further embodiments, the processor may possess the computing power to perform the necessary computations to determine the value of the stack of gaming tokens 124 in about 0.5 second or less. In yet further embodiments, the processor may possess the computing power to perform the necessary computations to determine the value of the stack of gaming tokens 124 in about 0.1 second or less. The processor 110 may be capable of supporting software development tools and providing ease of integration with the image sensor 106. For example, the processor 110 may be what is referred to in the art as an "ARM" based processor, such as, by way of non-limiting example, an open multimedia applications platform (OMAP) processor produced by Texas Instruments of Dallas, Tex., a Sitara microprocessor produced by Texas Instruments, or a S3C6410 model mobile processor produced by Samsung of Seoul, Korea. However, it is to be appreciated that any processor or combination of processors capable of performing the token recognition functions described above is within the scope of the embodiments disclosed herein.

As previously described with reference to FIG. 1, the processor 110 may be in electronic communication with the display device 112 for displaying the wager value to a player and/or operator of a wagering game. The display device 112 may be a liquid crystal display (LCD), such as a 1 line by 8 character (1×8) LCD or a 2 line by 8 character (2×8) LCD, either of which may optionally include a backlight. Alternatively, the display device 112 may include LEDs, organic LEDs (OLEDs), AMOLEDs, thin-film transistors (TFTs), a graphic LCD, or any combination thereof. In yet other embodiments, the display device 112 may comprise transparent LCD digital signage. As used herein, the term "transparent LCD digital signage" means and refers to a device comprising an LCD display embedded within a transparent or semi-transparent material. For example, in such embodiments, the transparent cover 102, or a portion thereof, may be integrated with an LCD display to form the display device 112 having transparent LCD digital signage, wherein the LCD display is configured to project static images, dynamic images, or any combination thereof on a surface of the transparent cover 102 that is visible by a player. In other words, the display device 112 may comprise at least a portion of the transparent cover 102, wherein the at least a portion of the transparent cover 102 is configured to display information visible to the player. For example, such information may include the wager value of the stack of gaming tokens 124. In such embodiments, the transparent cover 102 may be transparent or semi-transparent to visible light. The display device 112 configured to include transparent LCD digital signage may be in electronic communication with the processor 110, as previously described, wherein the images displayed on the display device are controlled by the processor 110. By way of a non-limiting example, the display device 112 configured to include transparent LCD digital signage may be a STA1713 model transparent LCD digital signage, produced by LiteMax Electronics, Inc. of New Taipei, Taiwan. It is to be appreciated that any device for displaying the wager value to a player and/or operator of the game is within the scope of the embodiments disclosed herein.

The bet sensor 100 may also be capable of communicating other information to a player of the game. For example, in addition to illuminating the stack of gaming tokens 124, the LEDs 107 may also be utilized as an indicator light system to communicate information to a player and/or operator of the game responsive to a state of the game. For example, a casino may wish to limit the duration during which a player may place a wager or indicate a player who has won a game. In some embodiments, the bet sensor 100, including the LEDs 107, the first reflective structure 130, and the transparent cover 102, may be configured to provide indicator light signals to a player of the game. In some embodiments, additional LEDs 107 of varying light color emissions may be used to, for example, signal an approached end of a period for wager placement, to indicate the end of such period, to indicate a winner of a round of a game, or all of the foregoing. In other embodiments, LEDs 107 may be strobed in different patterns to indicate one or more of the foregoing game-associated events. In any such embodiments, the bet sensor 100 may include at least one optical element that is configured to transmit visible light emitted by the LEDs 107 or another indicator light to a player and/or operator of the game.

Figure 16:
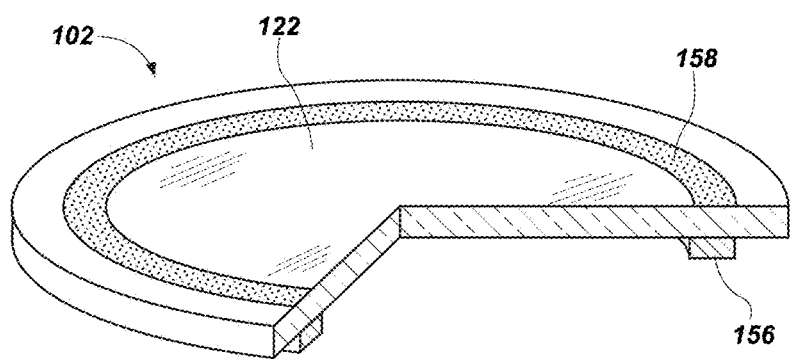
FIG. 16 is a partially cut-away perspective view of a transparent cover that includes a feature configured to direct visible light signals to a player, and that may be employed in a bet sensor as described with reference to FIGS. 1 through 15.

For example, a light guide element 156 optionally may be located on an underside of the transparent cover 102, as illustrated in FIG. 16. The light guide element 156 may have an annular configuration and may be concentrically aligned with the hub structure 134. The light guide element 156 may comprise a portion of the transparent cover 102 or may comprise a separate structure affixed to the transparent cover 102. In embodiments in which the light guide element 156 is a separate structure attached to the transparent cover 102, the attachment of the light guide element 156 to the transparent cover 102 may be accomplished by a mechanical fastener, an adhesive, or other means of attachment. The light guide element 156 may be configured to channel light emitted from the LEDs 107 and transmit the channeled light in an even dispersion through a portion of the transparent cover 102 adjacent the light guide element 156. A portion of the top surface of the transparent cover 102 positioned above the light guide element 156 may comprise an optical surface element 158 configured to increase visibility of the light transmitted through the light guide element 156. The optical surface element 158 may comprise a textured or "frosted" diffuser portion of the top surface of the transparent cover 102 and may be configured to transmit an even dispersion of light in a ring configuration corresponding to the light guide element 156. The frosted diffuser portion of the transparent cover 102 may be formed by an etching process, including, by way of non-limiting example, a mechanical etching process, a chemical etching process, a laser etching process, a grinding process, or other processes known in the art. Thus, the processor 110 may control the LEDs 107 to emit light in cooperation with the light guide element 156, the transparent cover 102, and the optical surface element 158 to provide lighting effect signals for communicating information to a player. For example, when the bet sensor is in a mode to attract players, the processor 110 may control the LEDs 107 to cause the optical surface element 158 to blink in a uniform manner. When the bet sensor is in a mode to indicate a live betting, the processor 110 may control the LEDs 107 to cause the optical surface element 158 to transmit a solid ring of color. When the bet sensor is in a payout mode, the processor 110 may control the LEDs 107 to cause the optical surface element 158 to transmit lights effectively running around the circumference of the optical surface element 158, also known as "chase lights." As noted above, the lighting signals may include emission of different colors of light to represent different signals. For example, a green light may indicate that a wager may be placed, while a red light may indicate that a wager may not be placed.

In embodiments in which the display device 112 comprises the transparent cover 102 configured with transparent LCD digital signage, the display device 112 may also be used as an indicator light system similar to that previously described. In such embodiments, the display device 112 may be controlled by the processor 110 to communicate information to a player responsive to a state of the game. In addition to displaying a wager value to a player, the display device 112 configured with transparent LCD digital signage may be configured to display, by way of non-limiting example, a dynamic countdown encouraging a player to place a wager within a predetermined time, an indication of the status of the game being played, a dynamic or static image indicating which game is being played, advertisements, or any other information a gaming institution wishes to communicate to a player.

Figure 17:
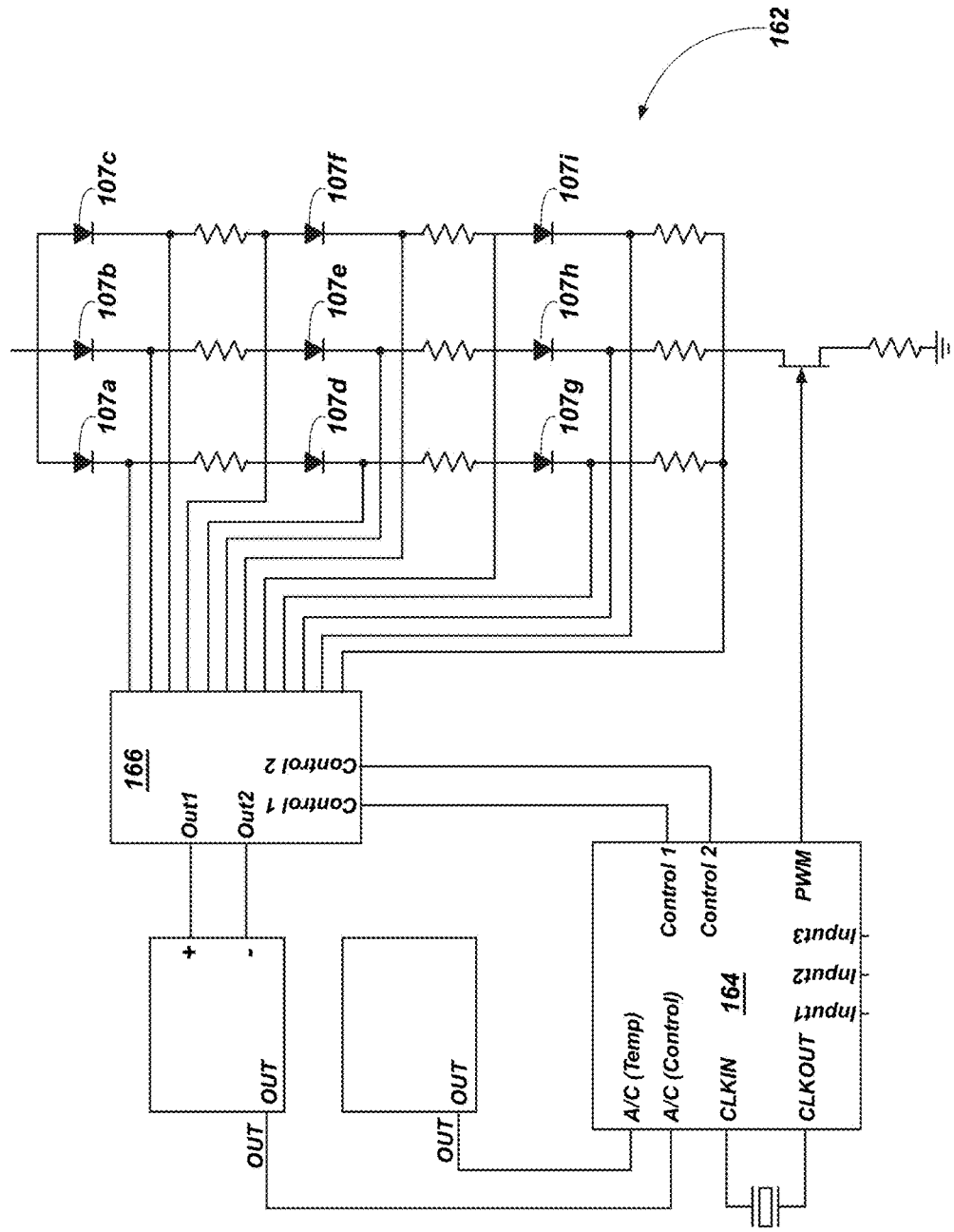
FIG. 17 is a circuit diagram for a light-emitting diode (LED) driver that may be employed in a bet sensor as described with reference to FIGS. 1 through 16.

FIG. 17 illustrates a non-limiting example of a circuit that may be used in the LED driver 116 of FIG. 1. As shown in FIG. 1, the LED driver 116 may comprise a drive circuit 162 that may be used to allow the processor 110 to control the LEDs 107 for both illuminating the stack of gaming tokens 124 and for providing indicator lighting effects to a player. The drive circuit 162 may comprise a pulse-width modulation (PWM) multiplexed circuit including a microcontroller 164, such as what is referred to in the art as a "PIC" microcontroller, configured to transform a command signal from the processor 110 into a plurality of command signals. The plurality of command signals may include at least one unique command signal for each LED 107 of the plurality of LEDs. The drive circuit 162 is illustrated as having a set of nine (9) LEDs 107a-107i connected thereto; however, it is to be understood that any number of LEDs may be connected to the drive circuit 162, including each LED 107 of the illumination unit 120. A multiplexer 166 may be electronically interposed between the microcontroller and each of the LEDs 107, and may direct each individual command signal from the microcontroller 164 to a specific LED 107. In this manner, the function of each LED 107 may be controlled by the processor, including color, intensity, fading, and strobe or pulse effects, to create a desired overall lighting effect for illuminating the stack of gaming tokens 124 or communicating information to a player.

As previously described with reference to FIG. 1, the processor 110 may be in electronic communication with a table controller 114. For example, a wire or cable may extend from the processor 110 (or the image sensor module 148) to the table controller 114, such as an Ethernet or USB cable. Alternatively, the table controller 114 may communicate wirelessly with the processor 110. The table controller 114 may be a PC-based computer platform with a display screen for displaying the wager value transmitted from the processor 110 to a table operator. The table controller 114 may include a user interface configured to allow the table operator to accept, reject, or correct the wager value. The table controller 114 may comprise an override function allowing the table operator to input a corrected wager value, wherein the corrected wager value may be transmitted from the table controller 114 to the processor 110 and subsequently displayed by the display device 112. The table controller 114 may also be configured to allow the table operator to communicate various signals to a player of the game through the indicator light system described above. For example, the table operator may select a signal command output from a list of signal command outputs stored in the table controller 114. The table controller 114 may subsequently transmit the signal command to the processor 110. The processor 110 may then transmit the signal command to the LED driver 116, wherein the LED driver 116 may process the signal command to control the LEDs 107, as previously described.

In some embodiments, the bet sensor 100 may comprise a modular configuration for ease of assembly. For example, as described above, the transparent cover 102, the first reflective structure 130, and the hub structure 134 may each be removably coupled together to provide simple assembly and disassembly of the illumination unit 120. Additionally, the optional lens 104 may be removably coupled to the image sensor 106. The image sensor 106 may be removably coupled with the processor 110, and the processor 110 may be removably coupled with the table controller 114. The removable attachment of these components may allow for ease of assembly and interchangeability of these components. Bet sensors 100 of the present invention may be connected in series to a processor as described in co-pending U.S. patent application Ser. No. 12/946,814, filed Nov. 5, 2010, and entitled "Wager Recognition System," the disclosure of which is incorporated herein in its entirety by this reference.

Figure 18:
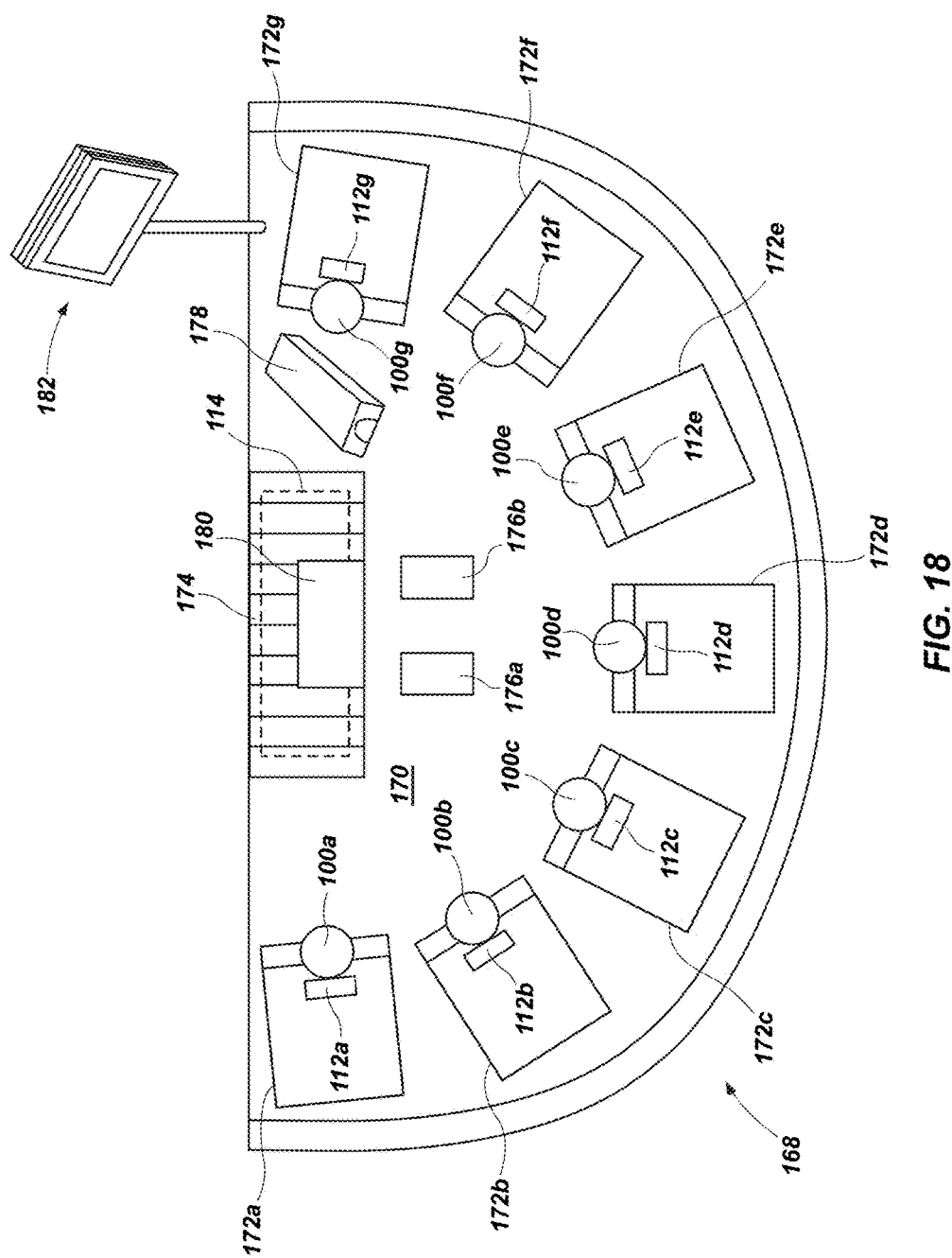
FIG. 18 is top plan view of an embodiment of a gaming table of the present disclosure, which includes a plurality of bet sensors as described with reference to FIGS. 1 through 17.

FIG. 18 illustrates an embodiment of a gaming table 168 of the present disclosure, which includes a table having an upper playing surface 170 and a plurality of apertures, each of which apertures extends through the upper surface of the table proximate each of a plurality of corresponding player positions 172a-172g at the table. The gaming table 168 further includes bet sensors 100 as described herein mounted to the table proximate, or, in some embodiments, within, the apertures extending through the upper surface of the table. For example, each bet sensor 100 may be mounted to the table 168 such that the transparent cover 102 is disposed in and covers the associated aperture. The upper betting surface 122 of the transparent cover 102 may be at least substantially flush with the upper playing surface 170 of the table 168.

A table controller 114 may be operatively coupled to the plurality of bet sensors 100. Each player position 172a-172g may include a bet sensor 100a-100g and a display device 112a-112g, each of which may be configured as previously described herein. The processor 110 (not shown in FIG. 18) of each bet sensor 100a-100g may be in electronic communication with the table controller 114, as previously described. The table 168 may further include additional features, such as a dealer chip tray 174, which may be used by the dealer to cash players in and out of the wagering game. For embodiments using physical cards 176a, 176b, the table 168 may further include a card handling device 178 that may be configured to shuffle, read, and deliver physical cards for the dealer and players to use during game play or, alternatively, a card shoe configured to read and deliver cards that have already been randomized. For embodiments using virtual cards, such virtual cards may be displayed on a display screen (not shown) at each of the individual player positions 172a-172g. Common virtual cards may be displayed in a common card area (not shown). The table controller 114 may further include an interface 180, which may include touch screen controls for assisting the dealer in administering the wagering game. The table 168 may further include an upright display 182 configured to display images that depict game information such as pay tables, hand counts, historical win/loss information by player, and a wide variety of other information considered useful to the players. The upright display 182 may be double sided to provide such information to players as well as to a casino pit. It is to be appreciated that the bet sensors 100a-100g may have a modular configuration to provide ease of integration with the gaming table 168.

Figure 19:
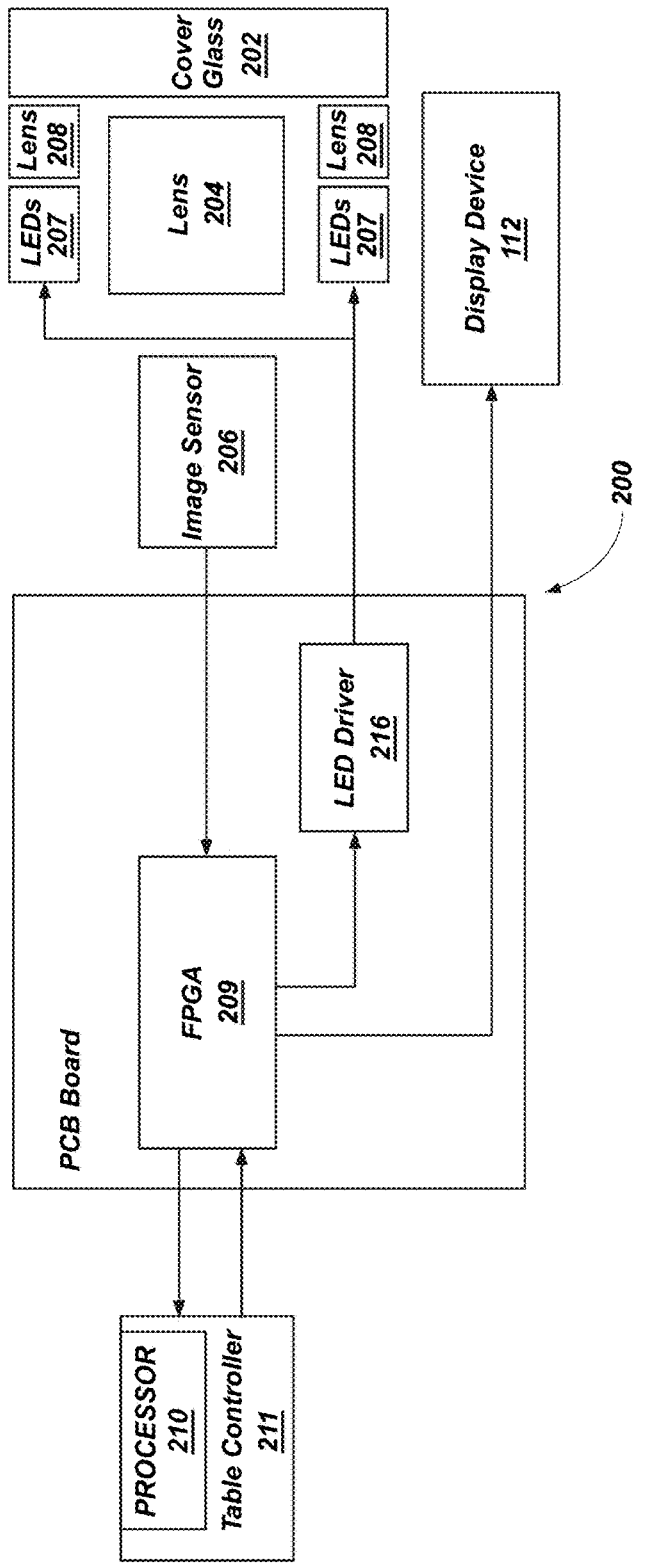
FIG. 19 is a simplified schematic diagram illustrating another embodiment of a bet sensor of the present disclosure.

In other embodiments, at least a majority of the image processing and computations may be performed by the table controller instead of by each individual bet sensor. Referring now to FIG. 19, a simplified schematic diagram of another embodiment of a bet sensor 200 is illustrated. The bet sensor 200 may be generally configured as described previously in reference to FIG. 1, and may include a transparent cover 202 in visual register with a lens 204. The transparent cover 202 may be embedded in a gaming table and may be configured to receive a stack of gaming tokens thereon. An image sensor 206 may be positioned to view the stack of gaming tokens through the transparent cover 202 and the lens 204. Proximate the transparent cover 202 may be located one or more light-emitting diodes (LEDs) 207 configured for illuminating the stack of gaming tokens to provide a satisfactory image of the stack viewable by the image sensor 206. Each of the LEDs 207 may be configured with a lens 208 to provide desired light emission qualities. The image sensor 206 may be in electronic communication with a field programmable gated array (FPGA) 209 configured to capture images from the image sensor 206 and transmit the images to a processor 210 located in a table controller 211. In alternative embodiments, any image processor may be utilized in place of the FPGA 209.

As previously described, the table controller 211 may be a personal computer (PC) based computing platform, and, in the embodiment illustrated in FIG. 19, the processor 210 may be located on the table controller 211. The processor 210 may be configured to receive a stream of captured images of the stack of gaming tokens from the FPGA 209 and to process the images to calculate the values of the stack of tokens depicted therein. The processing operations performed by the processor 210 to determine the wager values may be performed as previously described herein. After the processor 210 has determined a wager value of a stack of gaming tokens, the processor 210 may display the wager value on a screen of a user interface of the table controller 211. The user interface may be configured to allow a table operator to accept, reject, or correct the wager value. The table controller 211 may comprise an override function allowing the table operator to input a corrected wager value. The processor 210 may be configured to transmit a display signal comprising the wager value to the FGPA 209. After receiving the display signal from the processor 210, the FGPA 209 may transmit the display signal to a display device 212. The display device 212 may be configured to display the wager value to the player who placed the wager, to other players, to a table operator, or to any combination thereof. The display device 212 may be configured as previously described herein.

An LED driver 216 may be electronically interposed between the FGPA 209 and the LEDs 207. As previously described herein, the processor 210 may be configured to control the lighting effects of the LEDs 207 for illuminating the stack of gaming tokens and for communicating information to players. To control the LEDs 207, the processor 210 may transmit lighting command signals to the FPGA 209, which may transmit the lighting command signals to the LED driver 216. The LED driver 216 may be configured as previously described herein, and may process the lighting command signals as previously described. The FPGA 209 and at least the LED driver 216 may be located on a printed circuit board (PCB) 218, and electronic communication between the FPGA 209 and the LED driver 216 may be provided through conductive traces, vias and interconnects in the PCB 218, as is known in the art.

Additionally, the table controller 211 may be configured to enable the table operator to communicate various signals to a player of the game through the indicator light system described above. As previously described, the computer program and/or table operator may select a lighting command signal output from a list of lighting commands stored in the table controller 114. Furthermore, the table controller 211 may be integrated with a plurality of bet sensors 200 embedded in a gaming table, wherein the table controller 211, including the processor 210, may be configured to operate each bet sensor 200 of the plurality of bet sensors 200. In some embodiments, the table controller 211 may be integrated with up to seven (7) bet sensors 200 embedded in a gaming table. It is to be appreciated that any number of bet sensors 200, including more than seven (7), may be integrated with the table controller 211.

Figure 20:
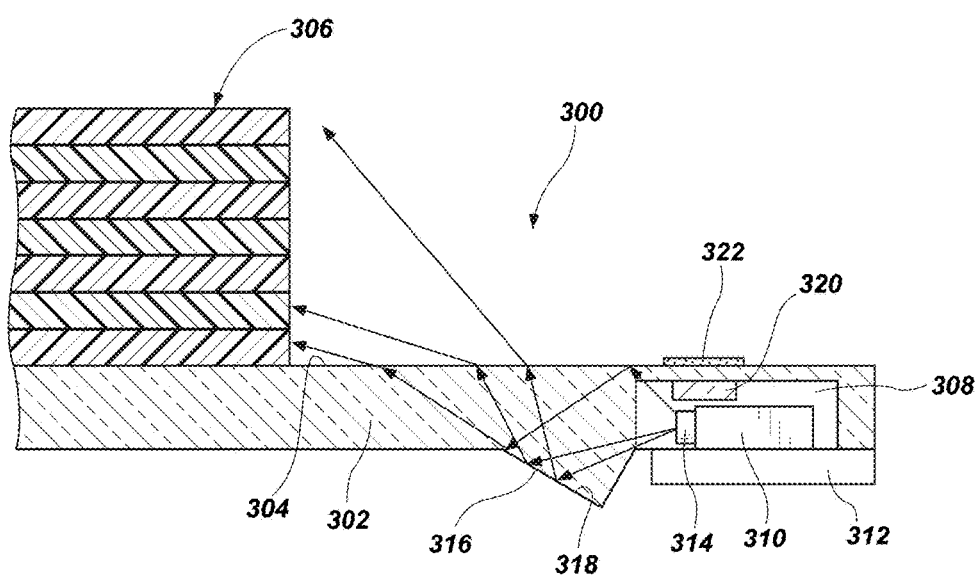
FIG. 20 is a side, partial cross-sectional view of components that may be employed in additional embodiments of bet sensors as described herein.

Referring now to FIG. 20, an embodiment of another suitable location for the LEDs is illustrated. An illumination unit 300 may be generally configured as described above with reference to FIGS. 2 through 6, including a transparent cover 302 having a bet placement surface 304 for supporting a stack of gaming tokens 306 thereon. The cover glass may define an annular recess 308 on an underside of the transparent cover 302. One or more LEDs 310 may be positioned on a PCB 312, wherein at least part of the LED 310 is located within the annular recess 308. The LEDs 310 may be of any of the types previously described, and each may be configured to emit light through an LED lens 314 and toward the stack of gaming tokens 306. The transparent cover 302 may be configured to internally reflect a majority of the light rays emitted by the LEDs 310. A bottom surface of the transparent cover 302 may define a frustoconical portion 316 adjacent a conformal reflective surface 318 configured to eject internally reflected light rays out of the transparent cover 302 and onto the stack of gaming tokens 306.

Additionally, the transparent cover 302 and LEDs 310 may be configured to provide indicator light signals to a player of the game, as previously described. A light guide element 320 may be located in the annular recess 308 above the one or more LEDs 310 and on an underside of the transparent cover 302. The light guide element 320 may have a continuous annular configuration. The light guide element 320 may be configured to collect light emitted from the LEDs 310 and transmit the collected light in an even dispersion through a portion of the transparent cover 302 corresponding to the light guide element 320. Additionally, a portion of the top surface of the transparent cover 302 positioned above the light guide element 320 may comprise a surface element 322 configured to increase visibility of the light transmitted through the light guide element 320 and the transparent cover 302. The surface element 322 may comprise a textured, or "frosted," diffuser portion of the top surface of the cover glass. The textured diffuser portion may be configured to transmit an evenly-dispersed ring of light to a player. As previously described, the LEDs 310 may be controlled by the processor 110 to emit light in cooperation with the light guide element 320, the transparent cover 302, and the surface element 322 to provide multicolored lighting effect signals for communicating information to a player.

Embodiments of the present disclosure may determine the values of gaming tokens that may be placed in a stack on a bet sensor. Images of the gaming tokens may be captured and analyzed to identify patterns on the lateral side surfaces of the gaming tokens. In particular, the processor 110 may process the image data to correlate the acquired images with gaming tokens. For example, the processor may manipulate the image data identify boundaries in the in the image data that correspond to individual tokens. In addition, the content of the image data within these boundaries may be analyzed, and the values of the gaming tokens that are correlated with the image data may be determined. As a result, the total wager amount may be determined by adding the values of each gaming token. The total wager amount may be displayed individuals associated with the wagering game (e.g., players, dealer, casino personnel, etc.).

Detection of Gaming Tokens

Figure 21:
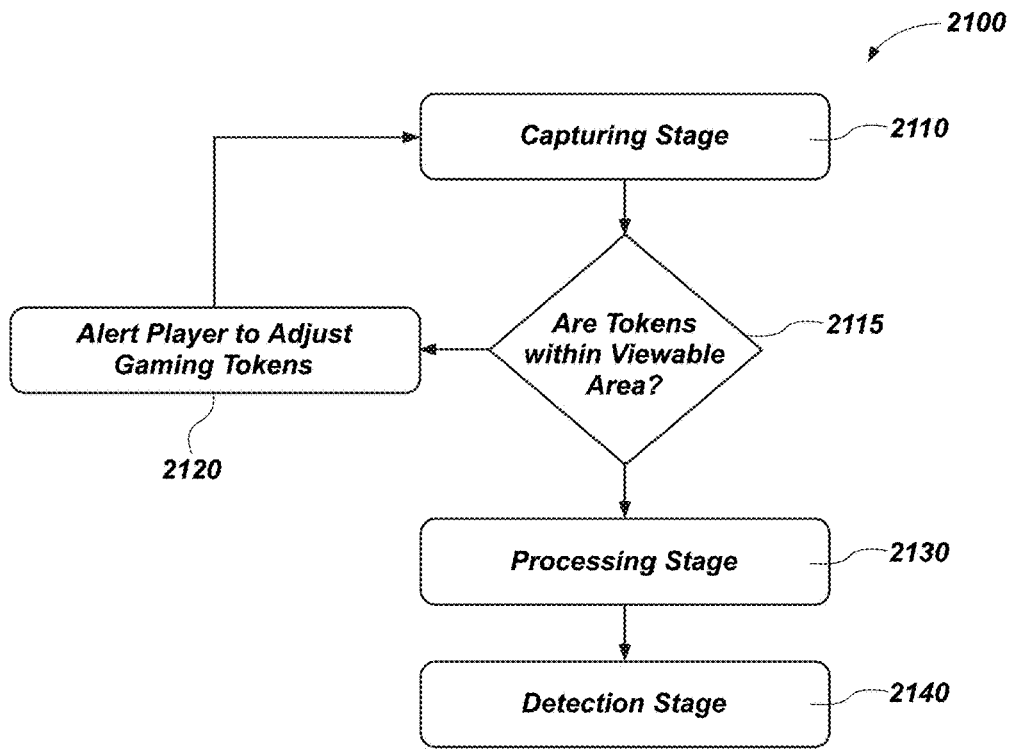
FIG. 21 is a flowchart illustrating a method for operating a bet sensor to identify gaming tokens according to an embodiment of the present disclosure.

FIG. 21 is a flowchart 2100 illustrating a method for operating a bet sensor to identify gaming tokens according to an embodiment of the present disclosure. At operation 2110 (i.e., a capturing stage), a pericentric image of the circumference of the lateral side surface 146 of the stack of gaming tokens 124 is acquired (i.e., captured) by the image sensor 106 and converted to a predetermined image format (e.g., RGB) for further processing during a processing stage. Thus, the acquired image data may depict the lateral side surface of the gaming tokens in a radial format (see, e.g., FIG. 14).

At operation 2115, the processor 210 may determine whether the gaming tokens 124 are within a viewable area of the image sensor 106. For example, in some situations the stack of gaming tokens 124 may be placed on the bet sensor 100 in a manner (e.g., offset, misaligned, too many gaming tokens, etc.) that at least a portion of the stack of gaming tokens 124 may be outside of the viewable area of the image sensor 106. If the entire stack of gaming tokens 124 is not within the viewable area, at operation 2120, the processor 110 may send an alert to the player and/or the dealer indicating the that the stack of gaming tokens 124 may need to be adjusted in order to be completely within the viewable area of the bet sensor 100. If the processor 110 determines that the gaming tokens are within the viewable area of the bet sensor 100, the method may continue to operation 2130.

At operation 2130 (i.e., a processing stage), the pericentric image may be processed to identify edges of at least one gaming token. For example, in some embodiments, the pericentric image may be processed to identify intermediate layers therein. The intermediate layers in the pericentric images may represent the lateral side surfaces of individual gaming tokens within the stack. In some embodiments, the pericentric image may be processed to identify an outermost edge, which may represent the lateral side surface of the top gaming token of the stack.

Processing the pericentric images may include manipulating the image data to better analyze the image data and correlate the image data with the gaming tokens. For example, a number of filters and classification operations may be applied to the image data to identify boundaries (e.g., edges) and color content in the pericentric image so that the information regarding each individual gaming token may be identified. The processing may at least include projecting at least one circle on the image data approximately at boundaries in the image data corresponding to the plurality of gaming tokens. A plurality of projected circles at intermediate locations may be used to distinguish between the annular shapes corresponding to the different individual gaming tokens. A projected circle at an outermost location may be used to determine an overall height of the stack of the gaming tokens based on the radius of the projected circle. The processing may include other operations, such as applying smoothing filters, color classification, edge detection filters, edge refinement, etc. These operations, as well as additional detail regarding the projection of circles on the image data will be discussed further below with respect to the various embodiments of FIGS. 22 through 34.

At operation 2140 (i.e., detection stage), the processor 110 may determine the value of the gaming tokens in the stack. In some embodiments, the value may be based on the determined identity of each individual gaming token identified within the pericentric image. For example, analysis of the content of the image data identified as being correlated with the individual gaming tokens may identify patterns in the content (e.g., color content) that may be recognized as being associated with a known gaming token having a particular value. Such patterns may include the color transitions along the lateral side surface of the gaming tokens. In some embodiments, the value may be based on the determined height of the entire stack of gaming tokens, which may correlate to a number of gaming tokens. The number of gaming tokens may be multiplied by an individual token value for gaming tables that permit only a single type (i.e., value) of gaming token being wagered. As a result, specific patterns (e.g., color content) may not need to be identified and/or correlated with individual gaming tokens. The determination of the value of gaming tokens will also be discussed further below with respect to the various embodiments of FIGS. 22 through 34.

Figure 22:
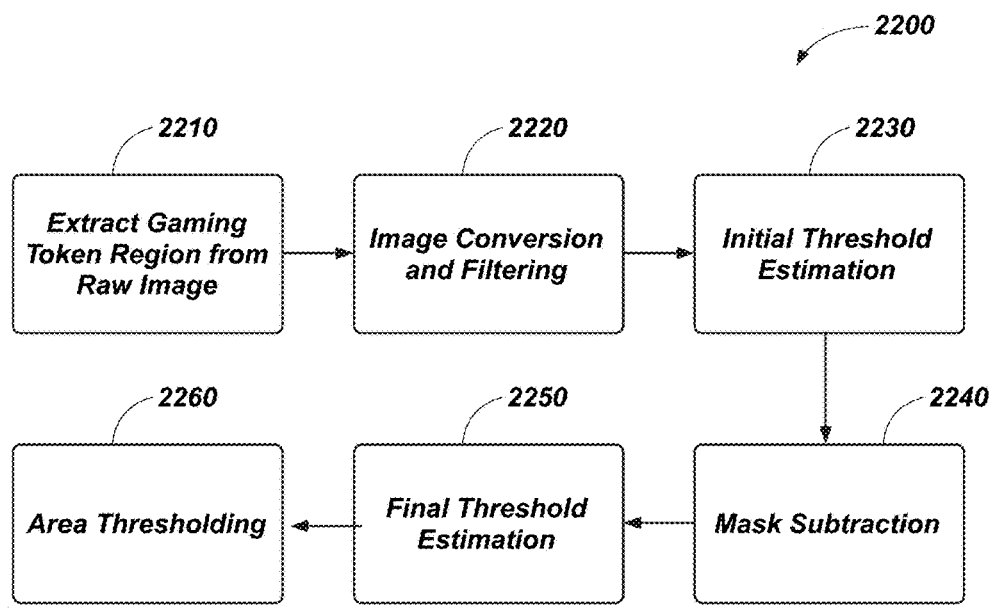
FIG. 22 is a flowchart illustrating a method for operating a bet sensor to identify gaming tokens according to an embodiment of the present disclosure.
Figure 23A:
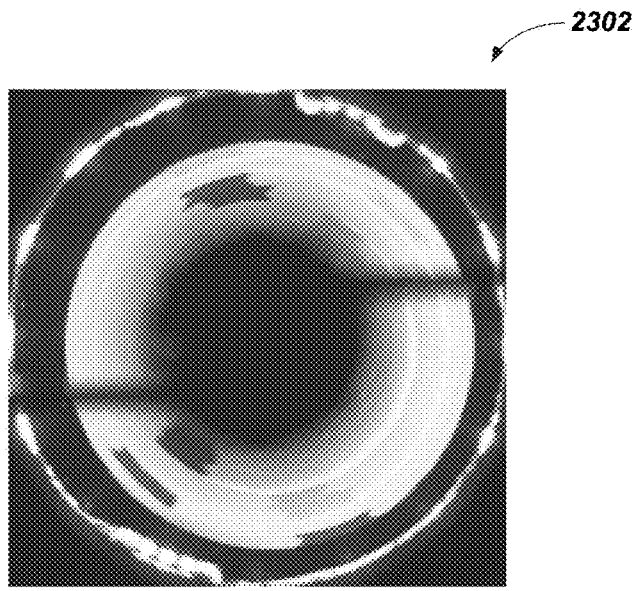
FIGS. 23A through 23I show images depicting different processing steps for a stack of gaming tokens.
Figure 23B:
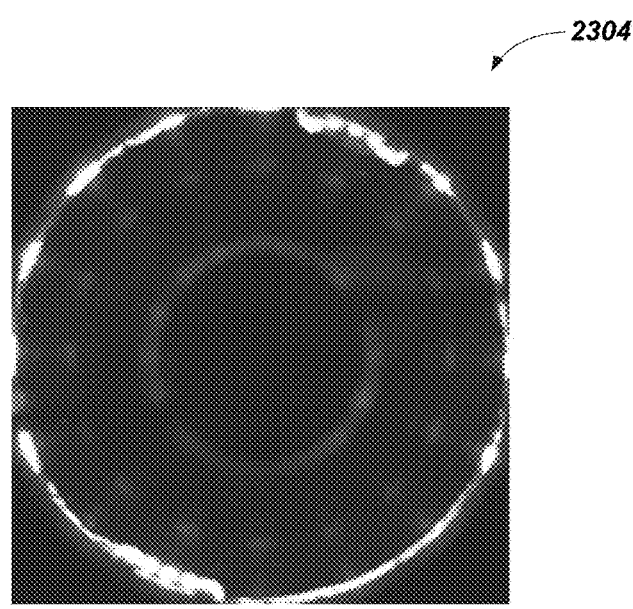
Figure 23C:
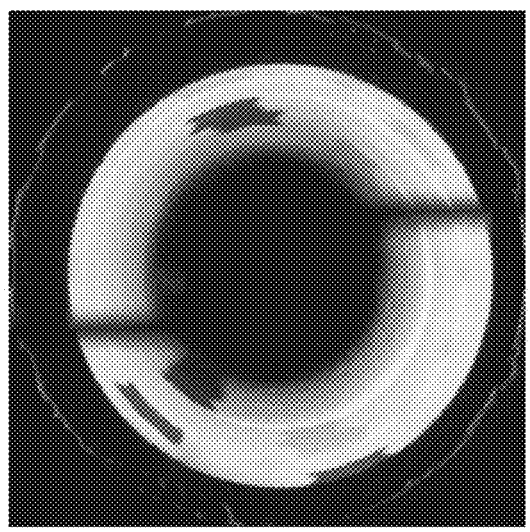

FIG. 22 is a flowchart 2200 illustrating a method for operating a bet sensor to identify gaming tokens according to an embodiment of the present disclosure. In particular, at least some operations of the flowchart 2200 may be performed when determining whether the gaming tokens 124 are within a viewable area of the bet sensor 100. In particular, flowchart 2200 may provide additional details of the operation 2115 of FIG. 21. In addition, FIGS. 23A through 23I may be referred to throughout the description of FIG. 22 in order to provide additional details for certain operations of the flowchart 2200. For example, FIGS. 23A through 24I show images depicting different image processing steps as well as intermediate and/or resulting images. These figures will be discussed with the operations to which they may pertain, rather than sequentially at once. For purposes of this flowchart 2200 it also is assumed that the image has been captured by the image sensor 106. Thus, the capturing stage 2110 of FIG. 21 is not represented in FIG. 22. However, a raw pericentric image 2302 shown in FIG. 23A is an example of an image that may have been captured during the capturing stage 2110, and may be the starting point for the remaining image processing steps.

At operation 2210, the processor 110 may perform gaming token region extraction on the raw pericentric image 2302 (FIG. 23A) captured by the image sensor 106. The raw pericentric image 2302 may have a background 2304 (FIG. 23B) subtracted therefrom in order to extract a gaming token region 2306 (FIG. 23C) for further processing. In other words, the image with the gaming token region 2306 may be the result of subtracting the background image 2304 from the raw pericentric image 2300.

The background subtraction may be based on a background image 2304 stored in memory. The background image 2304 may have been generated based on at least one image of the sensor board without any gaming tokens positioned on the bet placement surface. In some embodiments, the background image 2304 may be a composite background image that is derived from a plurality of preliminary background images. For example, a number of preliminary background images (i.e., 'n' frames) may be captured of the background (e.g., sensor board) without any gaming tokens positioned on the bet placement surface. The number of preliminary background images may be a desired number to achieve accuracy by accounting for variations on the image sensor. For example, the number of preliminary background images may be twenty (20); however, it is contemplated that more or fewer preliminary background images may achieve a suitable accuracy for some embodiments. In some embodiments, the composite background image may be generated as a "median image" of the preliminary background images. Thus, each pixel of the composite background image may be a median of each corresponding pixel across all preliminary background images. For example, the value of pixel (0,0) of the composite background image may be the median value of the values of pixel (0,0) in all the preliminary background images. Similarly, the value of pixel (1,0) of the composite background image may be the median value of the values of pixel (1,0) in all preliminary background images. The remaining pixels of the composite background image may be determined from the median values of their corresponding pixels of the preliminary background images. Thus, each pixel of the composite background image may be normalized across all preliminary background images.

In some embodiments, other methods for generating the composite background image may be employed. For example, other averaging methods (e.g., mean, mode, etc.) may be employed on the pixels. In some embodiments, the composite background image may be generated from a median value of all pixels of one or more preliminary background image. For example, rather than median values being assigned for corresponding pixels in a one-to-one correlation, the composite background image may have a single uniform value assigned to its pixels that is an average value from one or more preliminary background image. In some embodiments, a single background image may be used without any averaging or composite image being generated. In another embodiment, an approximate median value for each pixel may be provided by selecting a threshold value for each pixel of the background image 2304 based on an estimated median value. In other embodiments, the background image 2304 may be generated by modeling the background using a mixture of Gaussians equations. Whatever method is used for generating the background image 2304, when a new pericentric image is captured of the gaming tokens, the gaming token area within the raw pericentric image 2302 may be extracted by subtracting the background image 2304 from the captured raw pericentric image 2302, and the extracted gaming token region 2306 may be used for further processing.

Figure 23D:
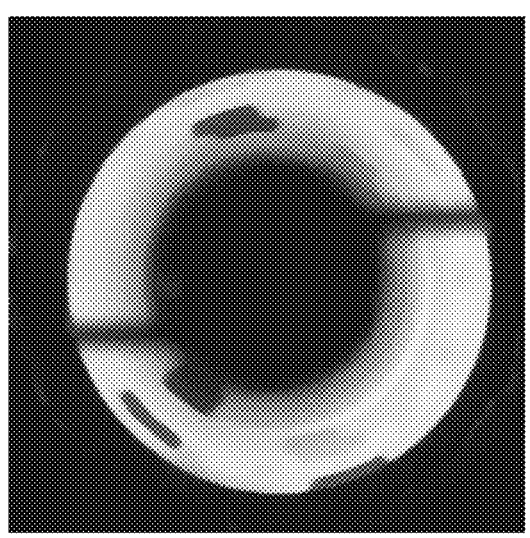
Figure 23E:
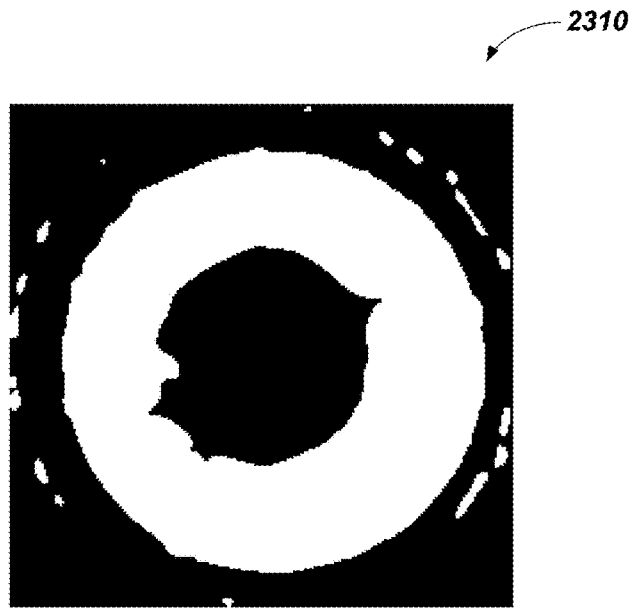
Figure 23F:
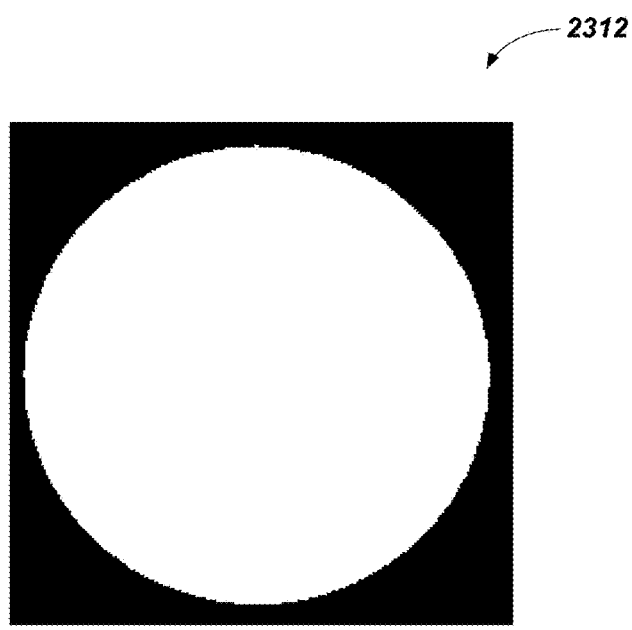

At operation 2220, the processor may perform image conversion and filtering of the extracted gaming token area 2306. For example, in some embodiments, the image conversion may include converting a color image (e.g., RGB image) to a grayscale filtered image 2308 (FIG. 23D). In some embodiments, the image conversion may not be necessary. For example, in some embodiments, the color content of the image may be useful such that losing the color content may not be desirable. In some embodiments, the image sensor used to capture the raw pericentric image 2302 may be configured to capture images in grayscale in the first instance, in which case an additional step of converting image to grayscale may not be necessary. In addition, the processor may perform filtering of the pericentric image (e.g., the resulting image including the extracted gaming token region 2306) to smooth the pericentric image. Such filtering methods may include edge enhanced diffusion models, wavelets, region adaptive filtering, other filtering methods, and combinations thereof.

In some embodiments, such filtering may include defining a neighboring region around each pixel, analyzing the values of all the pixels in the neighboring region, and replacing the original pixel's value with another value based on the analysis performed on the pixels in the neighboring region. The filter then moves successively over every pixel in the resulting image to repeat the process for all pixels of the resulting area. This class of filter used may belong to the class of edge preserving smoothing filters, which are non-linear filters. Such a filter may smooth the data while maintaining the small and sharp details. The median value may be the middle value of all the values of the pixels in the neighborhood. This filtering will be discussed in more detail below with reference to FIG. 25.

At operation 2230, the processor may generate an initial threshold image 2310 (FIG. 23E) from the grayscale filtered image 2308. The initial threshold image 2310 may be generated by forcing each pixel to be either white or black depending on whether the pixel has a pixel value above or below a predetermined threshold. As a result, the grayscale filtered image 2308 may be converted into a pure black and white figure. The initial threshold image 2310 may be generated according to a thresholding method described in *A threshold selection method from gray-level histograms*, Nobuyuki Otsu (1979), IEEE Trans. Sys., Man., Cyber. 9 (1): 62-66, the disclosure of which is incorporated in its entirety herein by reference.

Figure 23G:
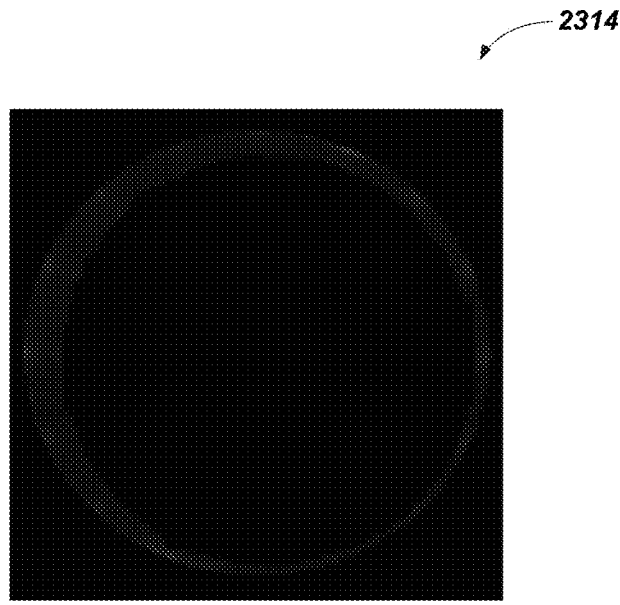

At operation 2240, the processor may perform a mask subtraction to generate a new background image 2314 (FIG. 23G). The mask subtraction may be performed by first converting the background image 2304 (FIG. 23B) to grayscale and then assigning the background gray image region pixels corresponding to black region of mask image 2312 (FIG. 23F) as zero and similarly assigning the white pixels of mask image 3204 (FIG. 32B), mask image 3206 (FIG. 32C), mask image 3208 (FIG. 32D) and the initial threshold image 2310 (FIG. 23E) white pixels to zeros in the background gray image. As a result, a new background image 2314 may be generated that may be primarily a black region and the region containing the background, that may be used later to generate a more accurate threshold image for a better estimate of the outer edge of the top gaming token.

Figure 23H:
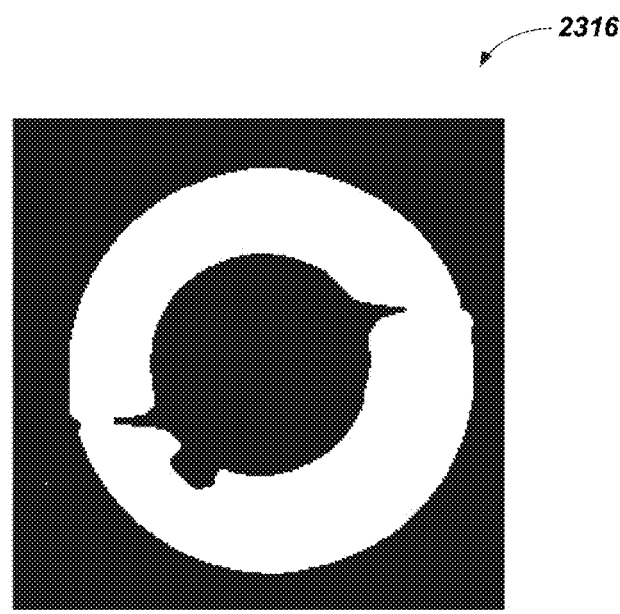
Figure 23I:
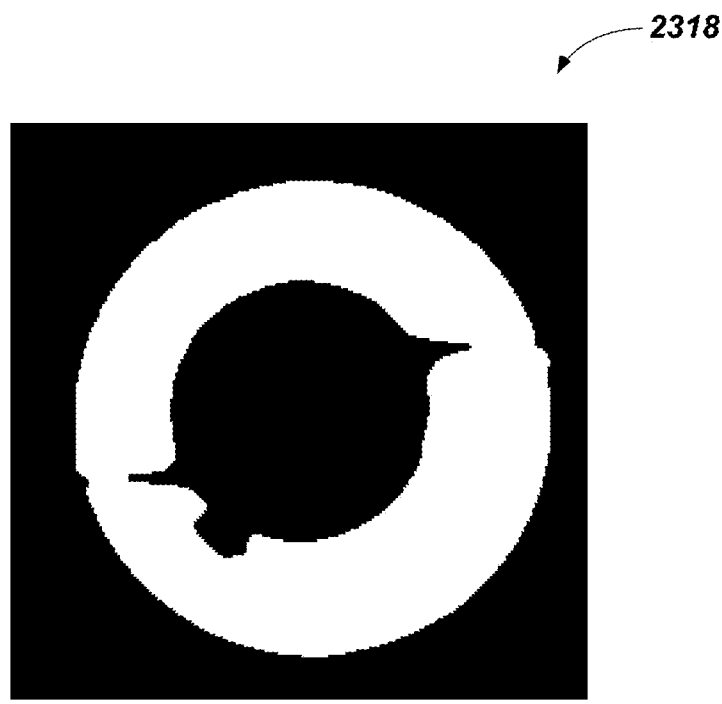

At operation 2250, the processor may perform a final threshold estimation to generate a final threshold image 2316 (FIG. 23H). The final threshold image 2316 may be generated by comparing the grayscale filtered image 2308 against an updated threshold value based on the histogram statistics (e.g., Mode value) of the new background region of the background image 2314 (discarding the black region in calculation of a new threshold). The pixels above the new threshold value may be assigned a white value (i.e., part of the token area), whereas the pixels below the new threshold value may be assigned a black value (i.e., not part of the token area).

At operation 2260, the processor 110 may perform an area thresholding operation on the final threshold image 2316 to remove small stray white regions therefrom. For example, white regions may be identified and an area thereof may be calculated. The white regions having an area smaller than a predetermined threshold may be categorized as a small stray white region that is removed. A resulting image 2318 may, therefore, have small white regions removed by changing the associated pixels to from white to black (i.e., not part of the token area). The resulting image 2318 may then be compared with the mask image 2312 that represents the viewable area of the bet sensor 100. If the white region of the resulting image 2318 falls completely within the white region of the mask image 2312, the processor may determine that the stack of chips is completely within the viewable area of the bet sensor 100. If portions of the white region of the resulting image 2318 fall outside of the white region of the mask image 2312, the processor 110 may determine that at least a portion of the stack of gaming tokens may be outside of the viewable area of the bet sensor. As a result, the processor 110 may generate an alert to the player and/or the dealer to adjust the stack of gaming tokens (see operation 2120 of FIG. 21).

Figure 24:
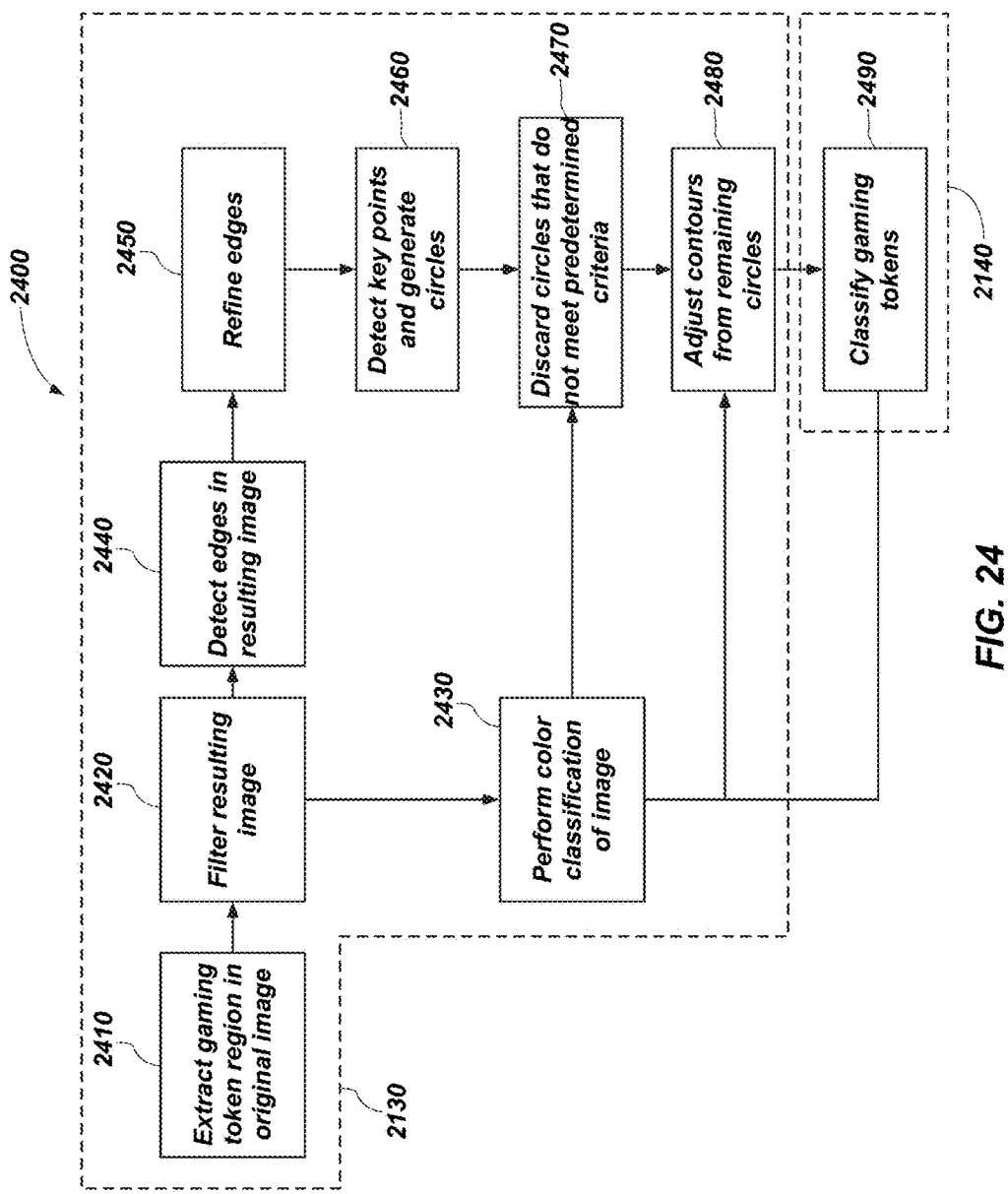
FIG. 24 is a flowchart illustrating a method of determining a wager value of a stack of gaming tokens according to an embodiment of the present disclosure.

FIG. 24 is a flowchart 2400 illustrating a method of determining a wager value of a stack of gaming tokens according to an embodiment of the present disclosure. In particular, the stack of gaming tokens in this embodiment may of different types. Thus, the patterns (e.g., color content) of each individual gaming token within the stack may be determined while determining the total value of the stack. In particular, flowchart 2400 may provide additional details of the processing stage 2120 and the detection stage 2130 of FIG. 21. For purposes of this flowchart 2400 it is assumed that the image has been captured by the image sensor 106. Thus, the capturing stage 2110 of FIG. 21 is not represented in FIG. 24. In addition, for purposes of this flowchart 2400 it is also assumed that a determination has been made whether the stack of gaming tokens is within the viewable area of the bet sensor. Those operations are depicted in a more simplified form as operations 2410, 2420 in FIG. 24.

Figure 25:
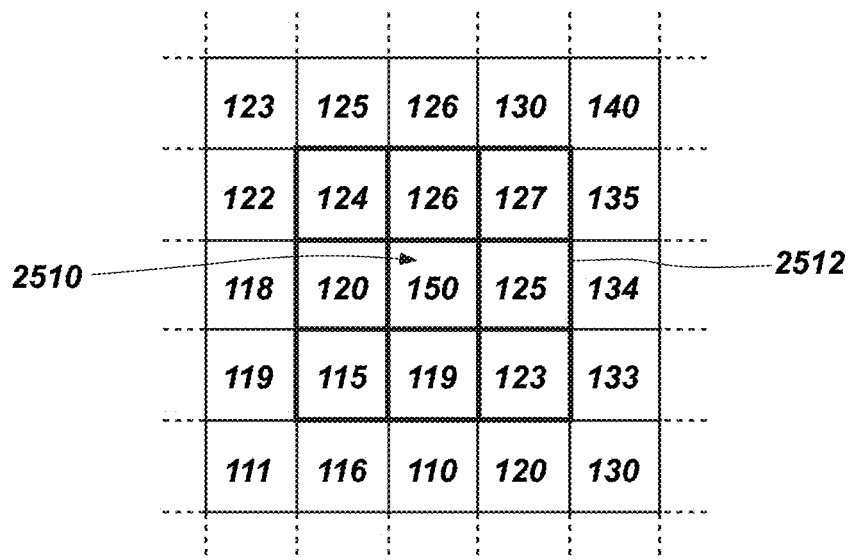
FIG. 25 is a pixel area defined as the neighboring pixels used to filter the center pixel during application of a smoothing filter.

In addition, FIGS. 25 through 27 may be referred to throughout the description of FIG. 24 in order to provide additional details for certain operations of the flowchart 2400. For example, FIGS. 26A through 26G show images depicting different processing steps for an aligned stack of gaming tokens. FIGS. 27A through 27H show images depicting different processing steps for a misaligned stack of gaming tokens. These figures will be discussed with the operations to which they may pertain, rather than sequentially at once.

Figure 26A:
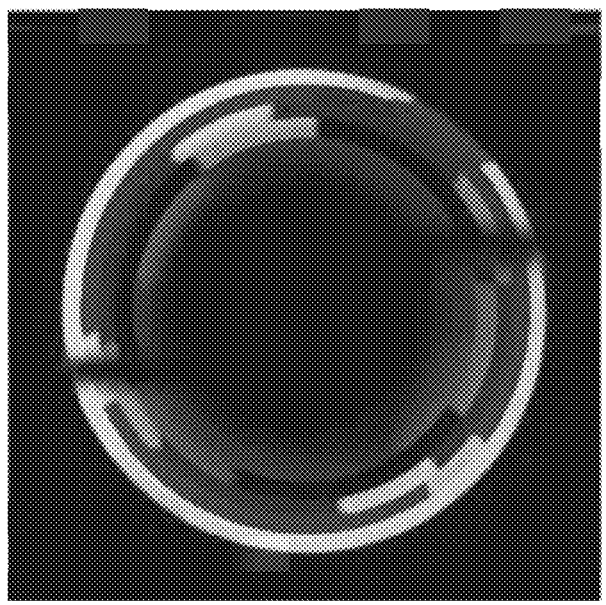
FIGS. 26A through 26G show images depicting different processing steps for an aligned stack of gaming tokens.
Figure 27A:
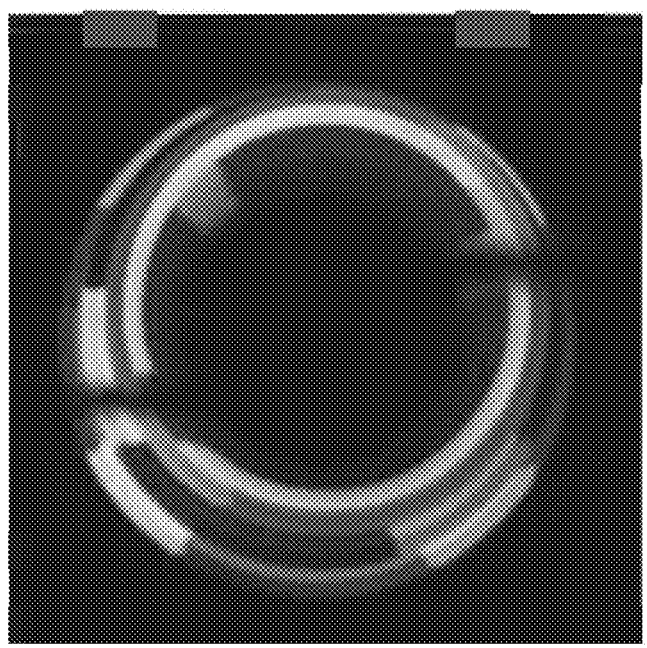
FIGS. 27A through 27H show images depicting different processing steps for a misaligned stack of gaming tokens.
Figure 27B:
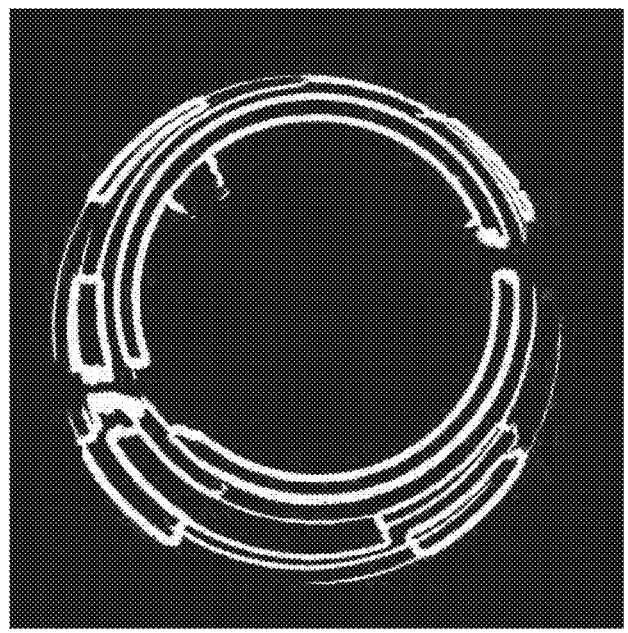
Figure 27C:
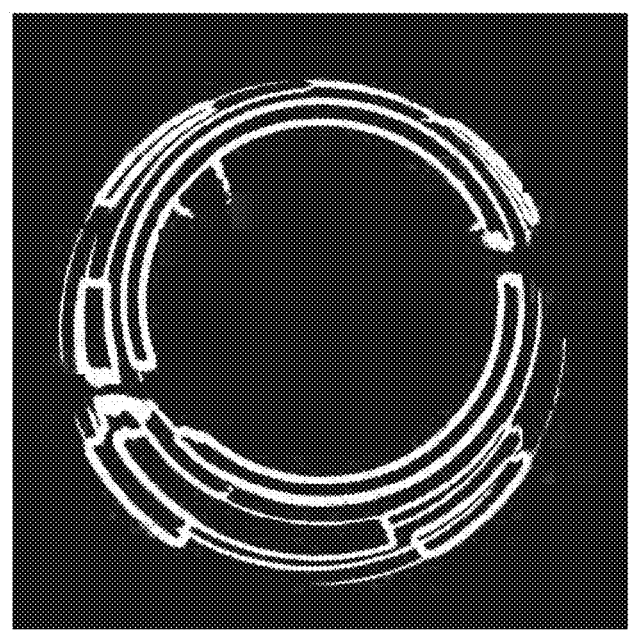

Examples of resulting images from the gaming token region extraction (operation 2410) is shown in FIG. 26A (for an aligned stack of gaming tokens) and FIG. 27A (for a misaligned stack of gaming tokens). As shown in FIGS. 26A and 27A, gaming token regions 2610, 2710 may be generally circular, and may include different colors that correspond to the markings on lateral side surface of the gaming tokens. The innermost annular shape may correspond to the bottom gaming token in the stack, while the outermost annular shape may correspond to the top gaming token in the stack.

At operation 2420, the processor may perform filtering of the pericentric image (e.g., the resulting image including the extracted gaming token area) to smooth the pericentric image. The filtering may be similar to that described above with respect to FIG. 22 (operation 2220). As an example, as shown in FIG. 26, a 3×3 pixel area 2312 is defined as the neighboring pixels used to filter the center pixel 2510. The pixel values of the 3×3 pixel area 2312 are shown as 124, 126, 127, 120, 150, 125, 115, 119, and 123. These pixel values are numerical values that may indicate color intensity. For a grayscale image, a single pixel value may be present that may have a range (e.g., 0 to 255). The value 0 is typically assigned to be the color black, and the value 255 is typically assigned to be the color white. The intermediate values may represent different shades of gray. For a color image, a pixel value may have different components. For example, a pixel value in the RGB color space may have a red component, a green component, and a blue component. Each component may have a different intensity defined by a range (e.g., 0 to 255). The combination of these three components may provide a larger range of colors and shades. An RGB pixel value of (0, 0, 0) is typically assigned to be the color black and an RGB pixel value of (255, 255, 255) is typically assigned to be the color black. The different combinations of the different components may provide a range of colors (e.g., purple, yellow, orange, etc.) of various shades.

For the example shown in FIG. 25, this image may be a color image with the RGB components; however, for simplicity only one component is shown. The median value may be taken for each RGB component individually even though only one value is shown in the 3×3 pixel area of FIG. 25. The median value may be calculated by first sorting all the pixel values from the surrounding neighborhood into numerical order, and then replacing the pixel being considered with the middle pixel value. With this method, the median value for the 3×3 pixel area 2512 is 124. Thus, the pixel value of 150 for the center pixel 2510 may be somewhat unrepresentative of its surrounding pixels, and the pixel value of 150 of the center pixel 2310 may be replaced by the median value of 124 for the surrounding pixels. The next pixel may be filtered in a similar manner. Although a 3×3 pixel area 2512 is shown in FIG. 25, it is contemplated that other sizes (e.g., 5×5) may be employed. In addition, pixel areas may be shapes (e.g., rectangles) that are not square. In general, the larger the pixel area for the neighboring pixels in the filter, the more pronounced the smoothing effect may be. In situations where the neighborhood under consideration includes an even number of pixels, the average of the two middle pixel values may be used as the median.

In some embodiments, a median filter may be employed on the extracted gaming token area. For example, the pixel value that replaces the original pixel value may be the median value of the neighboring pixels. In some embodiments, a mean filter may be employed that replaces the original pixel value with the mean value of the neighboring pixels. Each of these filters may have the result of reducing noise in the extracted gaming token region; however, some median filters tend to be better at preserving useful detail in the image data than do mean filters. For example, the median value may be a stronger "central indicator" than the mean value. As a result, the median may be less affected by a small number of discrepant values among the pixels in the neighborhood.

At operation 2430, the processor may perform color classification on the pericentric image (e.g., on the resulting filtered image). The color classification includes receiving the pixel value and translating the pixel value to a color index that is assigned to a particular color. For example, if a pixel value falls within the range of red colors, the red color index (e.g., 1) may be assigned to the pixel. If the pixel value falls within the range of green colors, the green color index (e.g., 2) may be assigned to the pixel. If the pixel value falls within the range of blue colors, the blue color index (e.g., 3) may be assigned to the pixel. Other color index values may be assigned in a similar manner. Thus, all variations of colors of a particular color may be assigned a uniform color index rather than having the RGB pixel value. For example, all variations of red may be provided with the same red color index (e.g., 1). Color classification may be performed for each pixel of the pericentric image. Thus, each pixel may be evaluated in terms of its color content to translate the color content of the pericentric image from a complex palate of colors into a more simple palate of colors. In some embodiments, the color classification may be performed by a trained support vector machine (SVM), neural networks, Naive Bayes classifiers, hidden Markov models (HMM), boosting algorithms, k-nearest neighbors (k-NN) methods, other classification methods, and combinations thereof.

To determine the color index that should be assigned to each pixel, a neighboring pixel area (e.g., 15×15) may be defined around the pixel at issue. A vector of properties may be defined for the neighboring pixel area and assigned to the pixel at issue. The properties may include the mean, standard deviation, and moment for the pixel values within the neighboring pixel area. These properties may be determined for a plurality of different color spaces. As a result, a different property vector may be generated for each pixel for a plurality of different color spaces. Decomposing the pericentric image into different color spaces may result in different color components standing out in each vector. Thus, generating a property vector for a plurality of different color spaces may provide additional information to input into the color classifier for making a determination as to the appropriate color index to assign the pixel as one set of properties in one color space may not converge to a unique solution.

The different property vectors for the different color spaces may be input into the color classifier to determine the appropriate color index for each pixel. For example, a first property vector may include the mean, standard deviation, and moments in $t\alpha\beta$ color space (sometimes referred to as the "Lab" color space), a second property vector may include the mean, standard deviation, and moments in HSV color space, a third property vector may include the mean, standard deviation, and moments in YCbCr color space, and a fourth property vector may include the mean, standard deviation, and moments in RGB color space. Another input into the color classifier may include a histogram of color ratios.

The original pericentric image may be captured in the RGB color space. Thus, the mean, standard deviation, and moments may be determined based on the pixel data of the pericentric image as captured and/or using the version of the pericentric image that was filtered in operation 2420. For generating the property vectors for the other color spaces, the RGB pixel data may be converted to components of the other color spaces.

For conversion from the RGB color space to the YCbCr color space, the processor may apply the following vector equation to the RGB pixel data:

$$\begin{bmatrix} Y \\ Cb \\ Cr \end{bmatrix} = \begin{bmatrix} 0.299 & 0.587 & 0.114 \\ -0.299 & -0.587 & 0.866 \\ 0.701 & -0.587 & -0.114 \end{bmatrix} \begin{bmatrix} R \\ G \\ B \end{bmatrix}, \quad (2)$$

where Y=Luminance, Cb=Chroma: Blue, and Cr=Chroma: Red.

For conversion from the RGB color space to the Lab color space, the processor may apply the following vector equations to the RGB pixel data:

$$\begin{bmatrix} X \\ Y \\ Z \end{bmatrix} = \begin{bmatrix} 0.5141 & 0.3239 & 0.1604 \\ 0.2651 & 0.6702 & 0.0641 \\ 0.0241 & 0.1228 & 0.8444 \end{bmatrix} \begin{bmatrix} R \\ G \\ B \end{bmatrix}, \quad (3)$$

$$\begin{bmatrix} L \\ M \\ S \end{bmatrix} = \begin{bmatrix} 0.3897 & 0.6890 & -0.0787 \\ -0.2298 & 1.1834 & 0.0464 \\ 0.0000 & 0.0000 & 1.0000 \end{bmatrix} \begin{bmatrix} X \\ Y \\ Z \end{bmatrix}, \quad (4)$$

$$\begin{bmatrix} l \\ \alpha \\ \beta \end{bmatrix} = \begin{bmatrix} \frac{1}{\sqrt{3}} & 0 & 0 \\ 0 & \frac{1}{\sqrt{6}} & 0 \\ 0 & 0 & \frac{1}{\sqrt{2}} \end{bmatrix} \begin{bmatrix} 1 & 1 & 1 \\ 1 & 1 & -2 \\ 1 & -1 & 0 \end{bmatrix} \begin{bmatrix} L \\ M \\ S \end{bmatrix}, \quad (5)$$

where equations (3) and (4) first convert the data into the XYZ and LMS color spaces, respectively. The pixel data in the Lab color space may be generated from the LMS color space, wherein t is a lightness value, and $\alpha$ and $\beta$ are opponent color dimensions (e.g., red/green opponent colors are represented by a and yellow/blue opponent colors are represented by $\beta$).

For conversion from the RGB color space to the HSV color space, the processor may apply the following equations to the RGB pixel data:

$$H = \cos^{-1}\beta \qquad (5)$$

$$\text{where } \beta = \left\{ \frac{\frac{1}{2}[(R-G)+(R-B)]}{\sqrt{(R-G)^2 + (R-B)(G-B)}} \right\},$$

$$S = 1 - \frac{3}{R+G+B}[\min(R, G, B)], \qquad (6)$$

$$V = \frac{1}{3}(R+G+B), \qquad (7)$$

where H=Hue, S=Saturation, and V=Value.

Conversion into other color spaces for generating property vectors input into the color classifier is also contemplated. For example, additional color spaces may include XYZ, LMS, CMYK, YIQ, YPbPr, HSL, etc. The color classifier may be configured to generate the color indexes by converging to a color based on analyzing the different vectors in the different color spaces. Each pixel may have its own color index (e.g., red=1, green=2, blue=3) assigned thereto that provides a simplified palate of the color information to its closest color.

Figure 26B:
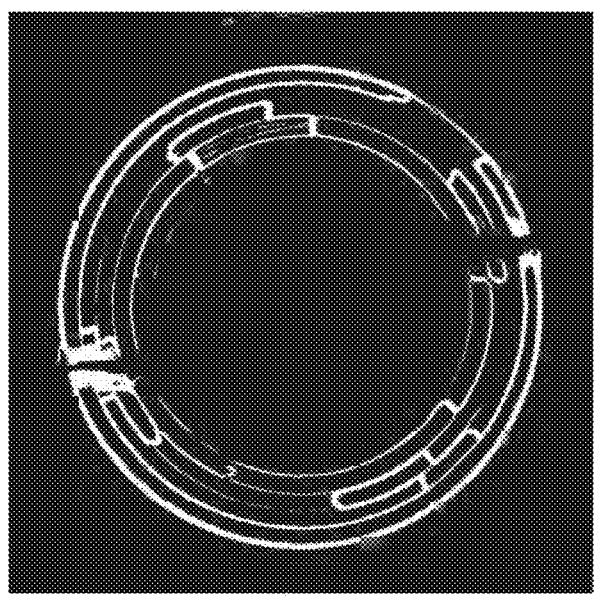

At operation 2440, the processor may perform edge detection on the pericentric image (e.g., on the filtered version of the pericentric image). Edges are boundaries between different textures in the pericentric image. As edge may also be defined as discontinuities in image intensity (e.g., color) from one pixel to another. Such methods may include a Sobel edge detector, a smallest univalue segment assimilating nucleus (SUSAN) edge detector, a wavelet edge detector, a hidden Markov model (HMM) edge detector, other edge detection methods, and combinations thereof. An example of resulting images from the edge detection is shown in FIG. 26B (for an aligned stack of gaming tokens) and FIG. 27B (for a misaligned stack of gaming tokens). The processor 110 is configured to cause the regions in resulting images 2620, 2720 to remain in the image data where the processor 110 determines there to be a boundary.

Figure 26C:
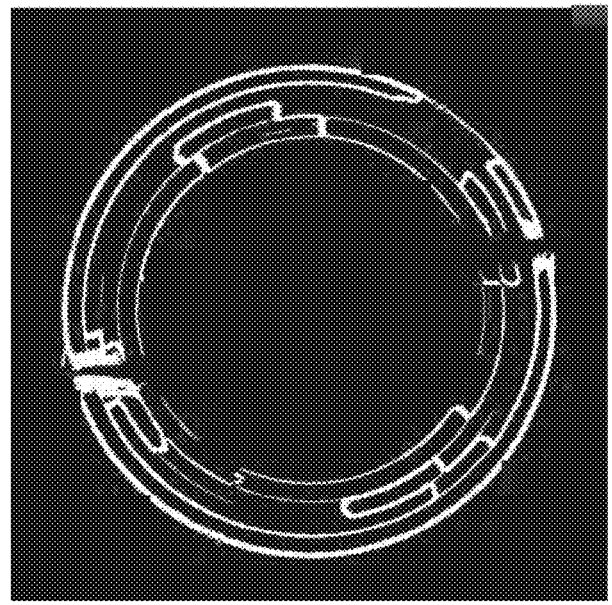

At operation 2450, the processor 110 may apply an edge refinement filter of the resulting image from the edge detection. The edge refinement filter may smooth out small variations to provide sharper boundaries in the edges of the remaining image data. In some embodiments, the edge refinement filter may include an area filter configured to remove blobs in the resulting image that have an area that is less than a predetermined number of pixels. For example, blobs that have fewer than 10 pixels may be considered to be stray blobs that are unrelated to the edges of the gaming tokens. As a result, such blobs may be removed from the resulting image that is used for further processing. An example of resulting images 2630, 2730 from the edge refinement filter is shown in FIG. 26C (for an aligned stack of gaming tokens) and FIG. 27C (for a misaligned stack of gaming tokens). When comparing FIGS. 26B/27B (the resulting image of the edge detection) with FIGS. 26C/27C (the resulting image of the edge refinement filter), it is apparent that some of the smaller stray lines may have been removed from the image data. In some embodiments, the edge refinement may be optional depending on the quality of the edge detection performed at operation 2440. High quality edge detection filter methods, however, tend to have high computational costs, which may increase the amount of time needed to determine the wager values.

At operation 2460, key points may be detected in the resulting image and circles may be generated to align with the edges generated by the edge filter. The circles may be used to define the annular shapes in the image data to distinguish between the different gaming tokens. Thus, the region between the two circles may correspond to a gaming token. The region between two circles may also define the content that is analyzed for determining the value of the gaming token. The circles may be generated from the key points may be points identified on the edges of the resulting image.

Figure 26D:
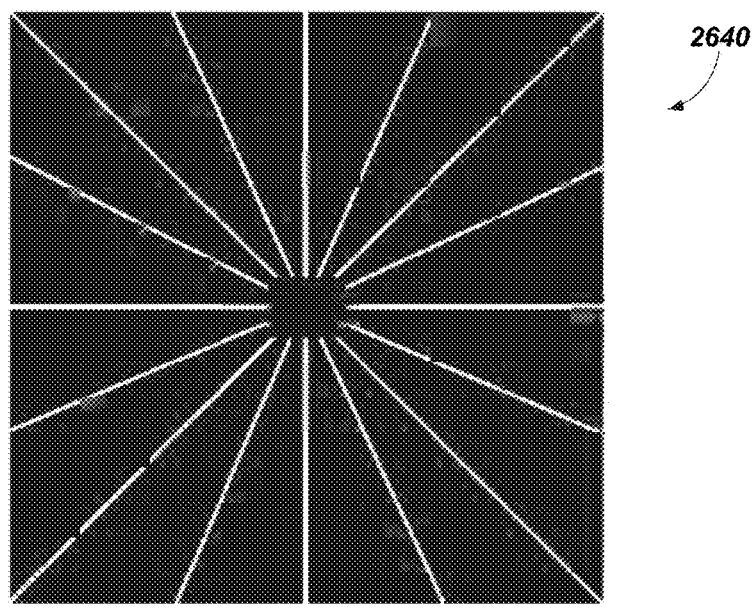
Figure 27D:
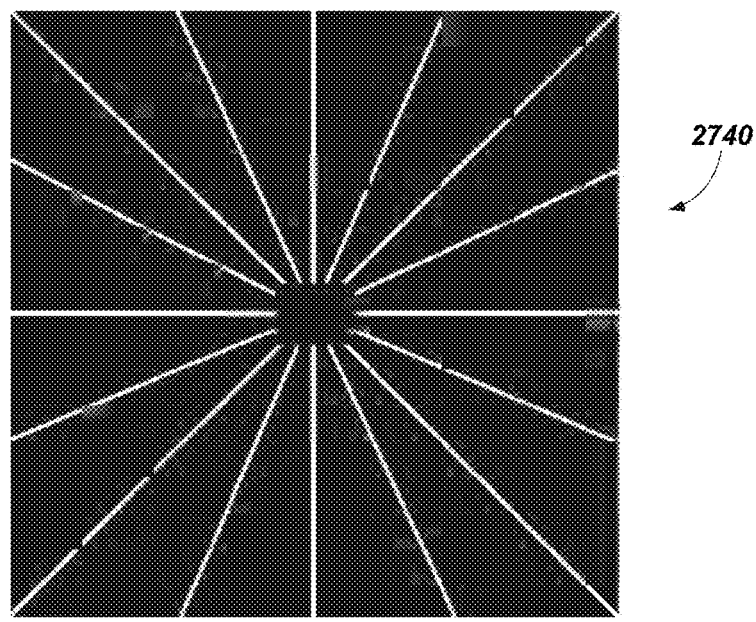

In some embodiments, a mask may be used as an overlay to the resulting image to identify intersections in the resulting image and the mask. FIG. 26D and FIG. 27D are an example of such a mask 2640, 2740 that has lines extending out from a center area at different angles. The angles of the lines may be uniform around the mask 2640, 2740. For example, in FIG. 26D and FIG. 27D, the angle of each line may be approximately 22.5 degrees from the previous line. The mask 2640, 2740 may be used as an overlay to the resulting image 2630 (FIG. 26C), 2730 (FIG. 27C) to identify intersections between the edges of resulting image 2630, 2730 and the lines in the mask 2640, 2740. Thus, intersections may be located where there is an overlap of white area between the two images (i.e., where the mask lines and the edges overlap).

Figure 26E:
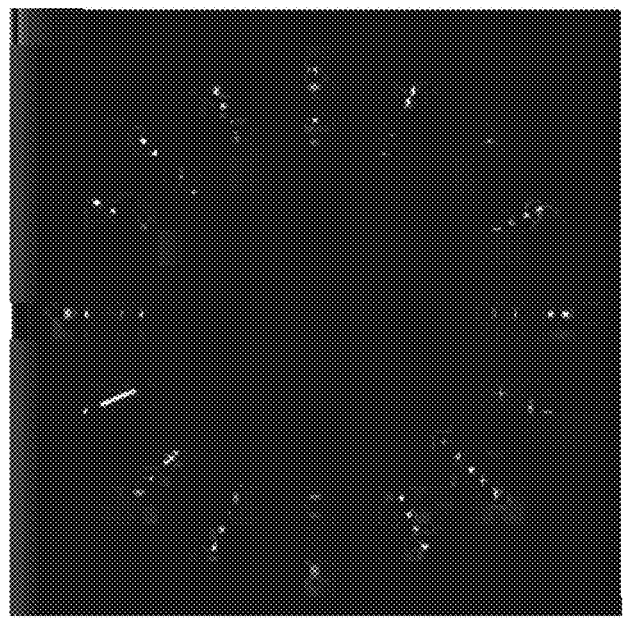
Figure 26F:
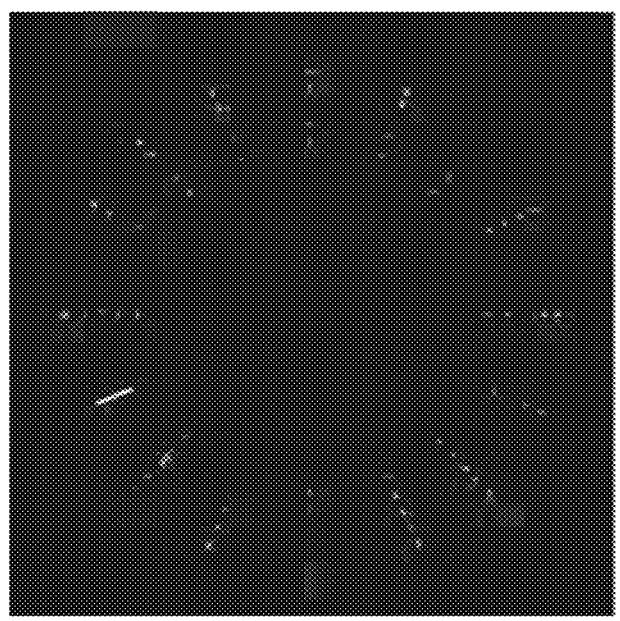
Figure 27E:
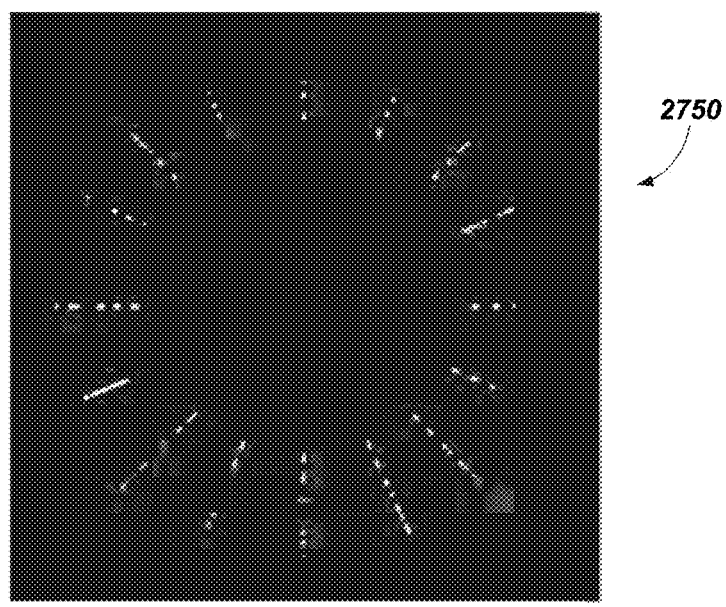
Figure 27F:
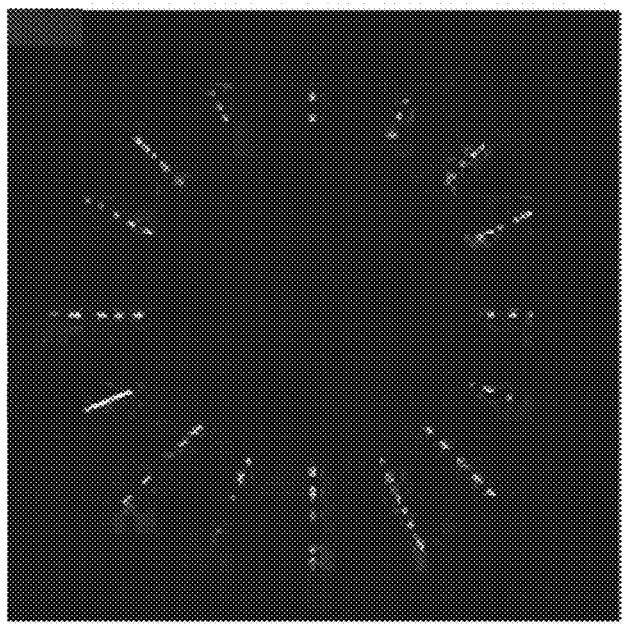

FIG. 26E (for the aligned stack of gaming tokens) and FIG. 27E are example images 2650, 2750 showing these intersections (shown as white spaces). The intersections may have an area that is greater than one pixel. Each key point may be defined as a pixel within each intersection. For example, the processor may identify a centroid within each intersection for defining the key points. FIG. 26F (for the aligned stack of gaming tokens) and FIG. 27F are example images 2660, 2760 showing the key points defined at a centroid of each intersection.

Figure 26G:
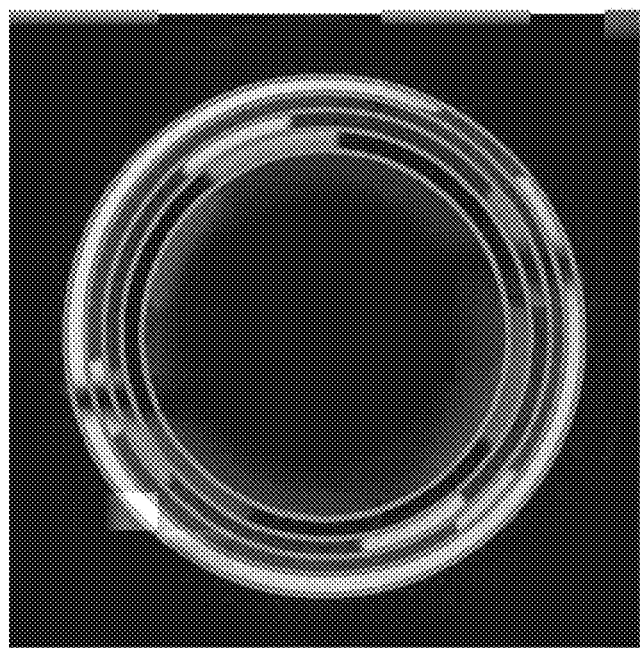
Figure 27G:
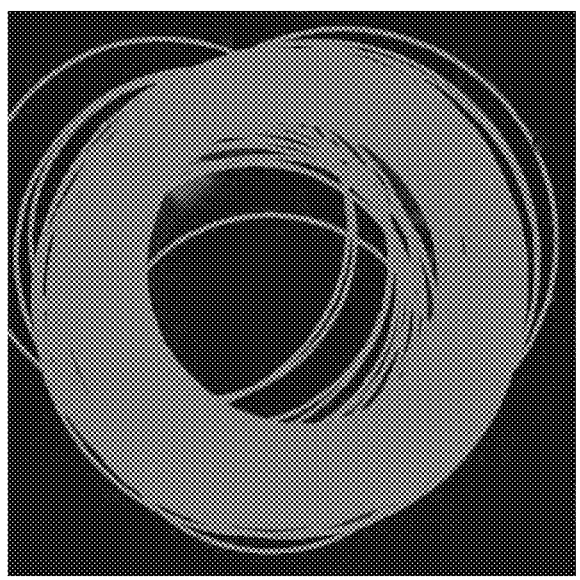
Figure 27H:
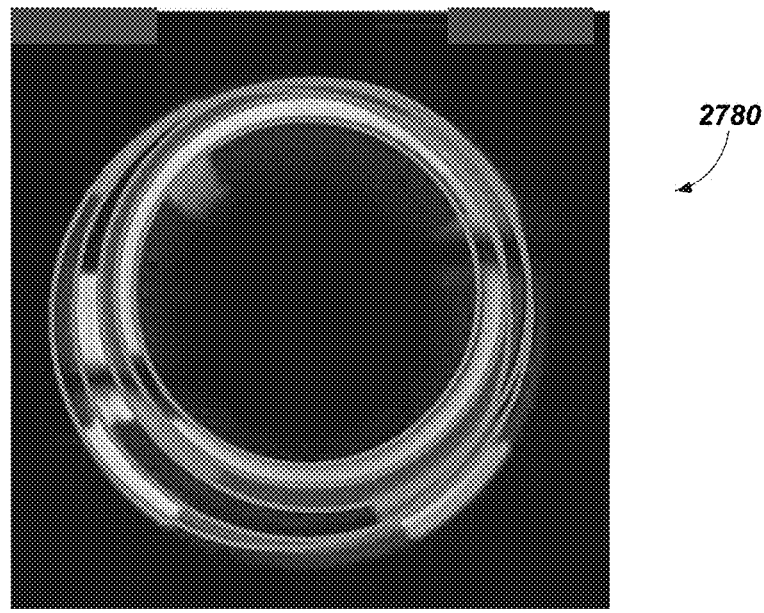

As discussed above, circles may be generated based on the key points, and projected on the image that includes the color content. A combination of at least three neighboring key points may be used to generate an arc to project a circle on the image data. The image may be scanned to identify at least three key points that have an appropriate relative location such that a circle may be fit thereon. FIG. 26G is an example image 2670 showing circles projected thereon. As FIG. 26G is the aligned case, the key points are relatively uniform in their spacing around the image 2670. As a result, the circles may be generally concentric. In addition, the projected circles that are generated may be approximately the same number as the number of gaming tokens being detected, and the circles may also be well aligned with the transitions between the portions of the image associated with the different gaming tokens. FIG. 27G, however, is an example image 2770 showing circles projected thereon based on the key points of FIG. 27F. As shown, the number of circles generated by the processor may greatly exceed the number of gaming tokens being detected. In addition, many circles may be at incorrect locations that do not correspond with any actual transitions in the image 2770 between gaming tokens.

At operation 2470, excess circles may be discarded that do not meet predetermined criteria. The existence of excess circles may arise when imaging a misaligned stack of gaming tokens. As previously discussed, the ideal situation involving an aligned stack of gaming tokens may result in a number of circles that corresponds to the number of gaming tokens actually present on the bet surface. The non-ideal situation involving a misaligned stack of gaming tokens may result in a number of circles that is greater than the number of gaming tokens actually present in the bet surface. In some cases, the number of circles generated during operation 2460 may be a large number depending on the amount of misalignment. These excess (e.g., incorrect) circles may be discarded.

Excess circles may be discarded based on one or more properties, such as the radius of the circle, the location of the circle, the center of the circle, the ratio of circle areas, and combinations thereof. Such properties may be used to identify circles that were generated that are unlikely to (or cannot possibly) correspond to boundaries of gaming tokens. For example, some circles that were generated may have a radius that is not within a predetermined range of acceptable radii. Some circles may have a radius that is smaller than a predetermined lower limit as it may be known what the expected radius may be for the first gaming token (the first gaming token may exhibit the smallest radius in the pericentric image). Some circles may have a radius that is larger than a predetermined upper limit as it may be known what the expected radius may radius may be for the top gaming token of the stack (the top gaming token in the stack may exhibit the largest radius in the pericentric image). In some situations, the areas of multiple circles may be compared with expected circle sizes (e.g., the bottom circle may be a predictable size) such that the ratio of the circle areas to the expected circle sizes may not be within a tolerance range. Some circles may have a center that is located outside of a predefined range within the image data. Some circles may have an arc that is located in a background area of the image data. Some circles may have at least a portion that extends outside of a boundary range for the image data. Some circles may pass through the image data such that a color pattern in the image data along the circle does not match a known pattern (see, e.g., Table 1 below) of color content associated with individual wager values of individual gaming tokens. For example, a circle may pass through a red region followed by an orange region. That red/orange transition is not part of any pattern identified as a valid gaming token. In each of these situations, it may be unlikely (or not possible) that the circle corresponds to the edge transitions for the gaming tokens. As such, such circles may be discarded for one or more of these reasons and/or for other reasons.

As an alternative to operations 2460 and 2470 of projecting circles on the image data based on key points and discarding undesired circles, an alternative embodiment may include projecting a circle having a relatively small radius at a location near the center of the image data. This radius may be less than the expected radius of the bottom gaming token in the stack. Thus, the small circle may be within the area that does not correspond to any gaming token. The processor may then enlarge the circle until a portion of the circle intersects the first edge in the image data. A second circle may be projected with a greater radius, which is then enlarged until the next edge of the image data is intersected, and so on. Similarly, a relatively large circle that is greater than the expected radius of a top gaming token in the stack may be projected on the image data. The processor may then reduce the circle until a portion of the circle intersects the first outermost edge of the image data. Additional circles may then be projected and reduced to find additional edges in the image data.

At operation 2480, the processor may adjust contours from the remaining circles to more closely align with an edge identified in the image data. The circles generated during operation 2460 may be relatively symmetrical (e.g., a perfect circle); however, the gaming tokens may not be a perfect disk in actuality. In addition, misaligned stacks of gaming tokens may result in image data that is somewhat distorted and not a perfect circle. As a result, the projected circles from operations 2460 and 2470 may not be aligned to the actual edges in the image data corresponding to the gaming tokens as shown in image 2780 of FIG. 27H. Therefore, to better determine the wager values, portions of the circles (i.e., contours) may be adjusted to better align with the edges.

Figure 28:
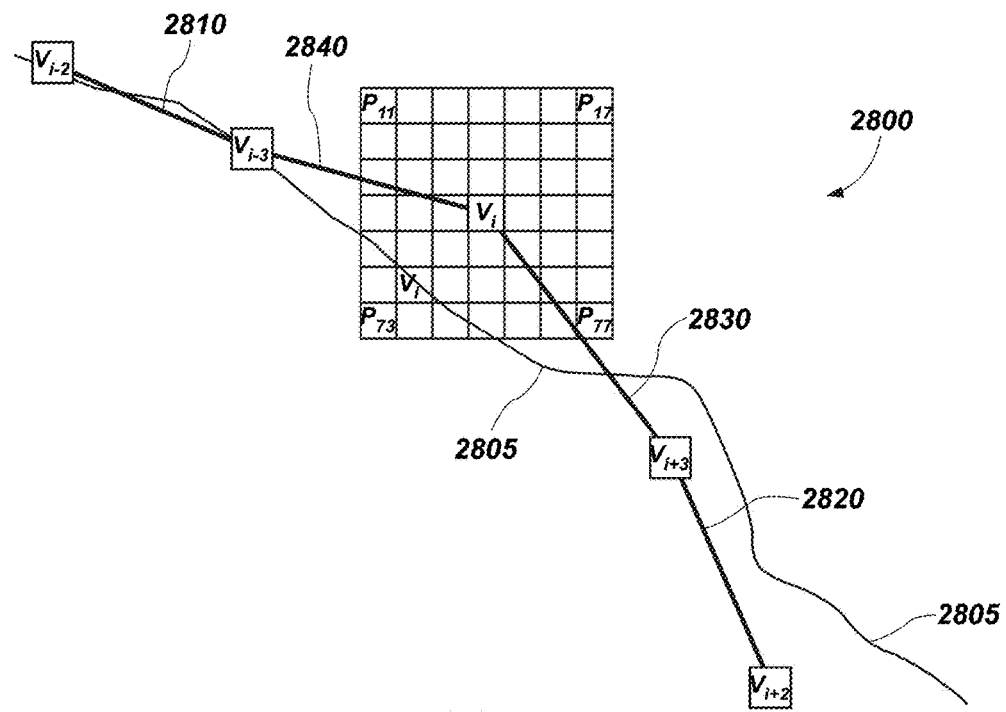
FIG. 28 is an image showing a plurality of contours that are adjusted to an edge of image data according to an embodiment of the present disclosure.

As shown in FIG. 28, contours 2810, 2840, 2830, 2820 may be defined as line segments along one of the circles projected on image data 2800. These contours 2810, 2840, 2830, 2820 may be between end points ($v_{i-2}$, $v_{i-1}$, $v_i$, $v_{i+1}$, $v_{i+2}$). As shown in FIG. 26, some of the contours 2810, 2840, 2830, 2820 may not align with edge 2805 as desired. The three basic conditions for the contours 2810, 2840, 2830, 2820 may be generally located on the edge, generally located inside the edge, or generally located outside the edge. This condition may be determined by analyzing the pixel values.

Within the same circle, different contours may meet different conditions. Thus, contours may be adjusted independently of each other in either direction for the circle to better align with the edge 2805. If the contour 2810 is on the edge 2805, the contour 2810 may not be adjusted as it is in the desired position. If the contour 2820 is inside the edge 2805, the contour 2820 may be enlarged to align with the edge 2805 in the image data. If the contours 2830, 2840 is outside of the edge 2805, the contours 2830, 2840 may be reduced to align with the edge 2805 in the image data.

To find the best fit between a contour and the edge 2805, the following energy function may be minimized:

$$E_{contour} = \int_0^1 E_{internal}v(s) + E_{image}v(s) + E_{constraint}v(s) \cdot ds, \qquad (8)$$

where the contour is parametrically defined as:

$$o(s)=(x(x),y(s),z(s)) \qquad (9).$$

The Energy may be based on the values of the neighboring pixels. Additional details regarding the mathematical adjustments of contours to an object are described in the paper, *Image Segmentation Using Deformable Models*, Chenyang Xu et al, The Johns Hopkins University (2000), the disclosure of which is incorporated in its entirety herein by reference. The example shown in FIG. 28 illustrates the movement of a point $v_i$ in an active contour. The point $v_i'$ may be the location of minimum energy due to a large gradient at that point. Thus, the point $v_i$ may be moved to the point $v_i'$ so that the corresponding contours 2860, 2840 may be adjusted to more closely align with the edge 2805. With the circles adjusted to better fit the edges, the annular shapes corresponding with the different gaming tokens may be distinguishable from each other, and the content may be analyzed to determine the value of each gaming token.

At operation 2490, the annular shapes of the pericentric images may be classified according to the value of the gaming token the image data corresponds with. As discussed above with respect to FIG. 14, the annular shapes correspond with the lateral side surface of the gaming tokens in the stack, and the different color patterns may indicate the value of the individual gaming tokens. Once the processor 110 defines the boundaries of the annular shapes, the color content of the annular shapes may be analyzed to compare with known patterns of gaming tokens that have different values. As discussed previously, a pattern may include the transitions between the different color regions. The pattern may include the order of the transitions. In some embodiments, the color regions of a pattern may be directly adjacent to each other. In some embodiments, the color regions may be separated by some base color (e.g., black) of the gaming token.

As an example, Table 1 below lists examples of the color patterns that may be present for gaming tokens of different values.

TABLE 1

| Pattern | Color #1 | Color #2 | Color #3 | Value |
|---------|----------|----------|----------|-------|
| 1 | Red | Yellow | Green | 10 |
| 2 | Yellow | Blue | | 20 |
| 3 | Orange | Green | Pink | 30 |
| 4 | Blue | Purple | | 40 |
| 5 | Red | Yellow | White | 50 |

A first pattern (pattern 1) for a first gaming token (having a value of 10) may have a color pattern of red, yellow, and then green. A second pattern (pattern 2) for a second gaming token (having a value of 20) may have a color pattern of yellow and then blue. A third pattern (pattern 3) for a third gaming token (having a value of 30) may have a color pattern of orange, green, and then pink. A fourth pattern (pattern 4) for a fourth gaming token (having a value of 40) may have a color pattern of blue and then purple. A fifth pattern (pattern 5) for a fifth gaming token (having a value of 50) may have a color pattern of red, yellow, and then white. The color patterns and associated values listed herein are shown as merely examples. Different color combinations and values may be defined according to the values and characteristics of the gaming tokens that may be used as bets in a wagering game.

As a result, if the color content (e.g., color indexes from operation 2430) for an annular shape within the image data is determined to transition from orange to green to pink, the comparison with the known patterns may reveal a match with the third pattern. Thus, such an annular shape may correspond to a gaming token in the stack that has a value of 30. The other annular regions may be similarly classified with their values determined. As a result of the comparison of the color content in each annular region of the image data with the known color patterns, each gaming token in the stack may be identified. Thus, the value of each gaming token as well as the total wager value may be determined, which may be displayed to the player and/or table operator.

In some embodiments, the particular color of the gaming token may not be needed by the processor 110 in order to determine a total wager value placed on the bet sensor 100. For example, some gaming tables may only permit wagers of a particular gaming token value. As a result, the player may only be permitted to wager a particular gaming token value (e.g., a single color of gaming token); however, the number of gaming tokens may be variable depending on the player's desires for the total wager amount. As an example, players may only be permitted to wager gaming tokens valued at $10 at a particular gaming table. When the player desires to wager $50, the player must place five gaming tokens valued at $10 each, rather than placing some other combination of gaming token values on the bet sensor 100. In such an embodiment, the processor 110 may not need to analyze color content and/or patterns of the gaming tokens. Instead, the processor 110 may determine how many gaming tokens are placed on the bet sensor 100, which may be determined by measuring the radius of the outer edge of the pericentric image captured. The radius of the outer edge of the pericentric image may be correlated with a number of gaming tokens in the stack placed on the bet sensor as the radius of the outer edge increases as the number of gaming tokens in the stack increases. The total wager amount may be determined by multiplying the determined number of gaming tokens in the stack with the gaming token value that the player is permitted to wager.

Figure 29:
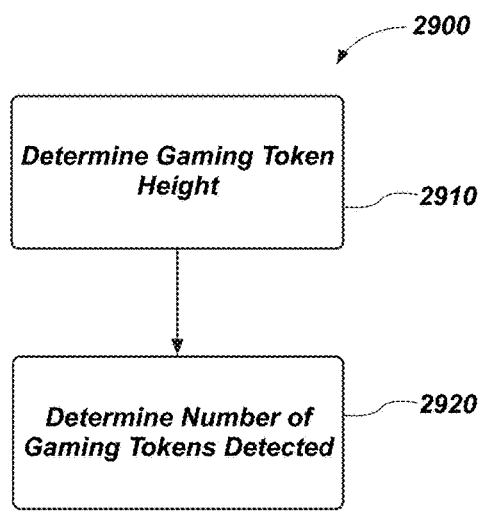
FIG. 29 is a flowchart illustrating a method for operating a bet sensor according to an embodiment of the present disclosure.

FIG. 29 is a flowchart 2900 illustrating a method for operating a bet sensor according to an embodiment of the present disclosure. At operation 2910, the gaming token height measurements may be determined by the processor 110. Operation 2910 may be a calibration routine performed prior to game play in order to determine a height (i.e., thickness) of a gaming token based on the effect the gaming tokens have on the radius of the outermost edge of the pericentric image captured by the bet sensor for different sizes of stacks. The calibration may be desirable, because different types of gaming tokens may have different heights (e.g., varying between 39 mm and 42 mm). Thus, to accurately determine the total height of the stack, the bet sensor 100 may be calibrated to the particular type of gaming tokens being used. At operation 2920, the processor 110 may detect the number of gaming tokens placed on the bet sensor during game play. Additional detail regarding operations 2910, 2920 will be described below in the subsequent figures and accompanying text.

Figure 30:
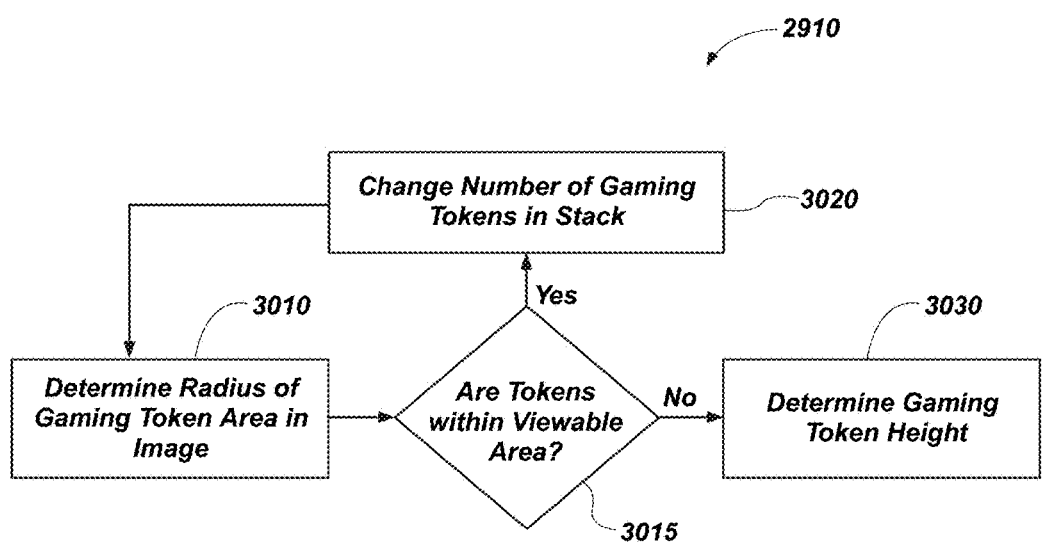
FIG. 30 is a flowchart illustrating a method for determining gaming token height for stacks of gaming tokens having different numbers of gaming tokens.

FIG. 30 is a flowchart illustrating a method for determining gaming token height for stacks of gaming tokens having different numbers of gaming tokens. In particular, FIG. 30 may provide additional detail to operation 2910 of FIG. 29. During a calibration routine, a first number of gaming tokens may be placed on the bet sensor 100. The first number of gaming tokens may be a minimum number of gaming tokens (e.g., one gaming token) placed on the bet sensor 100.

At operation 3010, the radius of the gaming token area may be determined for the stack of gaming tokens having the first number of tokens. As will be discussed in further detail below with reference to FIG. 31, the determination may be performed by various processing steps, such as, for example, gaming token region extraction, filtering, image thresholding, edge detection and arc formation, circle fitting, and determining a trimean of the radii measured.

At operation 3015, the processor 110 may determine whether additional measurements are required for the calibration routine. If additional measurements are required, the number of gaming tokens in the stack on the bet sensor 100 may be changed. For example, a second number of gaming tokes may be placed on the bet sensor 100. The second number of gaming tokens may be a maximum number of gaming tokens (e.g., five gaming token) placed on the bet sensor 100. At operation 3010, the radius of the gaming token area may be determined for the stack of gaming tokens having the second number of tokens.

If additional measurements are not required, at operation 3030, the processor 110 may determine the gaming token height based on the radii of the gaming token areas determined for the different stacks of gaming tokens. For example, the radius for five gaming tokens and one token may be known from the measurements; however, the radii may not be known for the intermediate sizes of the gaming token stacks (e.g., two gaming tokens, three gaming tokens, four gaming tokens). As an example, remaining radii may be determined by R2=R1+R_inc, R3=R2+R_inc, R4=R3+R_inc, wherein R_inc is the increment value (e.g., R_inc=(R5−R1)/5). Of course, other methods are contemplated for determining the radii of the various sizes of stacks of gaming tokens, including taking an actual measurement for each number of gaming token stack sizes rather than interpolating the heights based on an increment value. In addition, the increment value may be based on measurements of different stack sizes other than the minimum and maximum number of gaming tokens. For example, the increment value may be determined based on the difference of radii measurements for two gaming tokens and three gaming tokens or other combinations of measurements.

Figure 31:
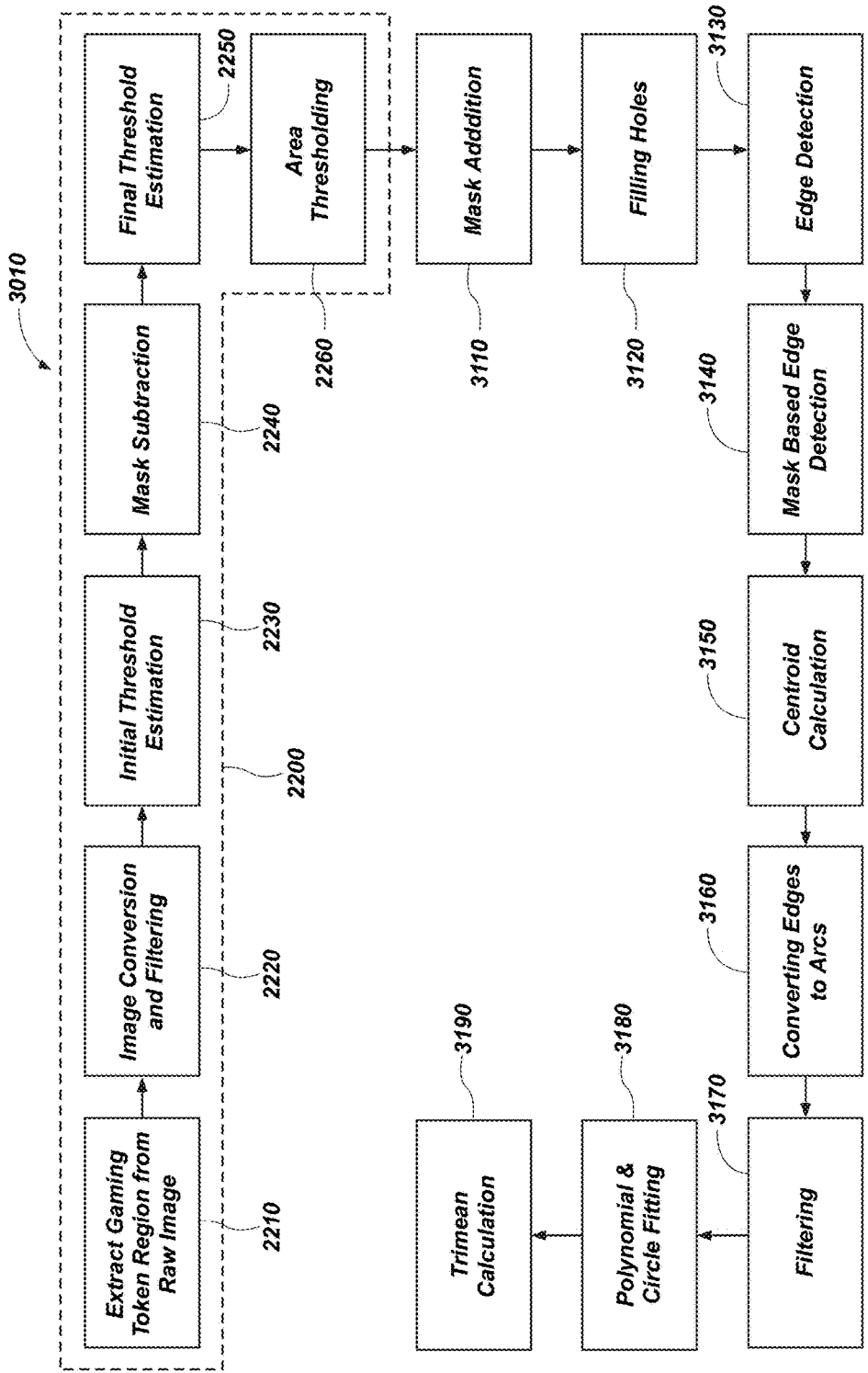
FIG. 31 is a flowchart illustrating a method for operating a bet sensor to identify gaming tokens according to an embodiment of the present disclosure.
Figure 32A:
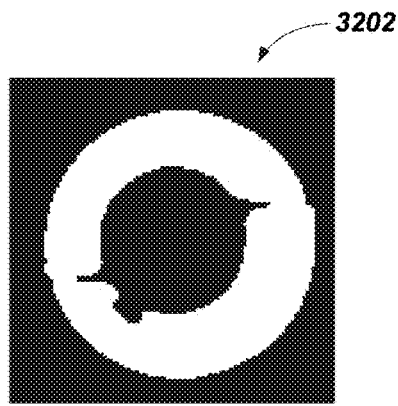
FIGS. 32A through 32N show images depicting different processing steps for a stack of gaming tokens.
Figure 32B:
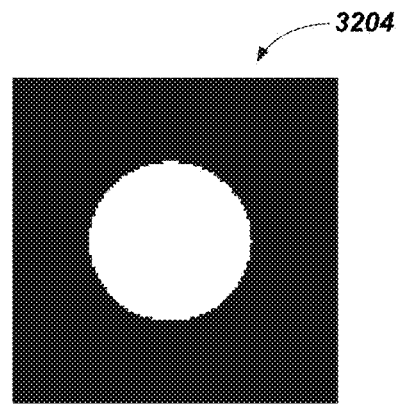
Figure 32C:
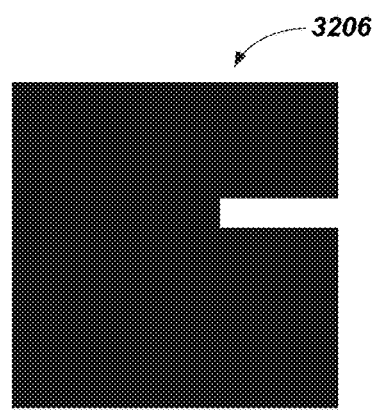
Figure 32D:
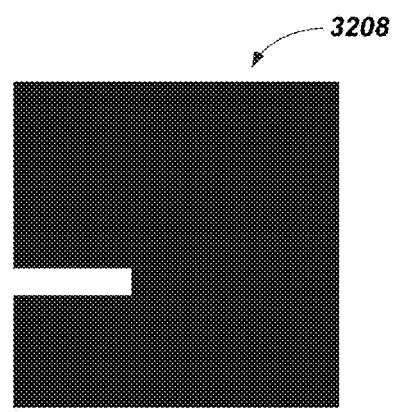
Figure 32E:
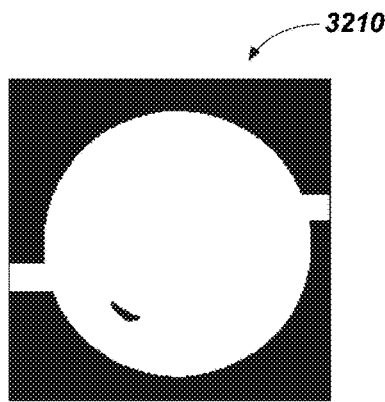
Figure 32F:
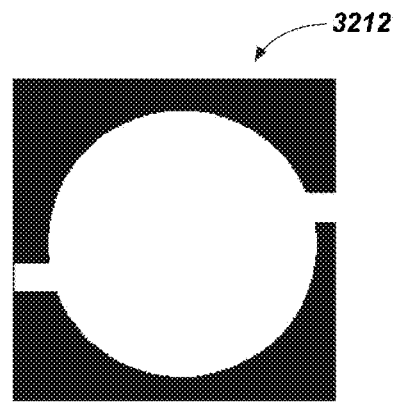
Figure 32G:
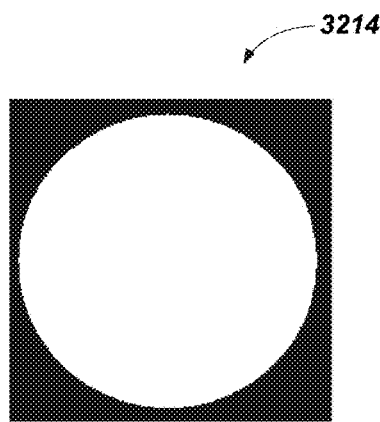

FIG. 31 is a flowchart illustrating a method for operating a bet sensor to identify gaming tokens according to an embodiment of the present disclosure. In particular, the method may provide additional detail for operation 3010 of FIG. 30 for determining a radius of a gaming token area in an image during a calibration routine. As discussed above, operation 3010 may be performed multiple times for a different number of tokens (e.g., for a number of gaming tokens, and again for a second number of gaming tokens). At least some operations of the flowchart may be performed when determining whether the gaming tokens 124 are within a viewable area of the bet sensor 100. Operations 2210 through 2260 are discussed above with reference to FIG. 22 and are not repeated at this time. The result of operations 2210 through 2260 may be a resulting image for an initial gaming token area, which is also shown as image 3202 (FIG. 32A) as a starting point for the discussion of the remaining operations of FIG. 31. FIGS. 32A through 32N may be referred to throughout the description of FIG. 31 in order to provide additional details for certain operations of the flowchart. For example, FIGS. 32A through 32N show images depicting different image processing steps as well as intermediate and/or resulting images. These figures will be discussed with the operations to which they may pertain, rather than sequentially at once.

At operation 3110, the processor 110 may perform addition of additional masks 3204, 3206, 3208 to the image 3202. These additional masks 3204, 3206, 3208 may be employed to remove false edges that may be generated as a result of the specific configuration of the bet sensor 100. For example, the first additional mask 3204 may have a center white circle that corresponds to the black area in center of the image 3202 that may be the result of the mirror 140, and the additional masks 3206, 3208 may have white lines that correspond to the black area in the edges of the image 3202 that may be result of support members holding the mirror 140. Adding masks 3204, 3206, 3208 may perform an OR operation to the image 3202 to remove the corresponding black regions in the resulting image 3210 (FIG. 32E).

At operation 3120, the processor 110 may fill remaining holes within the token area in resulting image 3210. For example, black regions may still remain within the white token region, which may be identified by analyzing the resulting image 3210 for black regions that are completely surrounded by white pixels. These black regions (i.e., holes) may be "filled" by changing the pixel values from black to white to generate the resulting image 3212 (FIG. 32F).

Figure 32H:
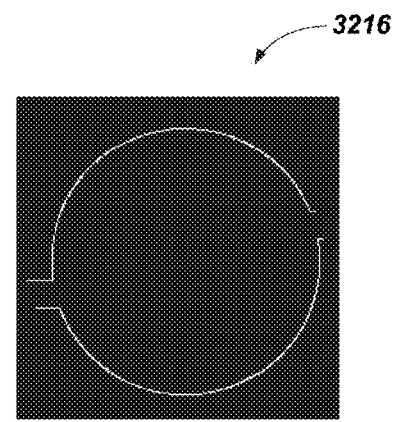
Figure 32I:
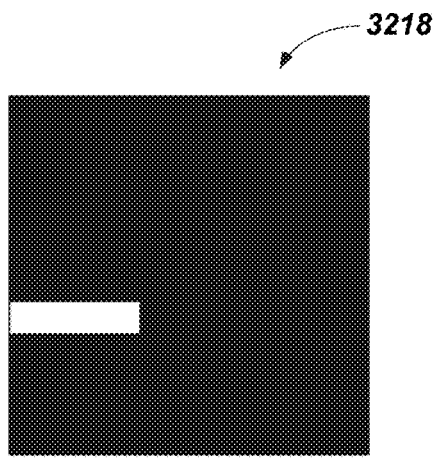
Figure 32J:
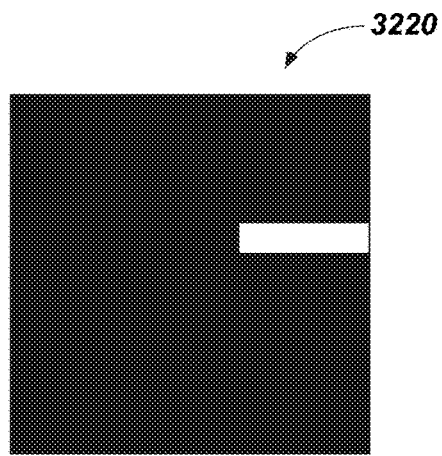
Figure 32K:
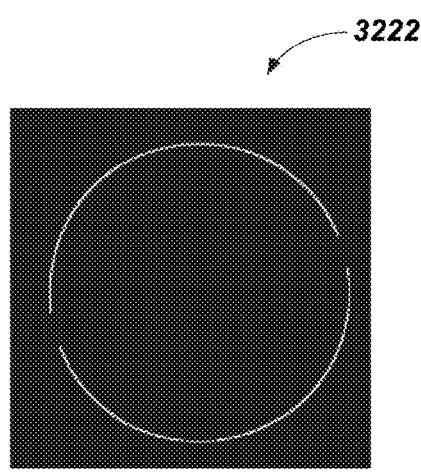
Figure 32L:
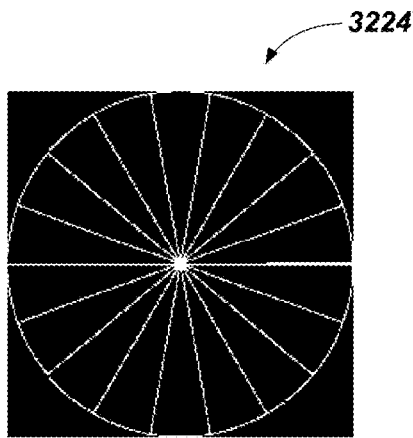
Figure 32M:
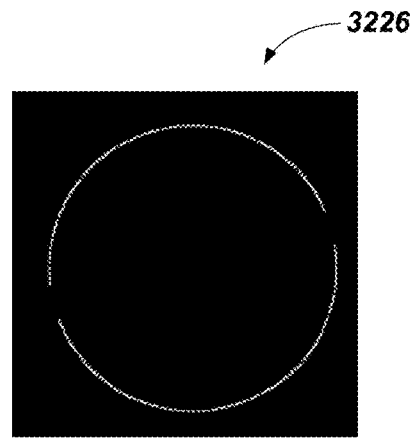
Figure 32N:
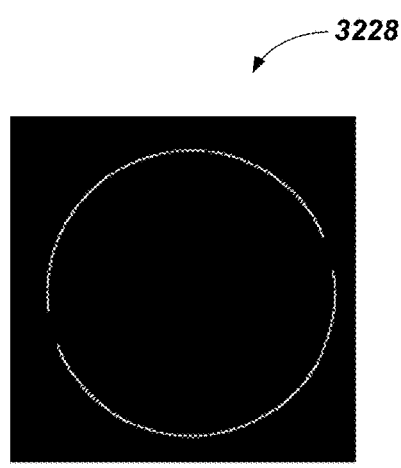

At operation 3130, the processor 110 may perform edge detection on resulting image 3212 to generate an initial edge image 3216 (FIG. 32H). The initial edge image 3216 may be generated by comparing the resulting image 3212 with a mask 3214 (FIG. 32G) that corresponds to the viewable area of the bet sensor. Common white regions and common black regions may be filled with black pixels. The edge boundaries may be adjusted through dilation or erosion to achieve a desired thickness.

At operation 3140, the processor 110 may perform an additional mask-based edge detection on the initial edge image 3216 to generate a refined edge image 3218. The refined edge image 3218 may be generated by performing a NAND operation on the initial edge image 3216 with the additional masks 3206, 3208 that include white regions that correspond to the support structure for the mirror 140. As a result, the portions of the initial edge image 3216 attributed to the support structure for the mirror 140 may be removed such that the remaining edges (i.e., white region) is attributed to the outer edge of the stack of gaming tokens.

It should be noted that the refined edge image 3218 may not necessarily be a perfect circle. Thus, portions of the edges of the refined edge image 3218 may be associated with more than one gaming token such that it may not be possible to determine a single consistent radius of the edge of the refined edge image 3218. As a result, the remaining operations may include efforts to provide a best estimate of the radius of a projected circle associated with the outermost edge of the refined edge image 3218 that is associated with the height of the stack of gaming tokens.

At operation 3150, the processor 110 may determine a centroid for the edges of the refined edge image 3218. The centroid may be generated based on statistical moments of the refined edge image 3218. For example, the (x, y) coordinates for the centroid within the edges of the refined edge image 3218 may be defined as:

$$\text{centroid} = \left( \frac{\mu_{1,0}}{\mu_{0,0}}, \frac{\mu_{0,1}}{\mu_{0,0}} \right). \tag{10}$$

In equation (10), the zeroth moment ($\mu_{0,0}$) may be the area of the entire refined edge image 3218. The first moment for the x coordinates ($\mu_{1,0}$) may be the mean value of the x coordinates having a white pixel value. Likewise, the first moment for the y coordinates ($\mu_{0,1}$) may be the mean value of the y coordinates having a white pixel value. Thus:

$$\mu_{1,0} = \frac{\text{sum}_x}{\mu_{0,0}}. \tag{11}$$

$$\mu_{0,1} = \frac{\text{sum}_y}{\mu_{0,0}}. \tag{12}$$

In equation (11), $\text{sum}_x$ is the summation of the x coordinates where a white pixel value is present. In equation (12), $\text{sum}_y$ is the summation of the y coordinates where a white pixel value is present. Thus, the first moments may be equal to the sum of the respective coordinates having a white pixel divided by the total pixel area, which results in the mean value of each respective coordinate.

At operation 3160, the edges of the refined edge image 3218 may be subdivided into smaller arcs to generate an arc image 3220. The arcs may be generated by applying a mask 3224 having radial lines extending evenly (e.g., every 10 degrees) around a center. The mask 3224 may be applied to the refined image 3218 by aligning the center of the mask 3224 with the centroid determined for the refined image 3218. Where there is overlap in white pixels of the refined edge image 3218 and the mask 3224, the white pixel in the refined edge image 3218 may be changed to a black pixel in the arc image 3220. As will be discussed below, projecting a plurality of circles onto the different arcs may be performed in order to avoid the wrong estimation of a circle from a single curve potentially representing multiple circles.

At operation 3170, the processor 110 may filter out relatively small arcs from the arc image 3220, as such small arcs may be less accurate for being used to project the circles. Thus, a refined arc image 3222 may be generated from the arc image 3220 by removing arcs (e.g., changing pixels from white to black) that have an area less than a predetermined threshold.

To identify arcs, the processor 110 may scan the arc image 3220 to identify groups of pixels that share a similar pixel value that are also connected to each other. As an example, the processor 110 may scan the arc image 3220, pixel-by-pixel (e.g., from top to bottom and left to right) in order to identify connected pixel regions. The processor 110 may scan the arc image 3220 by moving along a row in the arc image 3220 until the processor 110 arrives at a point p (where p denotes the pixel to be labeled at any stage in the scanning process) for a desired pixel value (e.g., a white value in a binary image). Four neighbors of point p may have already been encountered during the scan (e.g., the neighboring pixel to the left of point p, the neighboring pixel above point p, and the two upper diagonal pixels from a previously scanned row). The labeling of point p may include information about equivalent classes that are based on the pixel values of its neighbors. The labels of equivalent classes may be used to determine the area of each arc. The arcs that are less than a predetermined area threshold may be filtered out. For example, the arcs that have an area that is less than 10 percent of the area of the largest arc may be filtered out.

At operation 3180, the processor 110 may project circles onto the refined arc image 3222 based on the arcs. For example, circles may be projected using combinations of arcs as segments of those circles. When a circle is projected, the circle's radius and center may be determined. After the circles are determined for projection based on the arcs, the processor 110 may determine whether to discard one or more circles. This decision may be based on criteria, such as the radius of circle, the location of circle, and the center of circle generated by the processor 110. For example, if a circle projection from an arc results in a circle that has a radius that is outside of the expected range (e.g., too small or too large), then the processor 110 may determine that the resulting circle is not correlated with the actual edge of the gaming token stack. Similarly, if the circle projection from an arc results in a circle that has a centroid that is at a location that would not correlate with gaming tokens from the gaming token stack.

At operation 3190, the processor may determine a trimean for the remaining circles that meet the predetermined criteria (e.g., location, centroid, radius). The trimean refers to determining the mean radius of the remaining circles after the outlier circles have been removed. The trimean of the remaining circles may be used to determine an expected radius value for a particular number of gaming tokens on the bet sensor 100. As discussed above, during calibration, the expected radius of the outer edge of the image may be determined for a first number of gaming tokens as well as a second number of gaming tokens, which may also be interpolated to determine an expected radius for additional numbers of gaming tokens. These radii may be stored for future use during actual detection mode during game play.

Figure 33:
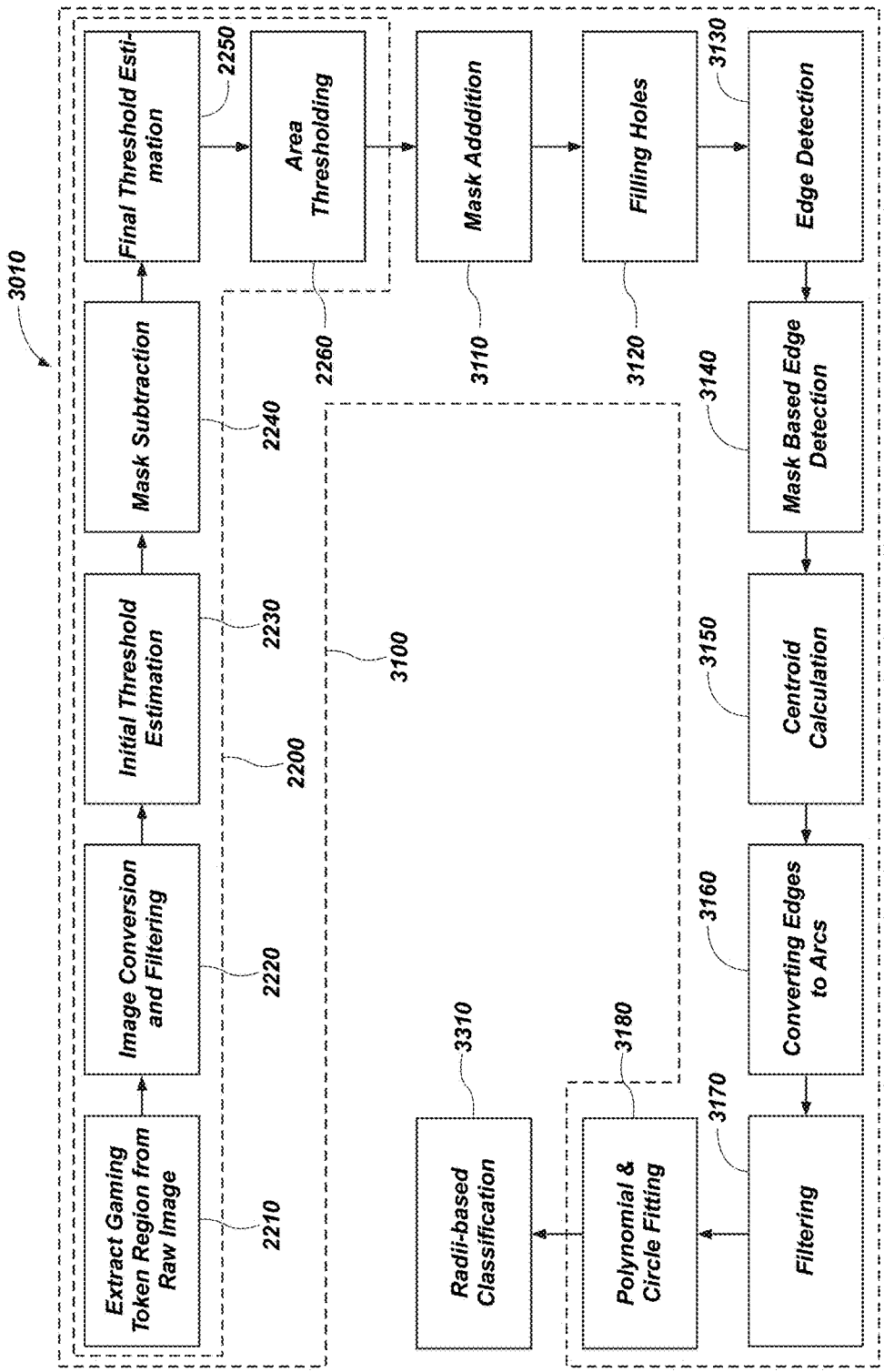
FIG. 33 is a flowchart illustrating a method for operating a bet sensor to identify gaming tokens according to an embodiment of the present disclosure.

FIG. 33 is a flowchart illustrating a method for operating a bet sensor to identify gaming tokens according to an embodiment of the present disclosure. In particular, the method may provide additional detail for operation 2920 of FIG. 29 for determining a number of a gaming token detected in an image during a game play. At least some operations of the flowchart may be performed when determining whether the gaming tokens 124 are within a viewable area of the bet sensor 100. Operations 2210 through 2260 are discussed above with reference to FIG. 22 and are not repeated at this time. In addition, at least some operations of the flowchart are also part of the calibration routine that has already been described. Operations 3110 through 3180, therefore, will not be repeated at this time. Thus, circle projections may be performed in a similar manner during game play as previously described during a calibration routine.

Figure 34:
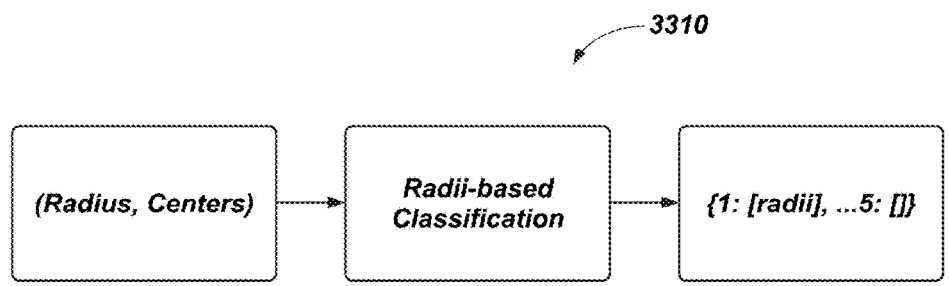
FIG. 34 is a block diagram illustrating a radii-based characterization.

At operation 3310, the processor 110 may perform radii-based characterization of the processed image to determine the number of gaming tokens placed on the bet sensor 100. For example, the remaining projected circles may be classified into one of a plurality of different groups as shown in FIG. 34 (group 1: [radii 1] . . . group 5: [radii 5]). The classification may be based on meeting predetermined criteria (e.g., radius size, centroid location, etc.) for the group definitions. The groups may be defined according to the expected characteristics (from the calibration) for each possible number of gaming tokens allowed in a stack. For example, a first group may correspond with the expected characteristics for a one token stack, a second group may correspond with the expected characteristics for a two token stack, and so on. Given a list of projected circle's radii and centers, each circle may be classified (e.g., with a K-Nearest Neighbor Classifier or other machine learning algorithm) to be assigned a group with a particular radius and its associated token position label. The group with the most circles likely represents the number of gaming tokens on the captured image's stack.

In some embodiments, the processor 110 may also determine a confidence level associated with the classification. If the confidence level is above a predetermined threshold (e.g., 95%), the bet may be accepted and game play may continue. If the confidence level is below a predetermined threshold, game play may stop and the dealer may be alerted to verify the wager and/or take corrective actions. As an example, the confidence level may be determined by calculating total number of circles in the highest group, and dividing by the sum of the total number of circles in the highest group and the second highest group. For example, if the first group included 1000 circles and the second highest group included 25 circles, the confidence level may be 1000/(1000+25)=97.5%.

The embodiments of the disclosure described above do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those of ordinary skill in the art from the description. Such modifications and embodiments also fall within the scope of the appended claims.

What is claimed is:

1. A bet sensor for sensing values of multiple gaming tokens, comprising:
    a bet placement surface configured and oriented to support a stack of gaming tokens thereon;
    an image sensor located and oriented to capture an image of a lateral side surface of at least one gaming token located on the bet placement surface, wherein the image depicting the lateral side surface is in a radial format; and
    a processor operably coupled with the image sensor, the processor configured to acquire image data from the image and analyze the image data to determine a wager value of the at least one gaming token by:
(i) detecting at least one edge in the image data,
(ii) defining a plurality of key points on the at least one edge,
(iii) generating a plurality of arcs from the at least one edge based on the plurality of key points, and
(iv) projecting a first plurality of circles onto the image data, wherein each circle of the first plurality of circles is projected from at least one arc of the plurality of arcs, and each circle corresponds with a transition in the image data associated with the at least one gaming token such that a region in the image data defined between two circles of the plurality of circles represents a gaming token of the at least one gaming token.

2. The bet sensor of claim 1, further comprising memory associated with the processor, the memory containing a plurality of known patterns associated with gaming tokens, wherein the processor is configured to analyze color content between the projected first plurality of circles and compare the color content with the known patterns to determine the wager value of the at least one gaming token.

3. The bet sensor of claim 2, wherein the at least one gaming token comprises a plurality of gaming tokens arranged in a stack located on the bet placement surface, and the processor is configured to project the first plurality of circles onto the image data to correspond with a plurality of transitions in the image data associated with the plurality of gaming tokens.

4. The bet sensor of claim 1, wherein the processor is further configured to:
project a second plurality of circles including the first plurality of circles onto the image data; and
discard excess circles from the second plurality of circles projected onto the image data based on predetermined criteria, wherein the remaining circles include the first plurality of circles.

5. The bet sensor of claim 4, wherein the predetermined criteria includes at least one of a radius size of a circle, a center location of a circle, a color analysis of transitions for a circle in the image data, and a location of an arc of the circle.

6. The bet sensor of claim 1, wherein the transition is associated with an intermediate transition between two gaming tokens of a stack of gaming tokens.

7. The bet sensor of claim 1, wherein the transition is associated with an outer edge of a top gaming token of a stack of gaming tokens.

8. The bet sensor of claim 1, wherein the plurality of arcs are generated by applying an image mask to the at least one edge to divide each edge into a plurality of arcs at the plurality of key points, wherein the plurality of key points are intersections between the image mask and the at least one edge.

9. A gaming table, comprising:
at least one bet sensor located proximate a surface of the gaming table, the at least one bet sensor including:
a bet placement surface configured and oriented to support a stack of gaming tokens thereon;
an image sensor located and oriented to capture an image of a lateral side surface of gaming tokens located on the bet placement surface, the image depicting the lateral side surface of the stack of gaming tokens in a radial format; and
a processor in communication with the image sensor, the processor configured to:
acquire image data from the image;
detect a plurality of edges in the image data;
define a plurality of key points on each edge of the plurality of edges;
generate a plurality of arcs from the plurality of edges based on the plurality of key points; and
project a plurality of circles from the plurality of arcs on the image data to determine a wager value of the gaming tokens, the plurality of circles identifying a plurality of boundaries in the image data, wherein a region in the image data defined between two circles of the plurality of circles represents a gaming token.

10. The gaming table of claim 9, further comprising memory associated with the processor, the memory including information associated with a plurality of known color patterns for different values of gaming tokens, wherein the processor is configured to determine the wager value by comparing color content of the image data between the projected circles with the known color patterns.

11. The gaming table of claim 10, wherein the color content is stored as color indexes, wherein the processor is configured to generate the color indexes from a larger range of colors.

12. The gaming table of claim 9, further comprising memory associated with the processor, the memory including radius information for an outermost boundary in the image data for a plurality of different sizes of stacks of gaming tokens permitted to be wagered at the gaming table.

13. A method of operating a bet sensor for determining a wager value of a plurality of gaming tokens, the method comprising:
capturing, with an image sensor, image data of a lateral side surface of a plurality of gaming tokens on a bet placement surface, wherein the lateral side surface is depicted in a radial format;
processing, with a processor, the image data by: (i) detecting a plurality of edges from the image data, (ii) defining a plurality of key points on each edge of the plurality of edges, (iii) generating a plurality of arcs from the plurality of edges based on the plurality of key points, and (iv) projecting a plurality of circles from the plurality of arcs on the image data approximately at a plurality of transitions in the image data corresponding to the plurality of gaming tokens, wherein a region in the image data between two circles of the plurality of circles represents a gaming token of the plurality of gaming tokens; and
determining a wager value of the plurality of gaming tokens based on characteristics of the plurality of circles.

14. The method of claim 13, wherein determining a wager value of the plurality of gaming tokens is based on color content of the image data between the plurality of circles.

15. The method of claim 14, wherein determining a wager value of the plurality of gaming tokens based on the color content of the image data between the plurality of circles includes comparing the color content of the image data between the plurality of circles with known patterns of the color content associated with individual wager values of individual gaming tokens.

16. The method of claim 13, wherein determining a wager value of the plurality of gaming tokens is based on a radii-based characterization of the plurality of circles for an outermost edge of the image data.

17. The method of claim 16, wherein determining a wager value is further based solely on a single value of gaming token multiplied by a number of gaming tokens determined by the radii-based characterization.

18. The method of claim 13, wherein processing the image data further includes discarding circles of the plurality of circles projected on the image data that do not meet predetermined criteria.

19. The method of claim 18, wherein discarding circles of the plurality of circles projected on the image data that do not meet predetermined criteria includes discarding circles of the plurality of circles projected on the image data that satisfy at least one of the following predetermined criteria:
- a radius of the circle is less than a lower threshold;
- a radius of the circle is greater than an upper threshold;
- a ratio of circle areas;
- a location of a center of the circle is outside of a predefined range;
- an arc of the circle is located in a background area of the image data;
- at least a portion of the circle extends outside of a boundary range for the image data; and
- a color pattern in the image data along the circle does not match a known patterns of color content associated with individual wager values of individual gaming tokens.

20. The method of claim 13, wherein processing the image data further includes performing a color classification on each pixel of the image data by translating a pixel value to a color index associated with a broader range of colors.

* * * * *

UNITED STATES PATENT AND TRADEMARK OFFICE
CERTIFICATE OF CORRECTION

Page 1 of 1

PATENT NO. : 10,134,223 B2
APPLICATION NO. : 14/988533
DATED : November 20, 2018
INVENTOR(S) : Ajay Kumar Mandava and Jaime Bemaras It is certified that error appears in the above-identified patent and that said Letters Patent is hereby corrected as shown below:

In the Specification

| | | |
|---|---|---|
| Column 13, | Line 41, | change "$(x_2, y_z, z_2)$," to --$(x_2, y_2, z_2)$,-- |
| Column 27, | Line 16, | change "23A through 241" to --23A through 23I-- |
| Column 32, | Line 61, | change "wherein t is" to --where ι is-- |
| Column 32, | Line 63, | change "by a and" to --by α and-- |

Signed and Sealed this
Eleventh Day of December, 2018

Andrei Iancu
*Director of the United States Patent and Trademark Office*